(12) United States Patent
Yamamoto

(10) Patent No.: US 6,597,790 B1
(45) Date of Patent: Jul. 22, 2003

(54) COMMUNICATION APPARATUS AND A COMMUNICATION SYSTEM

(75) Inventor: Takahisa Yamamoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/472,439

(22) Filed: Dec. 27, 1999

Related U.S. Application Data

(62) Division of application No. 08/670,608, filed on Jun. 26, 1996, now Pat. No. 6,078,663.

(30) Foreign Application Priority Data

| Jun. 30, 1995 | (JP) | 7-165187 |
| Jun. 30, 1995 | (JP) | 7-165932 |
| Jun. 30, 1995 | (JP) | 7-165933 |
| Jun. 30, 1995 | (JP) | 7-165934 |
| Jul. 28, 1995 | (JP) | 7-193586 |

(51) Int. Cl.$^7$ .......................... H04N 7/167; G06F 17/60
(52) U.S. Cl. ................................. 380/231; 705/51
(58) Field of Search ................ 705/51, 52; 380/231, 380/233

(56) References Cited

U.S. PATENT DOCUMENTS

| 4,710,955 A | | 12/1987 | Kauffman | 380/10 |
| 4,870,681 A | | 9/1989 | Sedlak | 380/30 |
| 4,944,009 A | | 7/1990 | Micali et al. | 380/46 |
| 4,977,594 A | * | 12/1990 | Shear | 705/53 |
| 5,007,087 A | * | 4/1991 | Bernstein et al. | 380/46 |
| 5,010,571 A | * | 4/1991 | Katznelson | 380/281 |
| 5,159,633 A | * | 10/1992 | Nakamura | 380/30 |
| 5,473,687 A | * | 12/1995 | Lipscomb et al. | 705/51 |
| 5,511,123 A | | 4/1996 | Adams | 380/29 |
| 5,600,720 A | | 2/1997 | Iwamura et al. | 380/1 |
| 5,615,110 A | * | 3/1997 | Wong | 705/38 |
| 5,724,428 A | | 3/1998 | Rivest | 380/37 |
| 5,740,246 A | * | 4/1998 | Saito | 705/52 |
| 5,835,600 A | | 11/1998 | Rivest | 380/44 |

FOREIGN PATENT DOCUMENTS

| EP | 0 438 154 A2 | 7/1991 |
| WO | WO 90/02382 | 3/1990 |

OTHER PUBLICATIONS

"Practical Cryptosystems Using Quadratic Residue Pseudo–Random Number Generators and Block Ciphers", T. Yamamoto et al., The Institute of Electronics Information and Communication Engineers, Aug. 1993, pp. 65–75.

"Montgomery's Modular–Multiplication Method and Systolic–Arrays Suitable for Modular–Exponentiation", K. Iwamura et al., Electronics Information and Communication Engineers, Aug. 1993, pp. 1214–1223.

"Cryptography and Information Security", Tsujii and Kasahara, Shokosha Co., Ltd., 1990, pp. 72, 73, 86, 97–104.

"How to Generate Cryptographically Strong Sequences of Pseudo Random Bits", Blum et al., 23$^{rd}$ Annual Symposium on Foundations of Computer Science, Nov. 1982, pp. 112–117.

* cited by examiner

Primary Examiner—Matthew Smithers
(74) Attorney, Agent, or Firm—Fitzpatrick, Cella, Harper & Scinto

(57) ABSTRACT

A communication device according to the present invention comprises an enciphering transmitter for enciphering data and transmitting enciphered data, a counter for obtaining a count of a quantity of enciphered data, and an accounting circuit for calculating, in accordance with the count held by the counter, an amount to charge a user for the data.

16 Claims, 47 Drawing Sheets

FIG. 46

DATA BASE 41

| TITLE OF INFORMATION | CHARGE BY ENCIPHERING METHOD $C_1$ | ... | CHARGE BY ENCIPHERING METHOD $C_j$ | ... | CHARGE BY ENCIPHERING METHOD $C_t$ | PROVIDED INFORMATION |
|---|---|---|---|---|---|---|
| INFORMATION 1 | $P_{1,1}$ | ... | $P_{1,j}$ | ... | $P_{1,t}$ | ... |
| ... | ... | ... | ... | ... | ... | ... |
| INFORMATION Info | $P_{Info,1}$ | ... | $P_{Info,j}$ | ... | $P_{Info,t}$ | ... |
| ... | ... | ... | ... | ... | ... | ... |

READ-OUT INFORMATION

READ-OUT OF CHARGE

COMMUNICATION APPARATUS AND A COMMUNICATION SYSTEM

This is a divisional application of Application No. 08/670,608, filed Jun. 26, 1996 and allowed on Sep. 27, 1999, now U.S. Pat. No. 6,078,663.

BACKGROUND OF THE INVENTION

1. Field of the Invention

The present invention relates to a communication apparatus that is employed for a multi-media network, etc., and in particular to a communication apparatus that performs the accounting for a communication service for encrypted secret information; and to a communication system that employs such a communication apparatus.

2. Related Background Art

Recently, in consonance with the preparation of optical fiber networks for trunk communication networks, the spread of cable television'systems, the practical use of satellite communications, and the spread of local area networks, there has been an expansion of the so-called information service industry that provides various information, across a communication network, such as images, sounds, and computer data, and charges service fees in consonance with the contents and the amount of the information that is provided. It is important that such services have means to properly account for provided information.

However, in many cases conventional accounting systems are monthly systems, such as those for cable television systems or broadcast satellite systems, that are not concerned with the frequency of service, or accounting systems, such as for computer services, that count only the service frequency (or service time) and that are not concerned with the types or quality of provided information.

It is vitally important that information transmission across a communication network be secure, and various systems for enciphering information and transmitting the enciphered information have been proposed as secure transmission means.

When an information service uses a conventional enciphering system to keep information secret, however, the conventional enciphering system will not be able to cope with the various types of information and services as they continue to expand in the future.

It is assumed that generally an information providing center can provide not only one type of information, but that it can provide an assortment of different types of information. The various types of information differ in their worth, however, and accordingly, conditions wherein the information providing center calculates a charge should be different. From the view of the amount of information that is to be provided, since the quantity of data that is required for an animated image is considerably greater than the data that is required for text information, with an accounting system according to which charges are based on the quantity of information dispensed, a user that received animated image information would have to pay a fee that was a multiple times of the service fee charged for text information. Such an accounting system would be unrealistic.

The conventional accounting system for an information service has the above described problems.

SUMMARY OF THE INVENTION

To resolve these problems, it is one object of the present invention to provide an accounting system that can calculates a charge while taking into consideration the types and quality of information and service.

To achieve the object, according to one embodiment of the present invention, provided are encipher transmission means for enciphering data and transmitting enciphered data; counting means for obtaining a count of quantity of data to be enciphered; and accounting means for charging a user for the enciphered data in consonance with a count value held by the counting means.

According to another embodiment, provided are encipher transmission means for enciphering data as units of a block each and for transmitting the enciphered data; counting means for obtaining a count of the blocks to be enciphered; and accounting means for charging a user for the enciphered data in. consonance with a count value held by the counting means.

According to an additional embodiment, provided are encipher transmission means for enciphering data and transmitting enciphered data; counting means for obtaining a count of cryptographic keys that are employed for enciphering; and accounting means for charging a user of the enciphered data in consonance with a count value held by the counting means.

According to a further embodiment, provided are encipher transmission means for enciphering data and transmitting enciphered data while updating a cryptographic key; counting means for obtaining a count of feedback calculations that are performed for updating the cryptographic key; and accounting means for charging a user of the enciphered data in consonance with a count value held by the counting means.

According to still another embodiment, provided is a communication system comprising: a transmission terminal, including encipher transmission means for enciphering data and transmitting enciphered data; and a reception terminal, including encipher reception means for receiving and deciphering enciphered data, the transmission terminal charging the reception terminal a fee that corresponds to an operation of the encipher transmission means.

According to the above described embodiments, the number of calculations that are performed for enciphering, i e., information, such as the quantity of data, the number of cryptographic keys and the number of feedback calculations, is employed to acquire accounting information, so that the information providing center can determine in advance a unit fee in consonance with information type and quality. Therefore, a user can be charged a fair information service fee by the information providing center in consonance with the type, quality and quantity of the provided information.

Further, an information provider can determine a charge for information service in consonance with the quality of information that is provided. Also, since the accounting is performed by the unit, when the provided information differs from the desired information, a user can cancel the request for that information so as to minimize any loss that may be incurred.

A conventional system is not designed to provide a variable enciphering rate for a block signal. As for data in a large quantity, such as image data, for which high speed real-time is required, the conventional system can not provide high-speed cryptographic communication by increasing the enciphering rate for block cryptography even though the security for enciphering is reduced. As for non-real time data in a small quantity, such as text data, the conventional system can not provide secure cryptographic communication by reducing an enciphering rate for block cryptography to increase security.

In addition, a conventional system is not designed to provide a variable key generation rate. Therefore, as for data of high secret for example, the conventional system can not provide high-security cryptographic communication by increasing the key generation rate.

The conventional encipher communication means has the above described problems.

To resolve these problems, it is another object of the present invention to provide an encipher communication apparatus that can vary an enciphering rate, and to provide an enciphering device.

To achieve the above object, according to one embodiment, provided are cryptographic communication means for enciphering transmission data and deciphering received enciphered data and for performing communication; and changing means fort changing a rate that is applied for enciphering/deciphering data.

According to another embodiment, provided are enciphering means for enciphering and deciphering a predetermined algorithm; and changing means for changing a rate for the encipher means without changing the predetermined algorithm.

According to an additional embodiment, provided are enciphering means capable of changing an encipher power relative to transmission data; and changing means for changing the encipher power of the enciphering means in consonance with a deciphering capability of a transmission destination.

According to a further embodiment, provided are enciphering means capable of changing an encipher power relative to transmission data; and changing means for changing the encipher power of the enciphering means by negotiation with a transmission destination.

According to the above embodiments, the enciphering rate and the encipher power can be changed, and the changed enciphering rate or the encipher power that is changed is used in common by a transmitter and a receiver prior to the transmission of an enciphered text. As a result, the selection of the enciphering rate, which conventionally is not taken into account, is possible, and cryptographic communication having a high degree of freedom can be provided.

Further, the enciphering rate for an encipherer and/or the pseudo-random number generation rate are changed, and the changed enciphering rate and pseudo-random number generation rate of the encipherer are employed in common by a transmitter and a receiver prior to the transmission of an enciphered text. As a result, the selection of a trade-off between the security of the enciphering and the processing speed is possible, and cryptographic communication having a high degree of freedom can be provided.

Therefore, even when the processing capability of an encipherer and pseudo-random number generation rates differ from a transmitter and a receiver, cryptographic communication is possible.

It is an additional object of the present invention to provide a service charge system that is consonant with a transfer speed and the security provided for enciphered information.

To achieve the above object, according to one embodiment, provided are encipher transmission means for enciphering data and transmitting enciphered data; selection means for selecting an enciphering rate for the encipher transmission means; and accounting means for charging a fee in consonance with the enciphering rate that is selected by the selection means.

According to another embodiment, provided is a cryptographic communication system, which performs communication of enciphered data across a network and varies an encipher power, wherein a data transmission side charges a data reception side a fee in consonance with the encipher power.

According to the above embodiments, cryptographic communication having a high degree of freedom can be provided by selecting an enciphering rate using the selection means.

Further, an information providing service can be achieved that has a service charge system, which is consonant with encipher power for selected enciphering rates, transfer speeds and security.

Not taken into consideration for conventional cryptographic communication are such adjustments, between an information providing center and a user, as which enciphering system should be employed for providing information, or which mode, or which system for what kind of countermeasure is performed for deciphering, should be employed for cryptographic communication. Particularly not taken into consideration is that an encipher power should be adjusted in consonance with the types of information that are to be exchanged. It is impossible, for example, for data such as image data that are required for a large amount and for high-speed real time, information is provided by an enciphering system at a high processing speed, and for data such as text data that are a small amount at non-real time but are very secret, information is provided by an enciphering system that places a large load on an encipherer but keeps high security.

It is, therefore, difficult to provide a charge system for an information providing service that is consonance with the transfer speed for information providing and the security that is required for communication.

To resolve this problem, it is a further object of the present invention to provide a service charge system that corresponds to a transfer speed and the security for providing enciphered information.

To achieve this object, according to one embodiment, provided are encipher transmission means for enciphering data by using a plurality of enciphering systems and for transmitting enciphered ax data; selection means for selecting one enciphering system from among the plurality of the enciphering systems; and accounting means for charging a fee in consonance with the enciphering system that is selected by the selection means.

According to another embodiment, provided is a cryptographic communication system, which enciphers data across a network and selects an enciphering system, wherein a data transmission side charges a data reception side in consonance with the enciphered system that is selected.

According to the above embodiments, cryptographic communication having a high degree of freedom can be provided by selecting an enciphering system. As a result, an information providing service can be achieved having a service charge system that is consonant with encipher power, transfer speed and security of a selected enciphering system.

It is still another object of the present invention to provide a cryptographic communication apparatus that can select an enciphering system, a cryptographic communication system that employs such an apparatus, and an encipherer.

To achieve the above object, according to one embodiment, provided are a plurality of communication means for enciphering transmission data and deciphering received enciphered data, and for performing communication with each other; and selection means, provided in each of the plurality of communication means, for selecting one of a plurality of enciphering systems.

According to another embodiment, provided are enciphering means for selectively employing a plurality of enciphering systems to encipher information; and mode selection means for selecting an operational mode, the enciphering means selecting one of the plurality of enciphering systems in accordance with the operational mode that is selected.

According to an additional embodiment, provided are enciphering means for selectively employing a plurality of enciphering systems to encipher information; and designation means for designating a security rank, the enciphering means selecting one of the plurality of enciphering systems in accordance with the security rank that is selected.

According to a further embodiment, provided is a cryptographic communication system, which permits a plurality of terminals on a network to communicate enciphered data and selects an enciphering system, wherein when an enciphering system that is designated by a predetermined terminal is to be changed by another terminal, an approval by the predetermined terminal is required.

According to the above embodiments, since selection means for selecting an enciphering system is provided for commutation means that is employed by a transmitter and a receiver that together cryptographic communication, the enciphering system can be arbitrarily set. Further, since the set enciphering system is employed in common by the transmitter and the receiver prior to the transmission of enciphered text, the selection of the enciphering system that conventionally is not taken into consideration is possible, and cryptographic communication having a high degree of freedom can be provided. In addition, an encipher power can be selected.

The other objects and features of the present invention will become readily apparent during the description given while referring to the accompanying drawings.

BRIEF DESCRIPTION OF THE DRAWINGS

FIG. 46 is a block diagram illustrating a database according to the sixteenth embodiment of the present invention;

DETAILED DESCRIPTION OF THE PREFERRED EMBODIMENTS

First, a common enciphering system that is a basis of the preferred embodiments and information providing service that employs the enciphering system will now be described.

Figure 1:
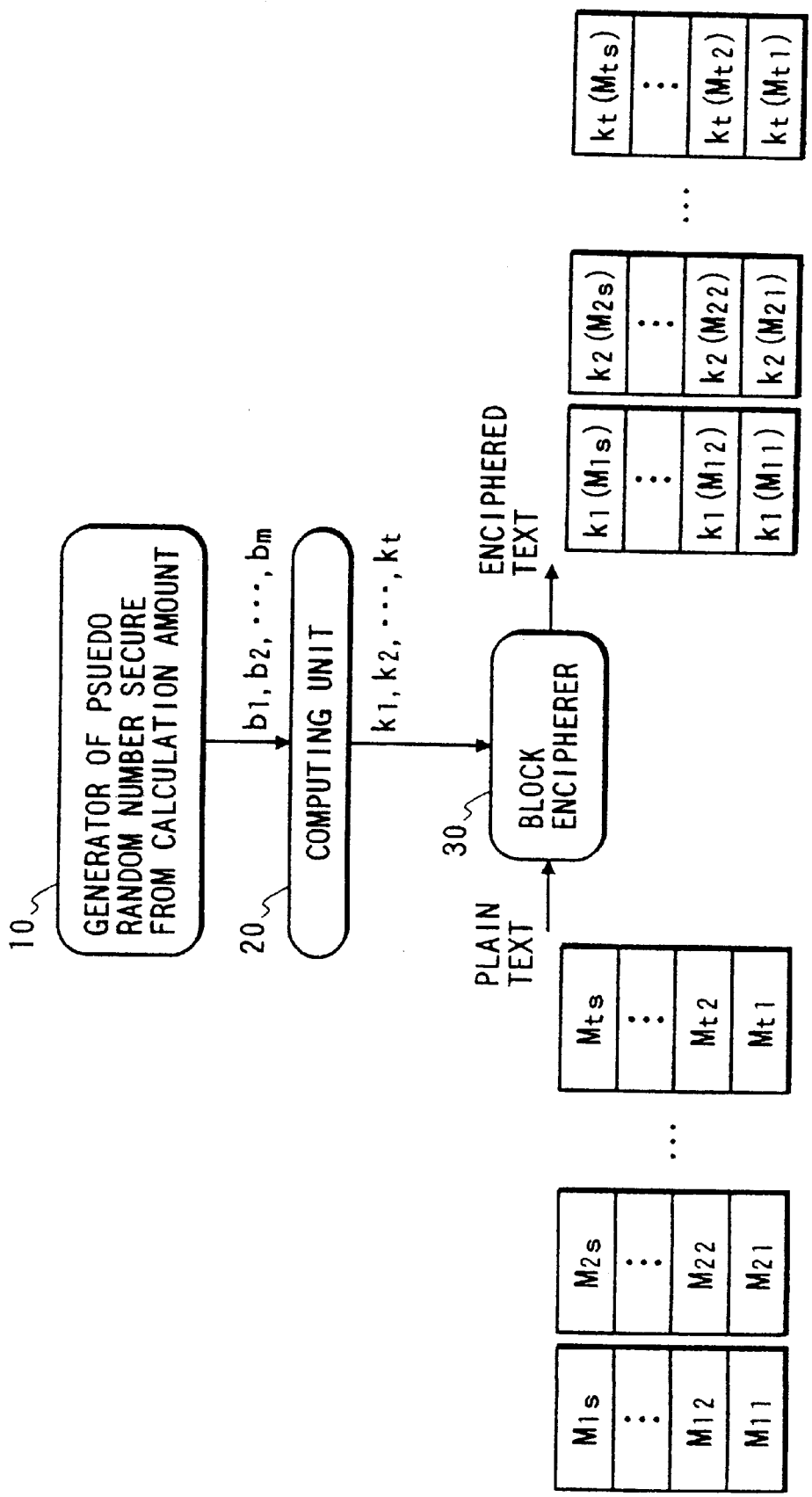
FIG. 1 is a block diagram illustrating a common enciphering system.

First, the general enciphering system will be explained. A conventional public algorithm type common-key block cipher, such as DES (Data Encryption Standard) cryptography and FEAL (Fast Data Encipherment Algorithm) cryptography, has a shortcoming in that when a set of enciphered text and plaintext using the same key is output more often than a specific number of times, the key can be analyzed. To remove this shortcoming, as is shown in FIG. 1, an enciphering system is proposed that makes key analysis more difficult by, before a set of an enciphered text and a plaintext is output the number of times that permits key analysis, the updating of a key as needed using a pseudo-random number that is secure from calculation amount (Yamamoto, Iwamura, Matsumoto and Imai: "Square-type pseudo-random number generator and practical enciphering system employing block encipher," Institute of Electronics Information And Communication Engineers ISEC 93-29, 1993-08).

Figure 2:
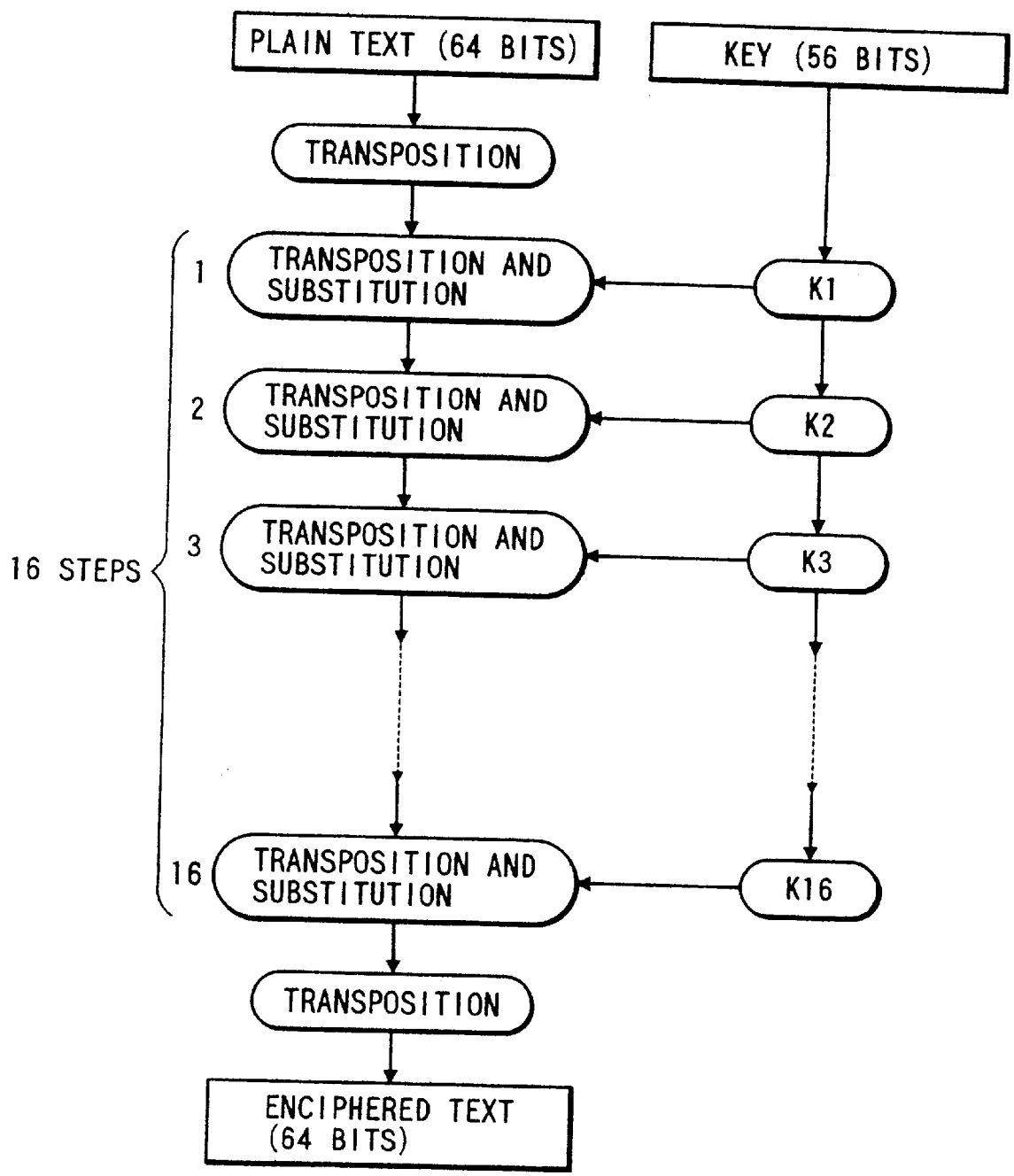
FIG. 2 is a flowchart for DES enciphering.

DES cryptography will be briefly described. DES cryptography, a specific common-key block cryptography of public algorithm type, has a currently wide employment centering around its use by monitory facilities. FIG. 2 is a flowchart for performing DES cryptography. For DES cryptography, a 64-bit data block is employed as a unit for encryption (decryption). The length of a key is 56 bits. The cryptographic algorithm employs, as a base, transposition (exchange of bit positions of input bits) and substitution (replacement of an input value with another value). During encryption (decryption) according to DES cryptography, a process for which the transposition and the substitution are properly combined is assembled in 16 steps, and the bit pattern of a plaintext is mixed and is converted into an enciphered text having no meaning. In a decryption process, the enciphered text is mixed to recover the original plaintext. The parameter for this mixing is a 56-bit key.

A pseudo-random number sequence that is secure from a calculation amount is a pseudo-random number sequence with which proved is that, if there exists a polynomial time algorithm wherein one part of the pseudo-random number sequence is employed to anticipate the following pseudo-random number sequence, the polynomial time algorithm is employed to constitute a polynomial time algorithm relative to a problem that is regarded as difficult because of the calculation amount. More specifically, a pseudo-random number sequence that is secure from a calculation amount is a sequence with which it is very difficult, with respect of a calculation amount, for a random number sequence that is output to be used to anticipate the following random number sequence. This is studied in details in A. C. Yao, "Theory and Applications of Trapdoor Functions" Proceedings of the 23rd IEEE Symposium of Foundations of Computer Science, IEEE, pp. 80–91, 1982, or M. Blum and S. Micali, "How to Generate Cryptographically Strong Sequences of Pseudo-Random Bits" Proc. 22nd FOCS, IEEE, pp. 112–117, 1982. Well known algorithms that are employed for the generation of pseudo-random numbers that are secure from a calculation amount are those using square-type random number, RSA encryption, discrete logarithms, or reciprocal encryption, which are described in Tsujii and Kasahara, "Cryptography and Information Security," Shokosha Co., Ltd., p. 86, 1990.

In FIG. 1 is shown a device that performs as the enciphering system and that comprises a pseudo-random number generator 10, a computing unit 20, and a block encipherer 30. Block cryptography, such as DES cryptography or FEAL cryptography, is employed as an algorithm for the block encipherer 30. The block encipherer 30 enciphers plaintext and deciphers enciphered text. The pseudo-random number generator 10 generates pseudo-random numbers according to the algorithm for generation of pseudo-random numbers that is secure from a calculation amount. Generally, a random number sequence, $b_1, b_2, \ldots$, that is secure from a calculation amount are generated from initial value $x_0$ by the following expressions:

$$x_{i+1} = f(x_i) \ (i = 0, 1, \ldots) \quad (1)$$

$$b_{i+1} = g(x_{i+1}) \ (i = 0, 1, \ldots) \quad (2).$$

Figure 3:
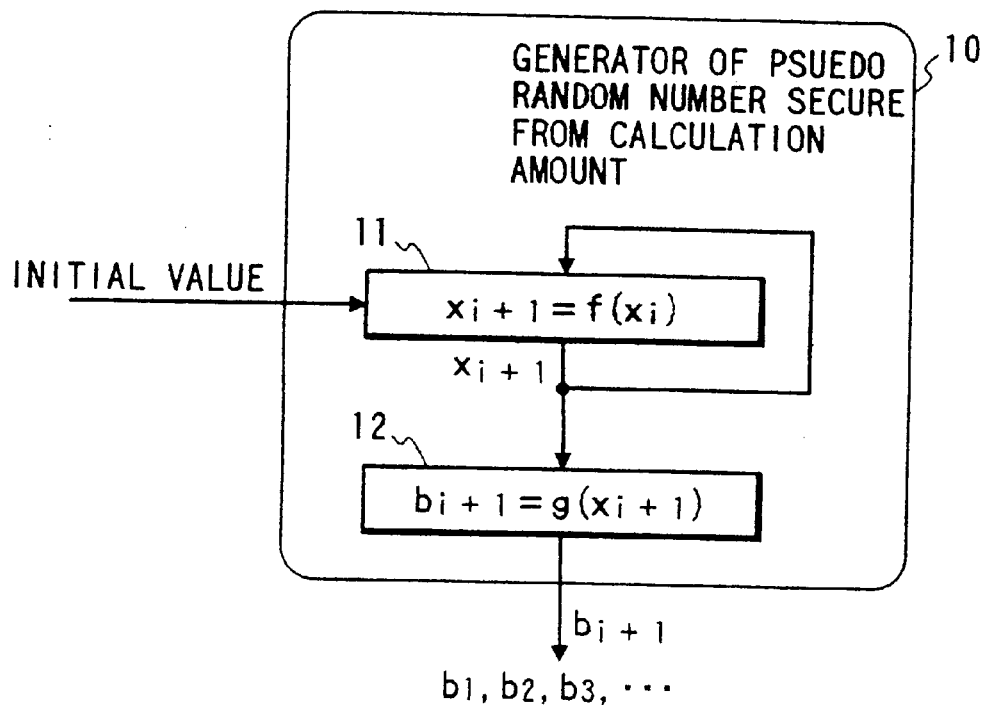
FIG. 3 is a block diagram illustrating a common pseudo-random number generator.

As is shown in FIG. 3, the pseudo-random number generator 10 comprises a processor 11 for performing feedback calculation by expression (1), and a processor 12 for calculating expression (2). The operation of the pseudo-random number generator 10 is as follows:

1. Initial value $x_0$ is input to the pseudo-random number generator 10.

2. Generated by expression (1) are $x_1, x_2, \ldots, x_i$.

3. The $x_1, x_2, \ldots, x_i$ that are generated are substituted into expression (2), and the obtained $b_1, b_2, \ldots, b_i$ are output as pseudo-random numbers.

The computing unit 20 shown in FIG. 1 converts the acquired $b_1, b_2, \ldots, b$ into a series of keys for block cryptography. Each key for block cryptography is a series of bits having a length that is defined by the algorithm of the employed block cryptography process. The keys are generated, for example, by dividing for each bit length a pseudo-random number sequence, $b_1, b_2, \ldots, b_i$, that is secure from a calculation amount.

In FIG. 1. $M_{uv}$ (u=1, 2, . . . , t; v=1, 2, . . . , s) indicates a plaintext block; $k_u$ (u=1, 2, . . . , t) indicates a key for block cryptography; and $k_u(M_{uv})$ (u=1, 2, . . . , t; v=1, 2, . . . , s) indicates an enciphered text block that is acquired by enciphering plaintext block A, using cryptographic key $k_u$. Using the same key $K_u$, s blocks, from $M_{u1}$ to $M_{us}$, are enciphered.

Keys in a series, $k_1, k_2, \ldots$, that are updated by the pseudo-random number generator 10 and the computing unit 20 are employed in order as keys for block cryptography, and the plaintext blocks in FIG. 1 are enciphered by using a plurality of cryptographic keys.

With the above described conventional enciphering system, a limited number of plaintext blocks will be enciphered using the same key, and analysis of the key will be difficult.

Figure 4:
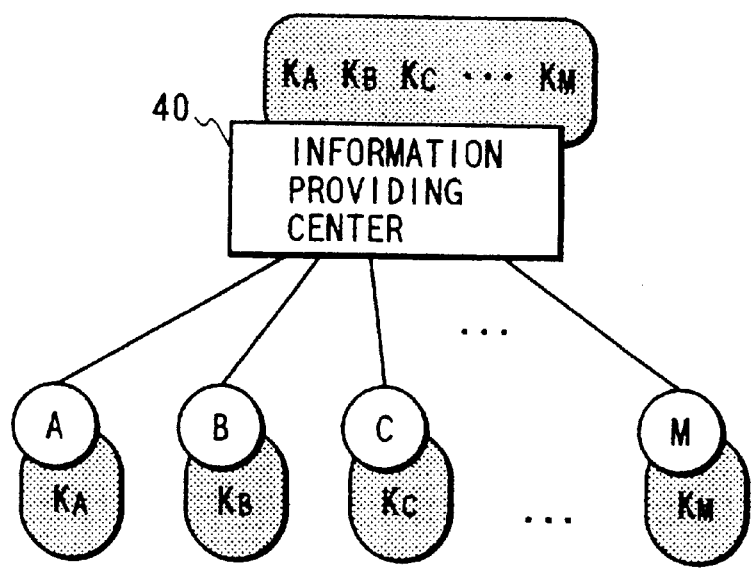
FIG. 4 is a block diagram illustrating a network across which information providing service as a basis for one embodiment is performed.

An explanation of an information providing service that employs the above enciphering system follows. A cryptographic communication network that performs the information providing service is constituted by an information providing center and users A, B. . . . , and M, as is shown in FIG. 4. The information providing center 40 and the users A through M employ in common inherent and secret keys that are provided in advance. The key string $K_A, K_B, \ldots$, and $K_M$ comprises respectively the key that is used in common by the information providing center 40 and user A, the key that is used in common by the information providing center 40 and user B, . . . , and the key that is used in common by the information providing center 40 and user M.

In addition, the information providing center 40, and each of the users A through M comprise the block encipherer 30, which performs enciphering (and deciphering) in accordance with an algorithm that is determined by a network; the pseudo-random number generator 10, which generates pseudo-random numbers that are secure from a calculation amount according to the algorithm for the network; and the computing unit 20, which converts the pseudo-random numbers that are output by the pseudo-random number generator 10 into a series of keys for the block encipherer 30.

To provide information for the user A from the information providing center 40 while using the above described enciphering system, the information providing service employs the following procedures.

1. The user A requests information that he or she needs from the information providing center 40.

2. As an initial value for the current communication, the information providing center 40 uses the secret key $K_A$, which is used in common with the user A, to set the pseudo-random number generator 10. The pseudo-random number generator 10 is operated and generates a random number sequence that is secure from a calculation amount. The computing unit 20 converts the generated pseudo-random number sequence into a series of keys for block cryptography. While these keys are being updated, they are employed as keys for block cryptography to encipher information that is provided by the block encipherer 30. The enciphered information is then transmitted to the user A.

3. As an initial value for the current communication, the user A uses the secret key $K_A$, which is used in common with the information providing center 40, to set the pseudo-random number generator 10. The pseudo-random number generator 10 is operated and generates a random number sequence that is secure from a calculation amount. The computing unit 20 converts the generated pseudo-random number sequence into a series of keys for block cryptography. While these keys are being updated, they are employed as keys for block cryptography by the block encipherer 30 to decipher the text that is transmitted by the information providing center 40. The user A thus obtains the provided information.

Through the above described procedures, the information providing service function is performed between the information providing center 40 and the authorized users A through M, who employ keys in common with the center 40. Since the information is provided according to these procedures, the information providing center 40 can transmit information to a requesting user while keeping it secret from all other users. Therefore, the information providing service can account for each user that has received information.

The first through fifth embodiment that are based on the system shown in FIG. 4 will now be described while referring to the accompanying drawings.

First Embodiment

Figure 5:
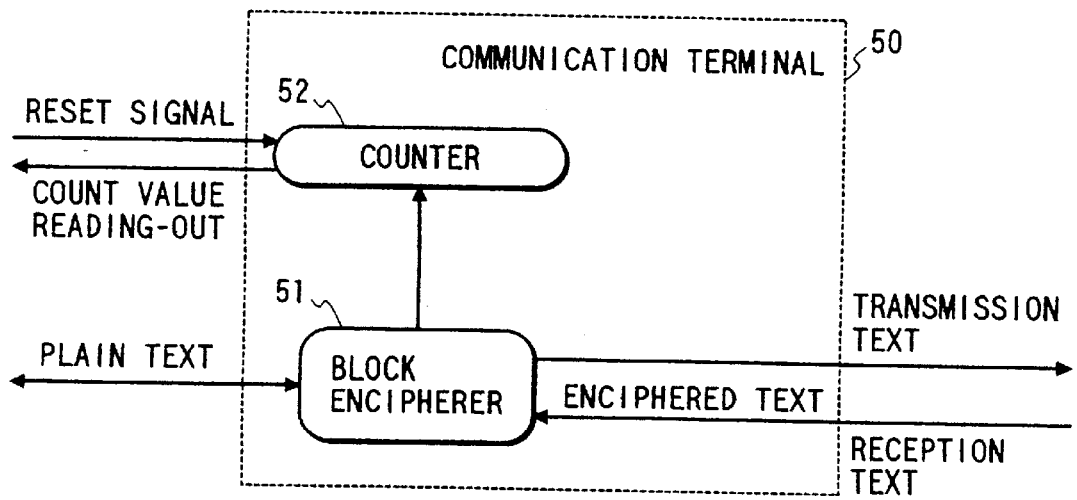
FIG. 5 is a block diagram illustrating a communication terminal according to a first embodiment of the present invention.

In this embodiment, as is shown in FIG. 5, an information providing center 40 employs a communication terminal 50, which comprises a block encipherer (hereafter referred to simply as an encipherer) 51 for performing enciphering (and deciphering) according to an algorithm that is specified by a network, and a counter 52 for obtaining a count of enciphered blocks.

Since a user does not need the counter 52 that is provided in the communication terminal 50 in FIG. 5, in the design of a communication terminal for a user the counter 52 is removed from the communication terminal 50 of the information providing center 40. However, when a user desires information concerning a service charge for providing information to his or her communication terminal, a communication terminal having the same structure as that of the communication terminal 50 may be employed.

The block encipherer 30 shown in FIG. 1 can serve as the encipherer 51. Since the input of data to the encipherer 51 is synchronized with an operation clock for the encipherer 51, the counter 52 counts the number of operation clocks for the encipherer 51 to acquire the number of blocks that are enciphered. Before the encipherer 51 is operated for enciphering, the value held by the counter 52 is reset using a reset signal. When the enciphering is completed, the value held by the counter 52 is read, and accounting is performed based on the acquired value.

A cryptographic communication network that performs an information providing service is constituted by the information providing center 40 and users A through M, as is shown in FIG. 4. The information providing center 40 and the users A through M use in common inherent and secret keys $K_A$, $K_B$, ..., and $K_M$, respectively. The information providing center 40 sets a key in advance for use on a common key with a specific user. Further, key joint ownership can be established by a well known system for establishing the joint ownership of a key, as is described in Tsujii and Kasahara, "Cryptography And Information Security", Shokosha Co., Ltd., pp. 72 and 73, and pp. 97 to 104, 1990.

The information providing center 40 acquires the count of enciphered blocks by using the counter 52, and assesses a charge in accordance with the block count. Through this procedure, an accounting system that reflects the characteristics of information, such as type and quality, can be provided. More specifically, the information providing center 40 specifies in advance, by block and in accordance with type or quality, charges for information that is to be provided, and thus, unlike conventional accounting for which charges are based on a communication time, is able to calculate flexible charges that are consonant with the value of the information that is actually provided. A user will pay the information providing center 40 an information providing service fee in consonance with the type, the quality and the quantity of the information that is provided.

Further, since the accounting charges are assessed on an individual unit basis, a user can request only part of a desired item of information when he or she does not exactly know what is contained in the requested information item, and can thus minimize a loss that may be incurred.

Second Embodiment

Figure 6:
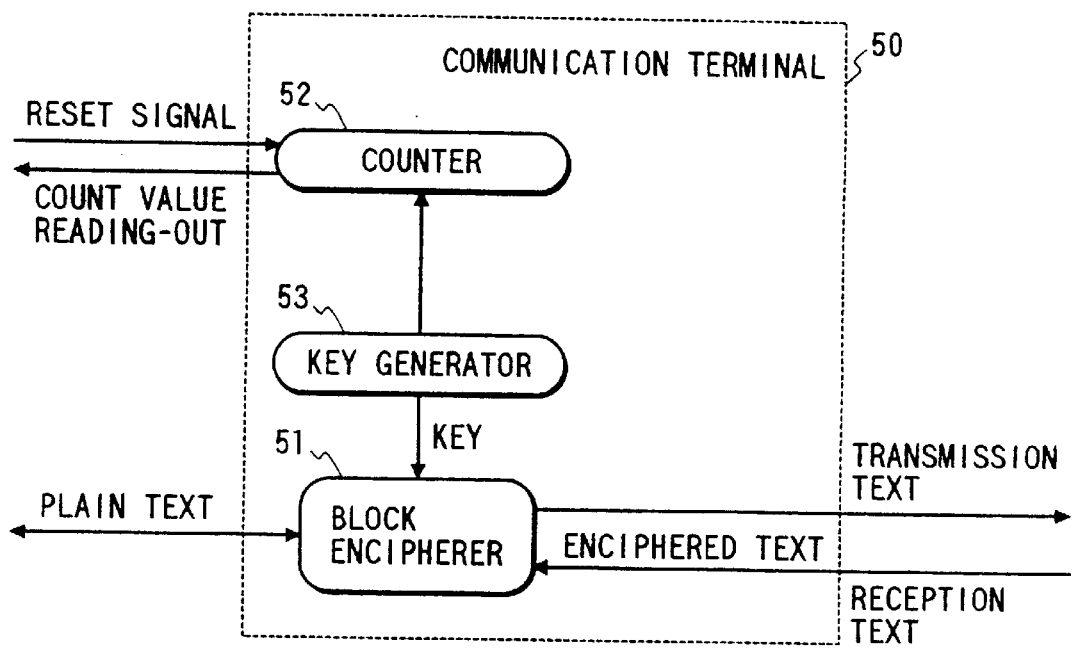
FIG. 6 is a block diagram illustrating a communication terminal according to a second embodiment of the present invention.

In this embodiment, as is shown in FIG. 6, an information providing center 40 employs a communication terminal 50, which comprises a block encipherer 51, for performing enciphering (and deciphering) according to an algorithm that is specified by a network; a key generator 53, for generating a cryptographic key; and a counter 52, for obtaining a count of cryptographic keys that are employed for enciphering.

Since a user does not need the counter 52 for his or her communication terminal, in the design of the communication terminal for a user the counter 52 is removed from the communication terminal 50 of the information providing center 40. However, when a user desires information concerning a service charge for providing information to his or her communication terminal, a communication terminal having the same structure as that shown in FIG. 6 may be employed.

A cryptographic communication network that furnishes an information providing service is constituted by the information providing center 40 and users A through M, as is shown in FIG. 4.

It should be noted that the counter 52 and the encipherer 51 in the first embodiment can be employed for this embodiment.

The key generator 53 generates, using the common key in FIG. 4, a key, in accordance with the algorithm that is specified by the network, to be used by the encipherer 51.

The counter 52 obtains the count of operation clocks for the key generator 53 in order to acquire the number of the cryptographic keys that are employed. Before the encipherer 51 begins the enciphering operation, the value held by the counter 52 is reset using a reset signal. When the enciphering has been completed, the value held by the counter 51 is read, and the accounting calculations are performed based on the value that is read.

Third Embodiment

Figure 7:
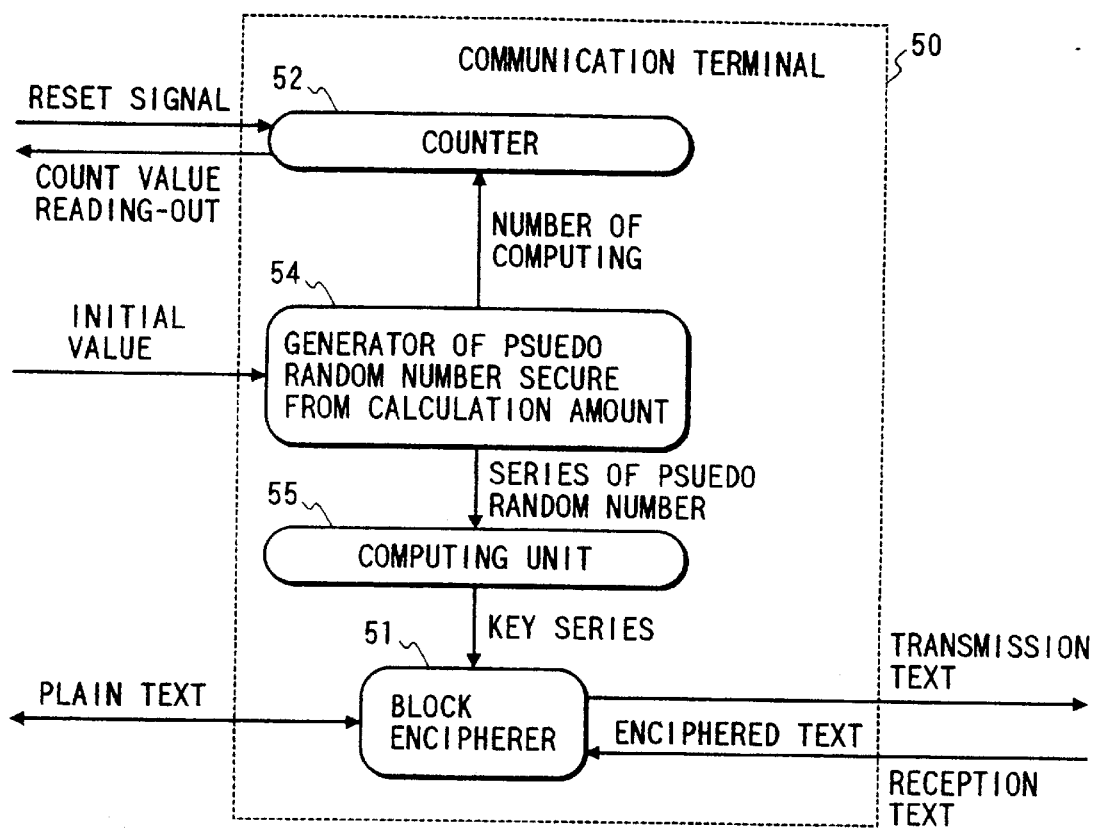
FIG. 7 is a block diagram illustrating a communication terminal according to a third embodiment of the present invention.

In this embodiment, as is shown in FIG. 7, an information providing center 40 employs a communication terminal 50, which comprises a block encipherer 51, for performing enciphering (and deciphering) according to an algorithm that is specified by a network; a pseudo-random number generator 54, for generating pseudo-random numbers, which are secure from a calculation amount, according to the algorithm that is specified by the network; a computing unit 55, for converting pseudo-random numbers that are output by the pseudo-random number generator 54 into a series of keys for the encipherer 51; and a counter 52, for obtaining the count of feedback calculation repetitions since communication was initiated that are required for the generation of pseudo-random numbers that are secure from a calculation amount. The count of feedback calculations that are required for the generation of pseudo-random numbers that are secure from a calculation amount is defined as a pseudo-random number generation calculation count.

The counter 52 obtains the count of operation clocks of the pseudo-random number generator 53 to acquire the number of feedback calculations. Before the encipherer 51 begins the enciphering operation, the value held by the counter 52 is reset using a reset signal. When the enciphering is completed, the value held by the counter 52 is read, and the accounting calculations are performed based on the value that is read.

Figure 8:
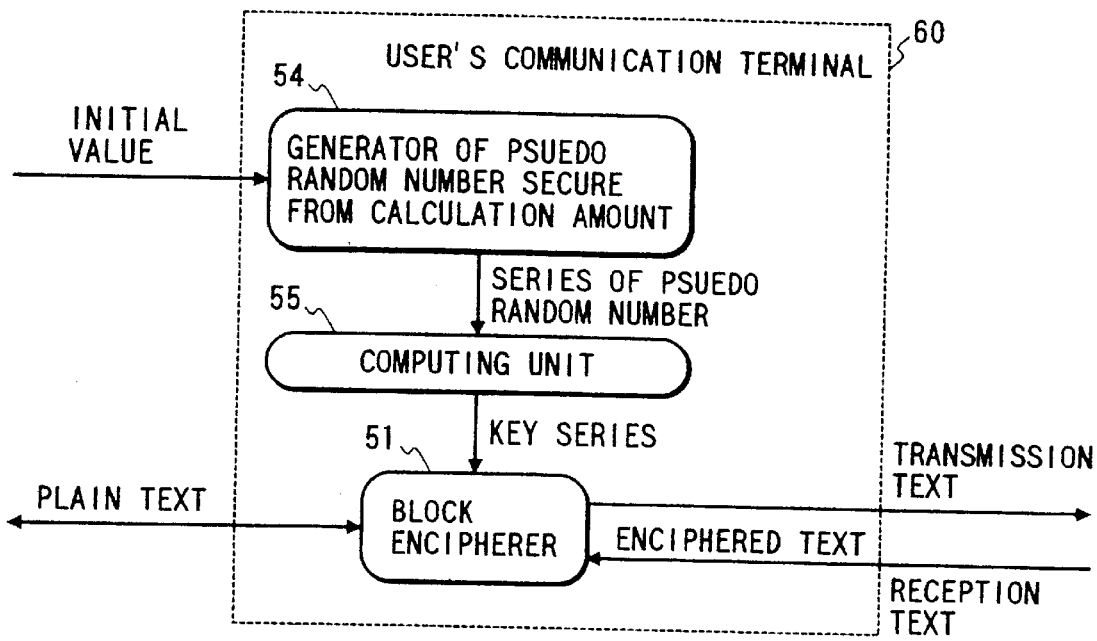
FIG. 8 is a block diagram illustrating a communication terminal for a user according to the third embodiment of the present invention.

Since a user does not need the counter 52 for his or her communication terminal 60, as is shown in FIG. 8, in the design of the communication terminal 60 the counter 52 is removed from the communication terminal 50 of the information providing center 40. However, when a user desires information concerning a service charge for providing information to the communication terminal 60, a communication terminal 60 having the same structure as that of a communication terminal 50 shown in FIG. 9 may be employed. In this case, a display device 56 for displaying a service fee can be provided.

Figure 9:
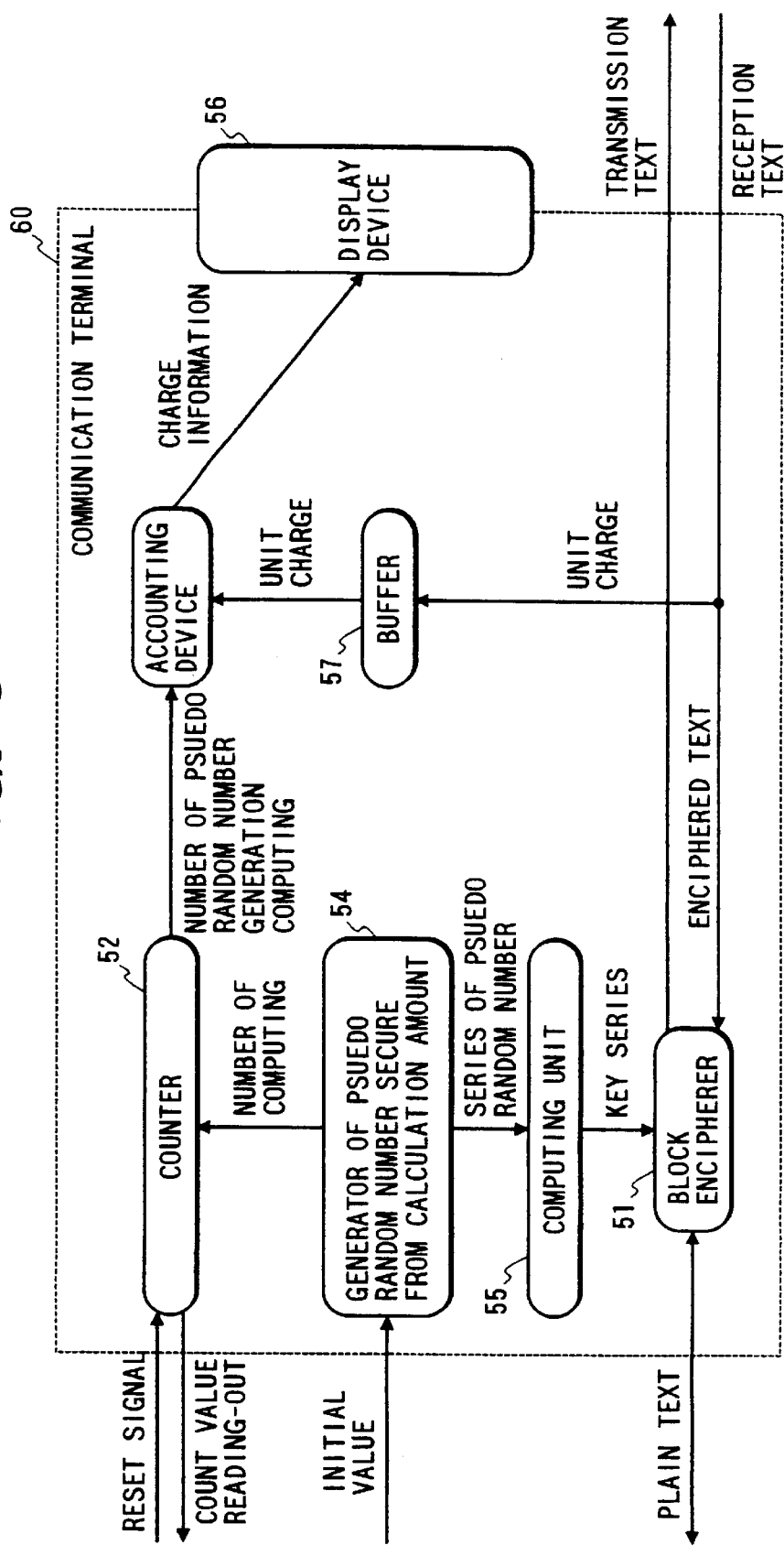
FIG. 9 is a block diagram illustrating a communication terminal that has a display device according to the first and the third embodiment of the present invention.

The communication terminal 60 for a user in FIG. 9 holds in a buffer 57 a unit charge that is transmitted from an information provider, as will be described later in "Information providing preprocedures of the present invention". Then, from the unit charge that is held in the buffer 57 and the pseudo-random number generation calculation count that is held by the counter 52, a fee for the information providing service is calculated using a service fee calculation, as will be described later in "Accounting procedures of the present invention", and the acquired fee is displayed on the display device 56. With such a display device 56 provided for the communication terminal 60, a user can confirm later that a service fee that is charged by the information providing center 40 is fair.

It should be noted that the encipherer 51, the pseudo-random number generator 54, and the computing unit 55 in FIG. 1 can be employed for this embodiment. Further, the cryptographic communication network shown in FIG. 4 is used.

In this embodiment, enciphering (deciphering) is performed while the key for block cryptography is updated for each of s blocks using a series of keys that is generated by the pseudo-random number generator 54 and the computing unit 55. The value for the variable s is determined by employing a pseudo-random number generation rate for the pseudo-random number generator 54 and an enciphering (deciphering) rate for the block encipherer 51 (see the above described reference for the details). In a system that specifies the number s, the number of feedback calculations that is performed by the pseudo-random number generator 54 is substantially proportional to the amount of information to be enciphered (deciphered). Similarly, the number of keys for block cryptography that are used for updating during the enciphering of information is substantially proportional to the amount of information to be enciphered (deciphered).

When a charge is to be calculated by using proportional segments of a quantity of enciphered information, one of the following size specifications can be employed as an information quantity unit for accounting:

(a) one block;

(b) the amount of information that is enciphered (deciphered) while one key is used; and (c) the amount of information that is enciphered (deciphered) during one feedback calculation.

In this embodiment, (c) the amount of information that is enciphered (deciphered) during one feedback calculation is employed as an information quantity unit for accounting purposes. The unit size specified in (a) and (b) will be explained later in a fourth embodiment.

In other words, in this embodiment, a charge is assessed each time a feedback calculation is performed by the pseudo-random number generator 54.

Figure 10:
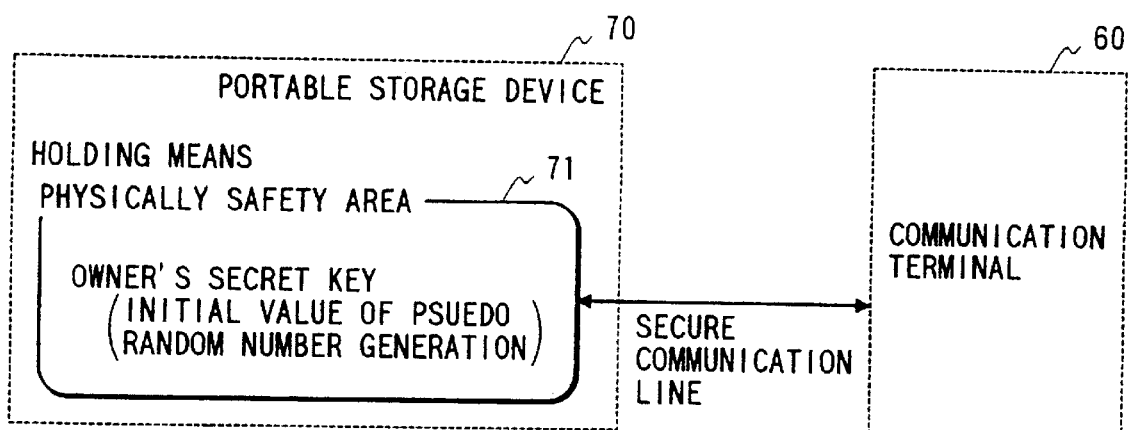
FIG. 10 is a block diagram illustrating a portable storage device according to the third embodiment of the present invention.

In this embodiment, the users A through M of the cryptographic communication network in FIG. 4 that provides an information providing service have a portable storage device 70 shown in FIG. 10. A secret key, belonging to the user that owns the portable storage device 70, that is required for cryptographic communication is stored in the portable storage device 70. If a user other than the owner knows the secret key, secret communication is not performed and an authentic information providing service can not be provided. Therefore, while taking security into consideration so as to restrict access to a secret key to the owner only, the portable storage device 70 is provided for each user, in addition to the communication terminal 50.

Although the portable storage device 70 may be part of the communication terminal 60, so long as a physically secure area can be ensured for each user, the communication terminal 60 that can be used for cryptographic communication by each other is limited. As is shown in this embodiment, it is better for the communication terminal 60 and the portable storage device 70 to be separately provided and for the secret information belonging to each user to be not stored in the communication terminal 60. With this arrangement, which is convenient for a user, whatever type of communication terminal 60 a user may use, the user can exchange secret information via his or her own portable storage device 70 for cryptographic communication.

As is shown in FIG. 10, the portable storage device 70 can exchange information with the communication terminal 60 across a safe communication path, and as a physically secure area, has holding means 71. Only an authorized owner can correctly operate the portable storage device 70, and a procedure for the verification of a password, etc., is performed to determine whether or not a user is an authorized owner. An IC card, etc., is employed as the portable storage device 70.

Figure 11:
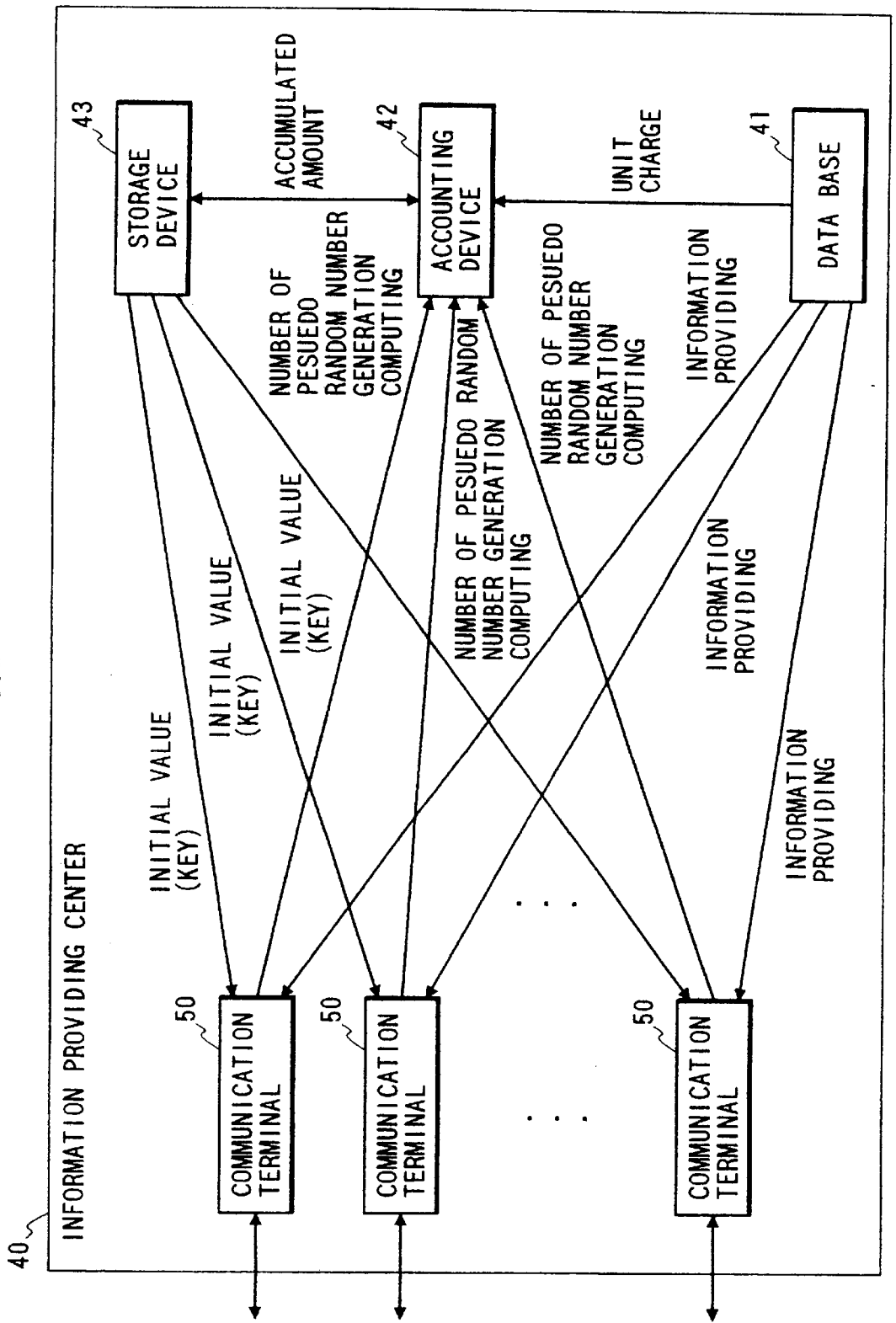
FIG. 11 is a block diagram illustrating an information providing center according to the third embodiment of the present invention.

As is shown in FIG. 11, the information providing center 40 comprises at least each of the following components: the communication terminal 50; a database 41, wherein information to be provided is stored; an accounting device 42, for calculating a charge for each quantity unit of information that is provided; and a storage device 43, wherein are stored the secret keys of all the users, which are required for cryptographic communication, and service fee information. In FIG. 11, a plurality of communication terminals 50 are provided to enable the simultaneous transmission of information to a plurality of users. For a larger information providing system, more than one database 41, accounting device 42 and storage device 43 may be provided.

Figure 12:
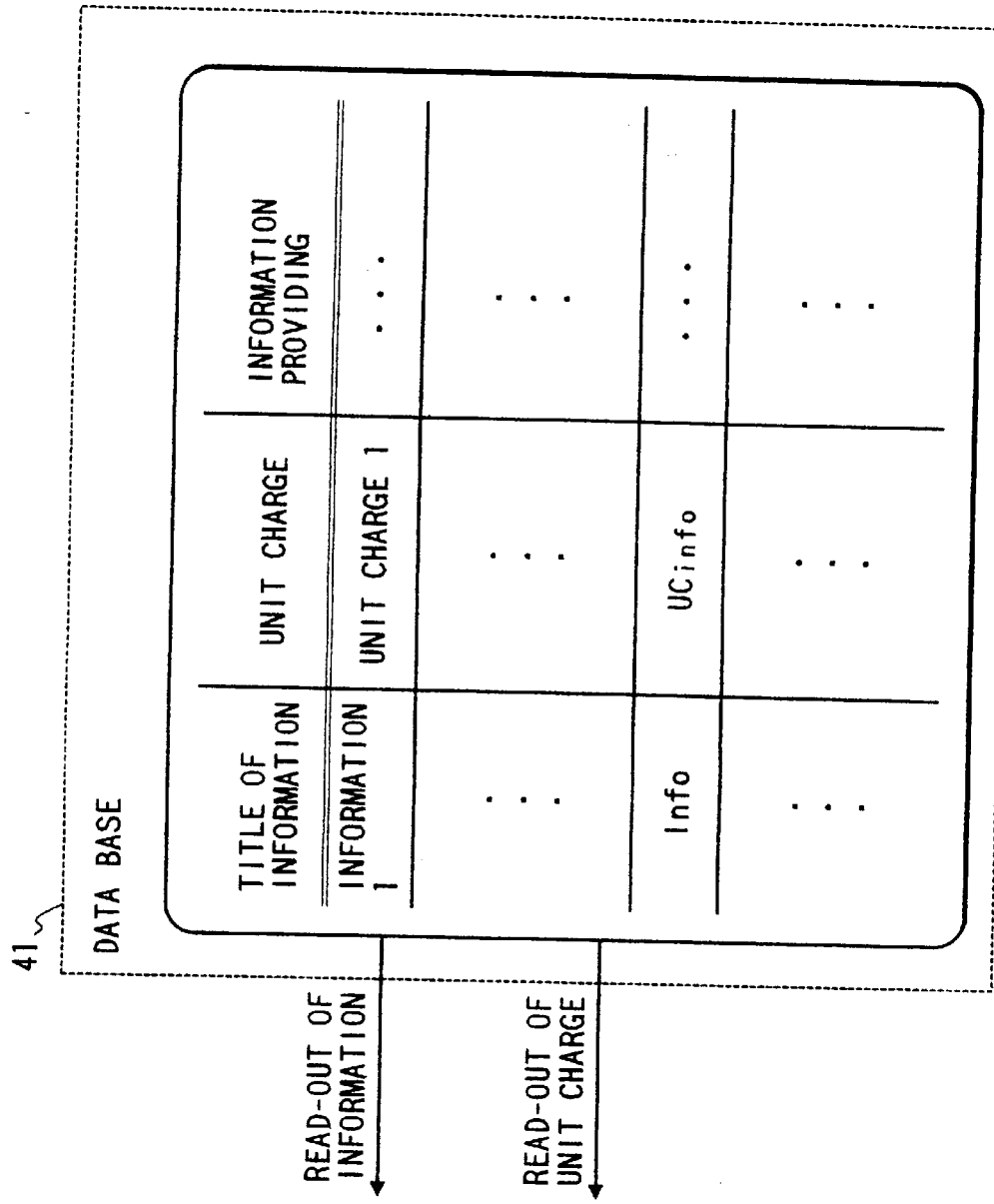
FIG. 12 is a block diagram illustrating a database according to the third embodiment of the present invention.

In the database 41 that is designed as is shown in FIG. 12 are stored information that is to be provided for users and a corresponding charge for an information quantity unit. The charge for a quantity unit that differs depending on the information types is called a unit charge. A name is given to information so that a user can specify information. The above described database 41 can be easily designed by using a conventional database as a base.

Figure 13:
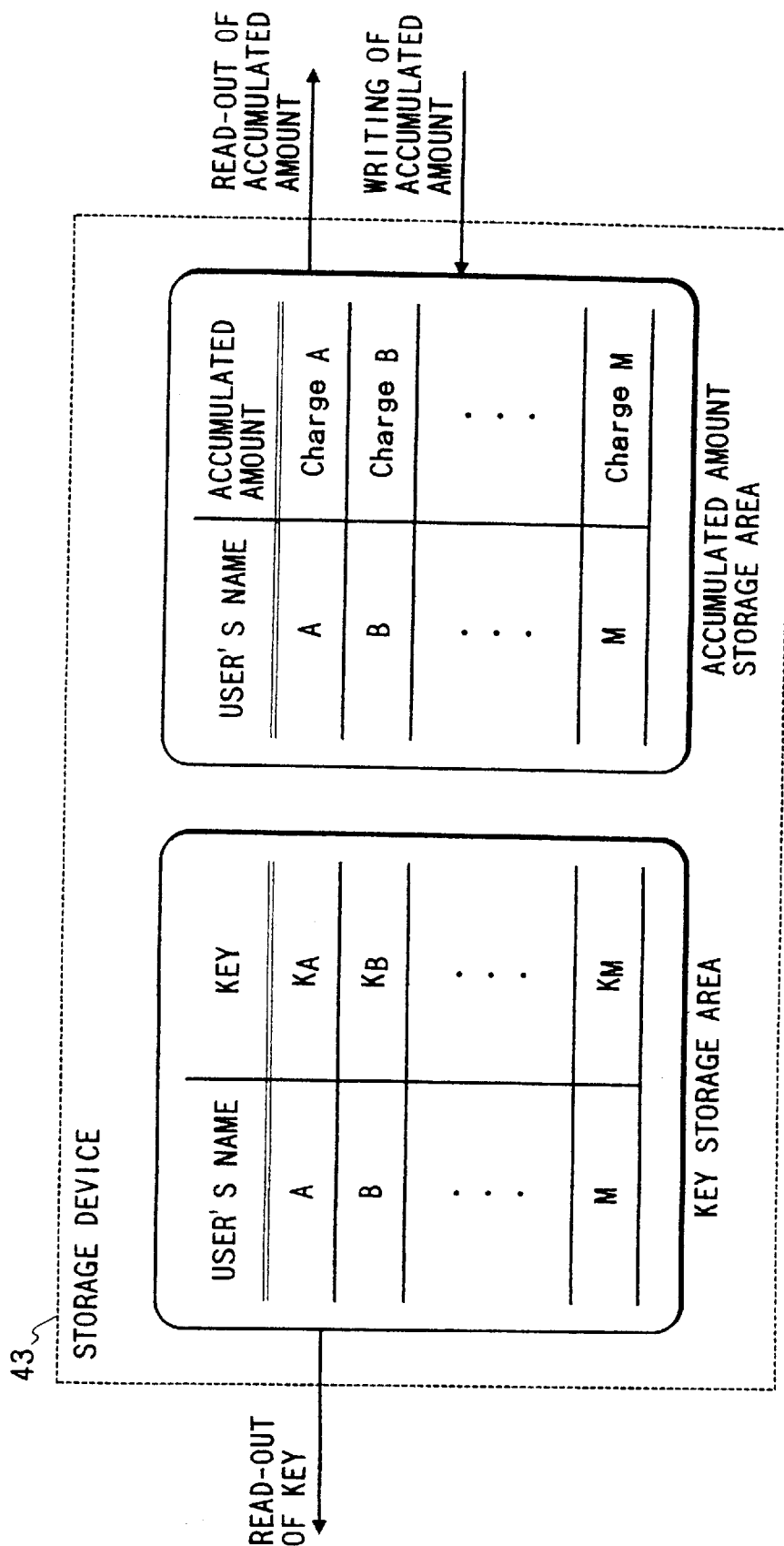
FIG. 13 is a block diagram illustrating a storage device according to the third embodiment of the present invention.

The storage device 43 that is designed as is shown in FIG. 13 has a key storage area, in which a secret key that is required for cryptographic communication is stored for each user who is a member of the information providing network; and a cumulative account total storage area, in which is stored a accumulative account total of service fees assessed during a specific period. This period is called a service fee totalization period. The fee totalization period is specified as one month, for example. The information providing center 40 employs the cumulative fee total for each user that is stored in the cumulative account total storage area to calculate an information providing service fee for each user during the fee totalization period, and charges the user the calculated fee. When a specific fee totalization period has expired the service fee for each user during the period that it was stored in the cumulative account total storage area is shifted as backup information to;another storage means, and a service fee for each user in the cumulative account total storage area is reset.

Figure 14:
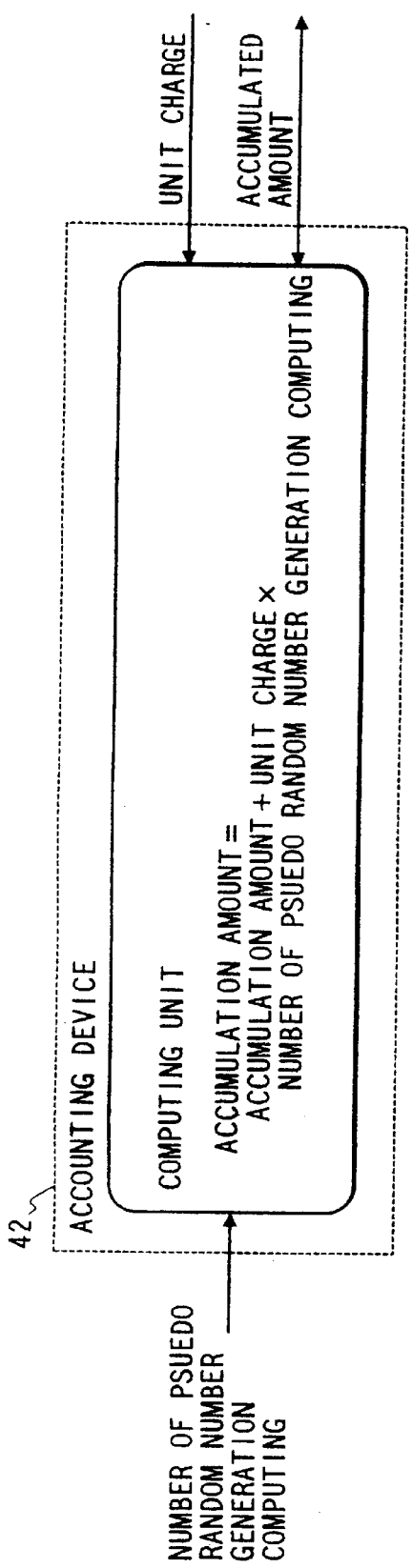
FIG. 14 is a block diagram illustrating an accounting device according to the third embodiment of the present invention.

The accounting device 42 is designed as is shown in FIG. 14. The accounting device 42, which calculates the fee for information that is currently being provided, can extract unit charge information from the database 41. When the communication is terminated, the accounting device 42 can extract the pseudo-random number generation calculation count from the counter 52 in the communication terminal 50. In addition, the accounting device 42 calculates an information service fee by using the unit charge information and the pseudo-random number generation calculation count, adds the service fee to the cumulative account total, of a user to whom information was provided, that is held in the storage device 43 to update the cumulative account total, and writes the new cumulative account total for the user in the cumulative account total storage area in the storage device 43.

An explanation will now be given for algorithms, for block cryptography and for the generation of pseudo-random numbers that are secure from a calculation amount and that are actually employed by the communication terminal in this embodiment.

In this embodiment, DES cryptography is used as an algorithm for block cryptography and a square-type pseudo-random number is employed as an algorithm for generating pseudo-random numbers that are secure from a calculation amount. The DES cryptography is common-key block cryptography having a block length of 64 bits, and a key is 56 bits.

A square-type pseudo-random number sequence is a sequence $b_1, b_2, \ldots$, which is generated by the following procedures.

Square-type Pseudo-random Number Sequence

Supposing that p and q are prime numbers that satisfy $p \equiv q \equiv 3 \pmod 4$, and $N = p \cdot q$, a bit sequence, $b_1, b_2, \ldots$, which is acquired from initial value $x_0$ (x is an integer such that $1 \leq x_0 < N-1$) and the following reflexive relations:

$$x_{i+1} = x_i^2 \bmod N \ (i=0, 1, 2, \ldots) \quad (3)$$

$$b_i = \mathrm{lsbj}(x_i) \ (i=1, 2, \ldots) \quad (4),$$

is called a square-type pseudo-random number sequence.

It should be noted that lsbj(xi) represents the lower j bits, and when the number of bits for modulo N is n, $j = O(\log_2 n)$.

The square-type pseudo-random number sequence is one that is secure from a calculation amount when it is assumed that determination of a root remainder for N is difficult from the view of a calculation amount.

Figure 15:
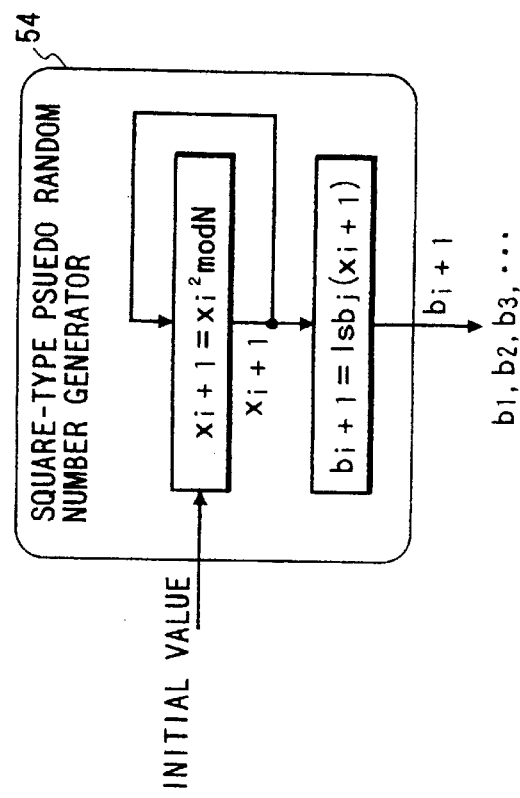
FIG. 15 is a block diagram illustrating a pseudo-random number generator that employs a square-type pseudo-random number according to the third embodiment of the present invention.

The pseudo-random number generator 54 for generating the square-type pseudo-random number sequence is shown in FIG. 15.

In order to adequately secure the square-type pseudo-random numbers, bit count n for modulo N in the square expression (3) is 512. Secret keys (initial values for the pseudo-random number generator 54) $K_A, K_B, \ldots$, which are employed in common between the information providing center 40 and the individual subscribers, are $1 < K_A, K_B, \ldots, < N-1$.

When the user A in FIG. 4 specific information from the information providing center 40, the information providing center 40 transmits the requested information to the user A, and in accordance with the following procedures, charges the user a fee for the information providing service.

It is assumed that the user A has received the information service from the information providing center 40 several times during a current service fee totalization period, and that the accumulative charge for the user A for the current period, which is stored in the cumulative account total storage area in the storage device 43, is $\mathrm{Charge}_A$. Further, it is assumed that the name of the information for which the user A requests the service is Info, and that a unit charge (charge for one feedback calculation) for Info is $UC_{Info}$. Although the user A is notified of the information name Info and the unit charge $UC_{Info}$, the user A does not have precise information concerning the contents, and thus first requests the information providing center 40 to provide a part of the information Info. It should be noted that the size of a part of the information is sufficiently large for the feedback calculation according to expression (3) to be performed i times in order to carry out the supplying of cryptographic information.

In the following explanation, it is assumed that authorization of the authentic user A to use his or her own portable storage device 70 has been obtained, and that the portable storage device 70 is so set in the operating state that it can communicate with the communication terminal 60. In addition, it is assumed that authorization has been obtained for the user A, as an authentic subscriber, to use the information providing center 40. The two authorizations can be provided by a well known authorization technique.

Information Providing Preprocedures of the Present Invention

1. The user A requests that the information providing center 40 provide for the service for Info, detailing at the same time that part of the information that is desired.

2. Upon the request from the user A that the service for Info be provided, the information providing center 40 calculates a charge for the information providing service by using the unit charge $UC_{Info}$ for Info and the part of the information that is requested by the user, and transmits the obtained service fee information to the user A. When the user A employs the communication terminal 60 shown in FIG. 9, the unit charge $UC_{Info}$ is also transmitted to the user A.

3. If the user A agrees with the received service fee information relative to the requested part of Info, the user A requests that the information providing center 40 provide the service for Info. When the user A employs the communication terminal 60 shown in FIG. 11, the received unit charge $UC_{Info}$ is held in the buffer 57.

If the user does not agree with the received service fee information, the user requests that the information providing center 40 cancel the service for Info, and this procedure is thereafter terminated.

The following procedure is employed when the user A requests that the information providing center 40 provide the service for information Info.

Information Providing Procedures of the Present Invention (for Information Providing Center)

1. The counter 52 of the communication terminal 50 that is used for communication with the user A is reset.

2. For the generation of pseudo-random numbers, secret key $K_A$, which is held for user A in the key storage area in the storage device 43, is set as initial value $x_0$ for the pseudo-random number generator 54 in the communication terminal 50.

3. The pseudo-random number generator 54 of the communication terminal 50, which is used for communication with the user A, is operated to generate a pseudo-random number sequence that is secure from a calculation amount.

4. The computing unit 55 converts the generated pseudo-random number sequence into a series of keys for block cryptography.

5. The series of keys that is output by the computing unit 55 is updated as keys for block cryptography, and the encipherer 51 employs the keys to convert the requested part of the information Info into enciphered text. When the enciphering is completed, the pseudo-random number generation calculation count, which is held by the counter 52 of the communication terminal 50, is incremented to i.

Information Providing Procedures of the Present Invention (for User A)

1. For the generation of pseudo-random numbers, the secret key $K_A$, which is held in the portable storage device 70, is set as initial value $x_0$ for the pseudo-random number generator 54 in the communication terminal 60.

2. The pseudo-random number generator 54 of the communication terminal 60 is operated to generate a pseudo-random number sequence that is secure from a calculation amount.

3. The computing unit 55 converts the generated pseudo-random number sequence into a series of keys for block cryptography.

4. The series of keys that is output by the computing unit 55 is updated as keys for block cryptography, and the encipherer 51 employs the keys to convert the enciphered text into plaintext.

The accounting procedures employed after the service for Info from the information providing center 40 is terminated are shown below.

Accounting Procedures of the Present Invention (for Information Providing Center)

1. The accounting device 42 extracts the unit charge information $UC_{Info}$ for Info from the database 41, and also the pseudo-random number generation calculation count i from the counter 52 of the communication terminal 50, which performs the communication with the user A.

2. The accounting device 42 calculates an information service fee by using the unit charge information $UC_{Info}$ and the pseudo-random number generation calculation count i. In this case, the fee is $i \times UC_{Info}$.

3. The accounting device 42 adds charge $i \times UC_{Info}$ to the cumulative account total Charges that is held in the storage device 43 for the user A to acquire new cumulative account total $Charge_A + i \times UC_{Info}$. The accounting device 42 writes the new cumulative account total $Charge_A + i \times UC_{Info}$ to the cumulative account total storage area for the user A in the storage device 43.

Each time the service fee totalization period expires, the information providing center 40 charges individual users the cumulative account total user fees. Further, when the service fee totalization period has expired, the service charge, for each user for the period, that is held in the cumulative account total storage area is moved as backup information to another storage means, and the service fee for each user in the cumulative account total storage area is reset.

Through the above described procedures, an accounting system that reflects the type and quality of information can be provided. More specifically, in advance, the information providing center 40 specifies a unit charge for information to be provided that is in consonance with the information type or quality, and can thus assess a flexible charge in accordance with the value of information, unlike conventional accounting, which depends on a communication time. A user will pay the information providing center 40 an information providing service fee that is in consonance with the type, the quality and the quantity of the provided information.

Further, since a fee is assessed for each unit, a user can request only a part of the desired information when he or she does not exactly know the contents of the desired information, and can thus minimize any loss that may be incurred.

In "Accounting procedures of the present invention" described above, a fee for each feedback calculation is employed as unit charge information $UC_{Info}$. However, the accounting method of the present invention also includes a method whereby unit charge information is employed a plurality of times (e.g., w times) as a fee for feedback calculations and a charge is assessed each time the pseudo-random number generation calculation count is a multiple of w.

For "Information providing procedures of the present invention" described above, there is a method whereby from the beginning the obtained pseudo-random number sequence is divided by the computing unit 55 into individual key bit lengths (56 bits each) for DES cryptography, and the divided bit sets are employed as keys for the DES cryptography. Another method, whereby the computing unit 55 converts the pseudo-random number sequence into the series of keys for the DES cryptography, may be employed so long as it is common to a network that offers information providing service.

Any number of blocks may be enciphered (deciphered) using one specific key, so long as the blocks are used in common for a network that offers information providing service. Further, the bit count that is determined by expression (4) can be used as be. Although the modulo N in the square calculation is 512 bits, any other bit count can be used, so long as it can be secure from a calculation amount.

Although DES cryptography is employed as block cryptography in this embodiment, the cryptography used is not limited to DES, and any other common-key cryptography, such as FEAL cryptography, can be used. In addition, although a single DES encipherer is used as the encipherer 51, a plurality of DES encipherers or a combination of a DES encipherer and a FEAL encipherer can be employed.

Further, although the square-type pseudo-random numbers are used as an algorithm for generation of pseudo-random numbers that are secure for a calculation amount, another algorithm that is used to generate pseudo-random numbers that are secure from a calculation amount can be used. As is described in the above reference, Tsujii and Kasahara, "Cryptography and Information Security", Shokosha, p. 86, 1990, for example, an algorithm for which RSA cryptography, discrete logarithms, or reciprocal cryptography is employed can also be applied as the algorithm for the present invention for the generation of pseudo-random numbers.

Fourth Embodiment

When a charge that is assessed is proportional to the amount of enciphered information, the unit sizes specified in (a), (b) or (c) in the third embodiment can be employed as information quantity units for accounting purposes. In the third embodiment, (c) the amount of information that is enciphered (deciphered) during one feedback calculation was employed as the information quantity unit. In this embodiment, the other two sizes specified in (a) and (b) are employed as units. In FIG. 12 is shown a terminal 50 for which "(a) one block" is employed as an information quantity unit, and in FIG. 13 is shown a communication terminal 50 for which "(b) the amount of information that is enciphered (deciphered) while one key is used" is employed as an information quantity unit.

Figure 16:
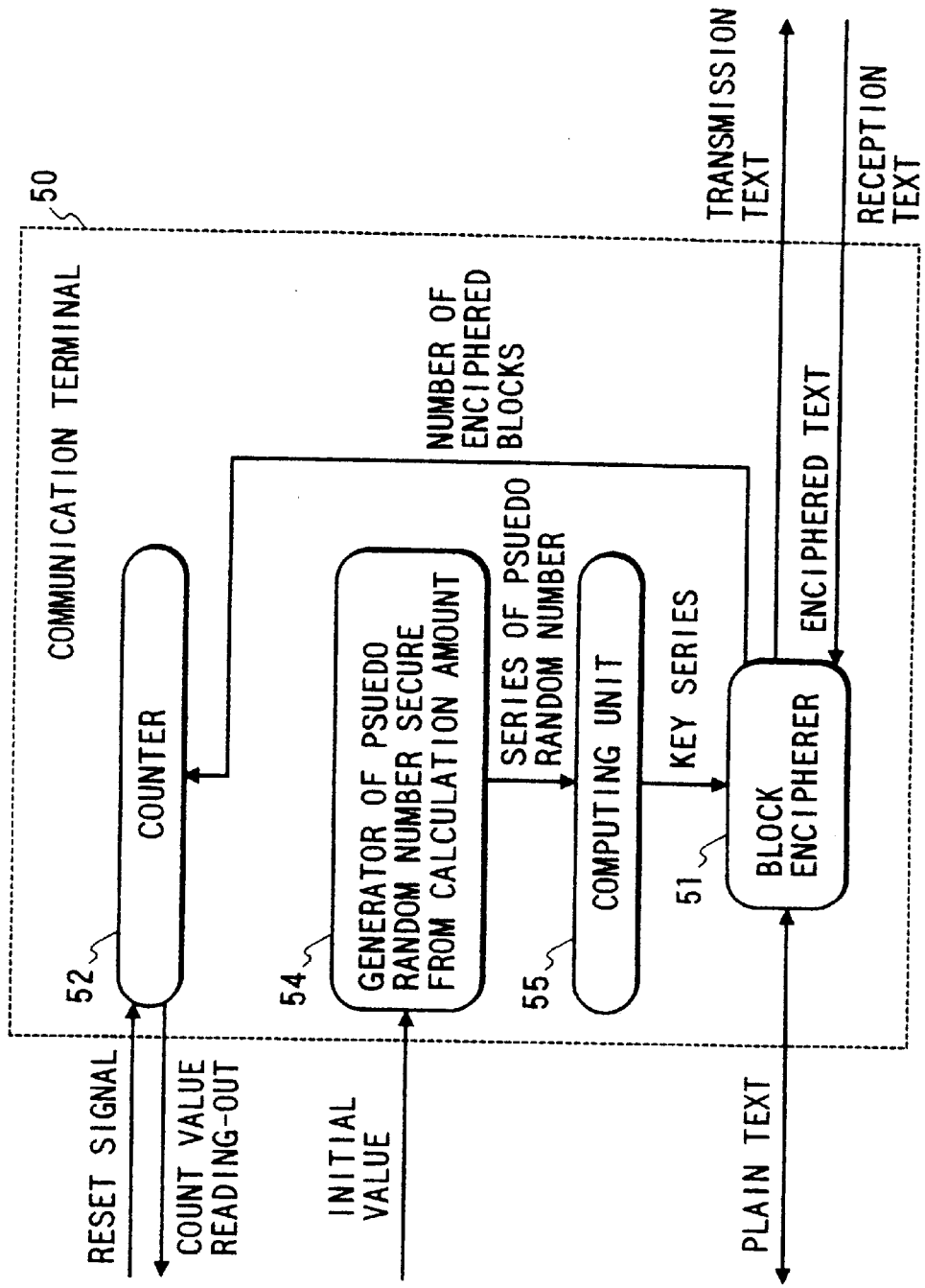
FIG. 16 is a block diagram illustrating a communication terminal according to a fourth embodiment of the present invention.

The communication terminal 50 in FIG. 16 comprises an encipherer 51, for performing enciphering (deciphering) according to an algorithm that is specified by a network; a pseudo-random number generator 54, for generating pseudo-random numbers, which are secure from a calculation amount, according to an algorithm that is specified by the network; a computing unit 55, for converging pseudo-random numbers, which are output by the pseudo-random number generator 54, to provide a series of keys for the encipherer 51; and a counter 52, for obtaining the count of blocks that are enciphered to provide information.

Figure 17:
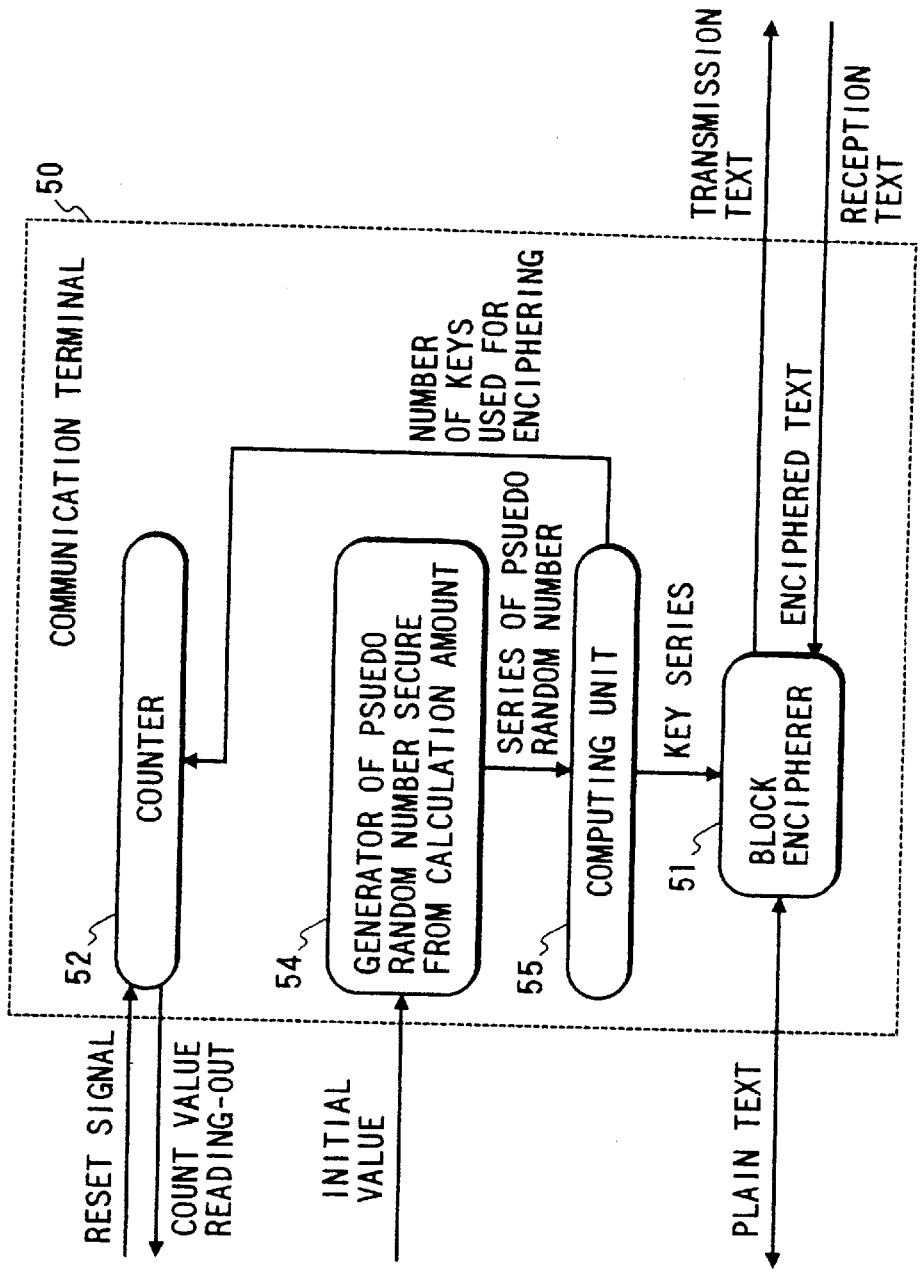
FIG. 17 is a block diagram illustrating a communication terminal according to the fourth embodiment of the present invention.

The communication terminal 50 in FIG. 17 comprises an encipherer 51, for performing enciphering (deciphering) according to an algorithm that is specified by a network; a pseudo-random number generator 54, for generating pseudo-random numbers, which are secure from a calculation amount, according to an algorithm that is specified by the network; a computing unit 55, for converging pseudo-random numbers, which are output by the pseudo-random number generator 54, to provide a series of keys for the encipherer 51; and a counter 52, for obtaining the count of cryptographic keys that are employed to provide information.

Even when the communication terminal 50 in FIG. 16 or FIG. 17 is employed, the other components of an information communication network are the same as those in the third embodiment. Although the information providing procedures are basically the same, a unit charge for a database 41 of an information providing center 40 is a charge for one block, or a charge for one key. The display device 56 shown in FIG. 9 can be provided for both communication terminals 50 in FIGS. 16 and 17.

Fifth Embodiment

In the third embodiment, since a key that is employed in common between the information providing center 40 and each user is fixed, the initial value for the pseudo-random number generator 54 is a constant value when the user is the same. Since the same enciphered text is generated for transmitting the same information, the security is inadequately maintained.

In this embodiment, even if the user is the same, the initial value of the pseudo-random number generator is altered each time to improve security.

An explanation will be given for a case wherein DES cryptography is employed as an algorithm for block cryptography and square-type pseudo-random numbers are employed as an algorithm for generating pseudo-random numbers that are secure from a calculation amount.

Figure 18:
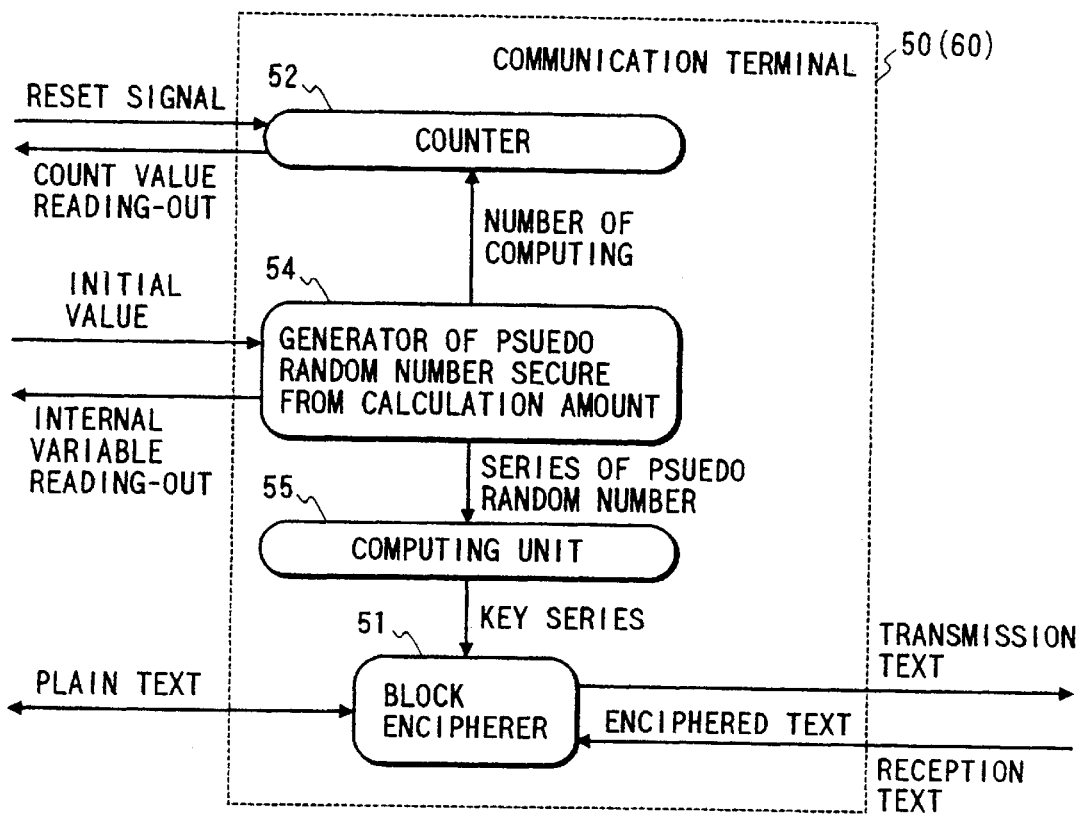
FIG. 18 is a block diagram illustrating a communication terminal according to a fifth embodiment of the present invention.

In this embodiment, as is shown in FIG. 18, a user who receives information servicing and an information providing center 40 have, respectively, the communication terminals 60 and 50, each of which comprises an encipherer 51, for performing enciphering (deciphering) according to an algorithm that is specified by a network; a pseudo-random number generator 54, for generating pseudo-random numbers that are secure from a calculation amount according to an algorithm that is specified by the network; a computing unit 55, for converting pseudo-random numbers that are output from the pseudo-random number generator 54 to obtain a series of keys for the encipherer 51; and a counter 52, for providing a count of feedback calculations, which are required for the generation of pseudo-random numbers that are secure from a calculation amount, that have been performed since the initiation of communication.

In expressions (3) and (4) in the third embodiment, which are the procedures for generating pseudo-random numbers, $x_{i+1}$, which is sequentially updated by the feedback calculation, is called an internal variable of the pseudo-random number generator 54.

Figure 19:
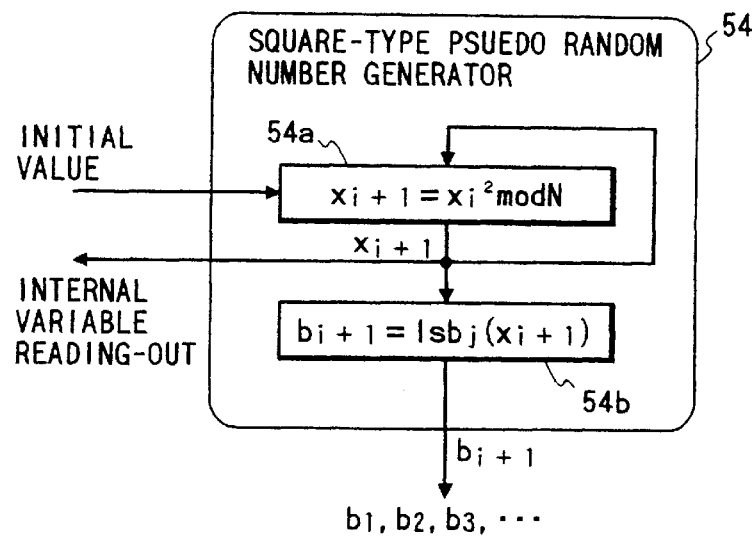
FIG. 19 is a block diagram illustrating a pseudo-random number generator that employs a square-type pseudo-random number according to the fifth embodiment of the present invention.

The pseudo-random number generator 54 in this embodiment includes a processor 54a for performing feedback calculation of expression (3) and a processor 54b for performing feedback calculation of expression (4), as is shown in FIG. 19, and reads the internal variable that is updated by expression (3).

At the communication terminal 50 of the information providing center 40, the internal variable that is read is stored in a key storage area in a storage device 43. At the communication terminal 60 of a user, the internal variable is stored in holding means 71 of a portable storage device 70. In the third embodiment, only the initial value from the storage device 43 is set to the pseudo-random number generator 54, or only the initial value from the portable storage device 70 is set to the pseudo-random number generator 54, and the movement of data is unidirectional. In this embodiment, in the reverse direction, the internal variable in the pseudo-random number generator 54 can be read. A common key, which was used for the current information servicing, is then replaced by the internal variable that was read and that will be used as a common key for the next information servicing.

An accounting device 42 in this embodiment has the same structure as in the third embodiment.

As well as in the third embodiment, an explanation will be given for a case wherein a user A receives information from the information providing center 40 a across the network shown in FIG. 4. It is assumed that the name of the information that the user A requests is Info, and that the requested amount of information is sufficiently large for the feedback calculation of expression (3) to be performed i times for cryptographic communication. As the "Information providing prepocedures of the present invention" and Accounting procedures of the present invention (for information providing center)" are performed in the same manner as those in the third embodiment, an explanation for them will not be given.

The following procedures are performed when the user A requests that the information providing center 40 provide the service for the information Info.

Information Providing Procedures of the Present Invention (for Information Providing Center)

1. The counter 52 of the communication terminal 50 that is used for communication with the user A is reset.

2. For the generation of pseudo-random numbers, secret key $K_A$, which is held for the suer A in the key storage area in the storage device 43, is set as initial value $x_0$ for the pseudo-random number generator 54 in the communication terminal 50.

3. The pseudo-random number generator 54 of the communication terminal 50, which is used for communication with the user A, is operated to generate a pseudo-random number sequence that is secure from a calculation amount.

4. The computing unit 55 converts the generated pseudo-random number sequence into a series of keys for block cryptography.

5. The series of keys that is output by the computing unit 55 is updated as keys for block cryptography, and the encipherer 51 employs the keys to convert the requested part of the information Info into enciphered text. When the enciphering is completed, the pseudo-random number generation calculation count, which is held by the counter 52 of the communication terminal 50, is incremented to i, and an internal variable is $x_i$.

6. The internal variable $x_i$ is read from the storage device 43 by the pseudo-random number generator 54, and is held as a secret key $K_A$ for the user A in the key storage area in the storage device 43, so that the new key can be used for the next information servicing for the user A.

Information Providing Procedures of the Present Invention (for User A)

1. For the generation of pseudo-random numbers, the secret key $K_A$, which is held in the portable storage device 70, is set as initial value $x_0$ for the pseudo-random number generator 54 in the communication terminal 60.

2. The pseudo-random number generator 54 of the communication terminal 60 is operated to generate a pseudo-random number sequence that is secure from a calculation amount.

3. The computing unit 55 converts the generated pseudo-random number sequence into a series of keys for block cryptography.

4. The series of keys that is output by the computing unit 55 is updated as keys for block cryptography, and the encipherer 51 employs the keys to convert the enciphered text into plaintext.

5. The internal variable $x_i$ is read from the portable storage device 70 by the pseudo-random number generator 54, and is held as a secret key $K_A$ in the storage means of the portable storage device 70, so that the new key can be used for the next information request.

Through the above procedures, although information is requested by the same user, the initial value that is input to the pseudo-random number generator 54 differs for each information communication exchange. Thus the same key series is not generated by the pseudo-random number generator 54 and information that is provided to the same user can be enciphered by using a different key series for each communication exchange, and as a result, the security for block cryptography can be improved.

Further, in this embodiment as well as in the first embodiment, the unit sizes (a), (b) or (c) described above can be employed as information quantity units for calculating a charge that is proportional to the amount of information that is enciphered by the enciphering system of this embodiment.

In this embodiment, the unit amount of information for accounting purposes is defined as (c) the amount of information that is enciphered (deciphered) during one feedback calculation. The communication terminals 50 and 60, for which is employed "(a) one block" or "(b) the amount of information that is enciphered (deciphered) during the employment of one key" can be, designed with the same structure as in the third embodiment.

In addition, like the third embodiment, a display device 56 for displaying a service charge can be provided for both communication terminals 50 and 60. With the display device 56, a user can confirm later that the service fee that is charged by the information providing center 40 is fair.

As is described above, according to the above described embodiments, the accounting system that reflects the information type and the quality of the service can be provided. The information providing center can specify a unit charge for information to be provided in accordance with the information type or the service quality, so that a user can pay the information providing center an information providing service fee that is in consonance with the type, the quality and the quantity of the information provided. Therefore, the information providing center can assess an information service charge in accordance with the quality of the information that is provided. Further, since a fee is assessed for each unit, a user can cancel the reception of information when the received information differs from what he or she desires, and can thus minimize any loss that may be incurred.

Sixth through fourteenth embodiments of the present invention, wherein an enciphering rate can be varied, will be explained. These embodiments are established based on the following points of view.

Sixth Embodiment: A plurality of clocks are prepared for a general enciphering system in order to set an enciphering (deciphering) rate.

Seventh Embodiment: A plurality of circuits for repeating an enciphering process are prepared for a general enciphering system in order to set an enciphering (deciphering) rate.

Eighth Embodiment: A circuit for repeating an enciphering process is prepared for a general enciphering system and selects a repetition count for the process in order to set an enciphering (deciphering) rate.

Ninth Embodiment: A plurality of clocks are prepared for a pseudo-random number generator in order to set a generation rate.

Tenth Embodiment: A plurality of circuits for repeating a generation process are prepared for a pseudo-random number generator in order, to set a generation rate.

Eleventh Embodiment: An internal variable of a pseudo-random number generator, the generation rate of which can be set, can be read.

Twelfth Embodiment: A pseudo-random number generator and an encipherer, for one of which the processing rate can not be set, are employed for an enciphering system according to this embodiment.

Thirteenth Embodiment: A plurality of clocks are prepared for an enciphering system that comprises a pseudo-random number generator, a computing unit, and a block encipherer, in order to set an enciphering (deciphering) rate and a generation rate.

Fourteenth Embodiment: Means for setting an enciphering (deciphering) rate and means for setting a pseudo-random number generation rate are integrally provided for the enciphering system according to the twelfth embodiment.

Sixth Embodiment

Figure 20:
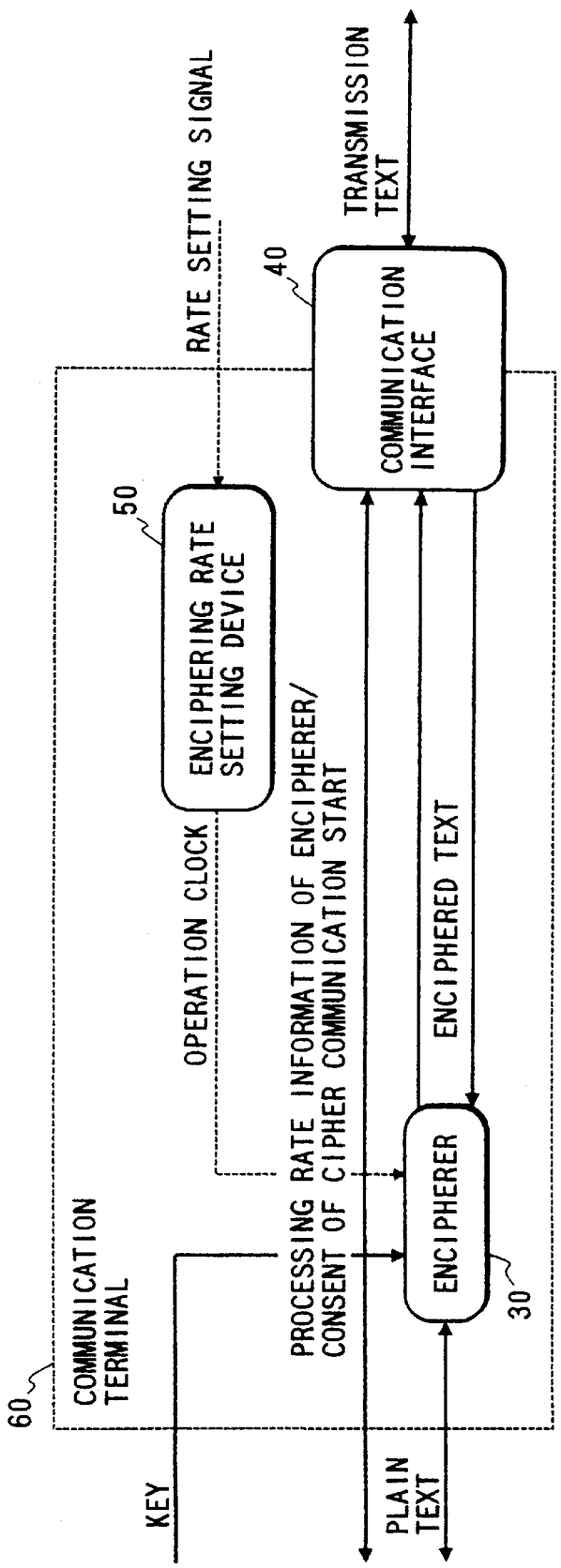
FIG. 20 is a block diagram illustrating a communication terminal according to a sixth embodiment of the present invention.

In this embodiment, employed for cryptographic communication is a communication terminal 60 shown in FIG. 20, which comprises an encipherer 30 for performing enciphering (and deciphering) according to an algorithm that is specified by a network; a communication interface 40; and an enciphering rate setting device 50.

The enciphering rate of the encipherer 30 can be set by the enciphering rate setting device 50. This can be performed in such a manner that a plurality of clocks having different frequencies are prepared to operate the encipherer 30, and from among them, one operation clock is selected in accordance with the enciphering rate that is externally set.

Figure 21:
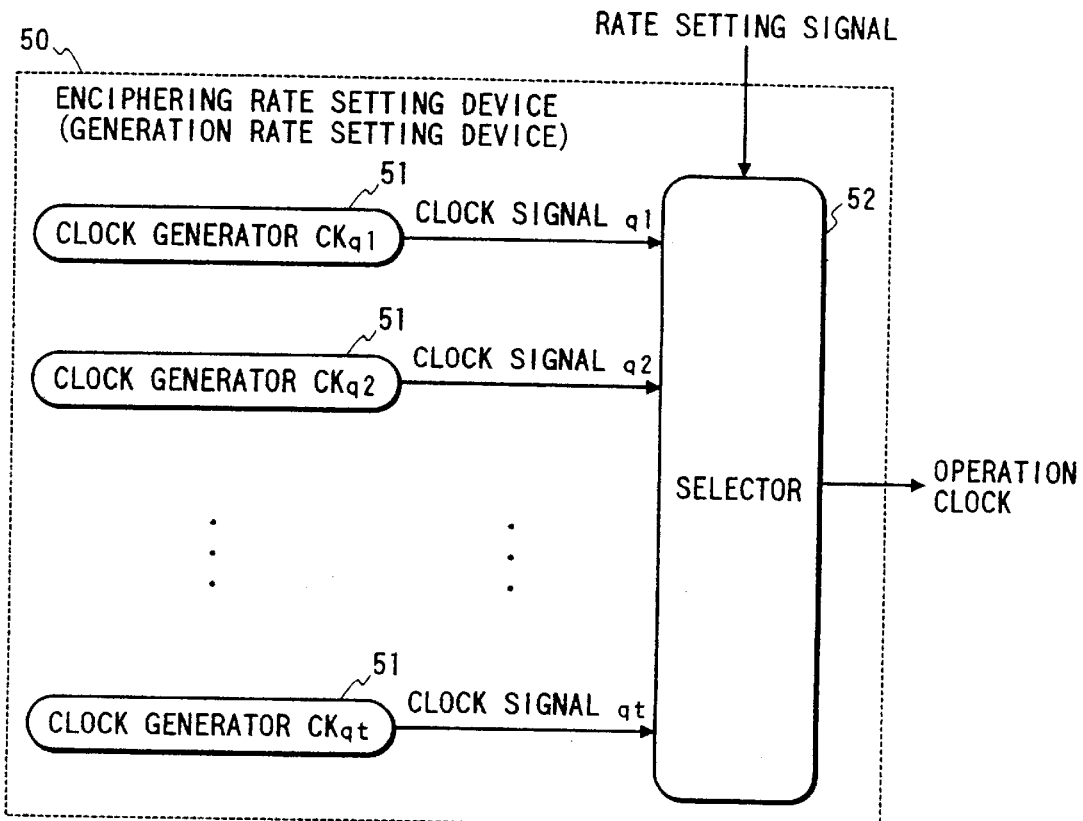
FIG. 21 is a block diagram illustrating an enciphering rate setting device according to the sixth and twelfth embodiment of the present invention.

In FIG. 21 is shown an example enciphering rate setting device 50, which comprises t clock generators 51 and a selector 52. Each of the clock generators 51, CKqi, generates a clock signal $q_i$. The clock signals $q_1, q_2, \ldots$ and $q_i$ that are generated by the clock generators 51 are transmitted to the selector 52, and a subscriber that uses the communication terminal 60 selects one of the clock signals. The selector 52 is controlled by using a rate setting signal.

The communication interface 40 is employed to transmit to, or receive from, a transfer path information that indicates an enciphering (deciphering) rate and enciphered text from the encipherer 30.

The cryptographic communication network employed for this embodiment is shown in FIG. 4. In advance, inherent and secret keys are employed in common between subscribers of a network. A, B, C, ... and N are network subscribers, and $K_{AB}$, $K_{BC}$, ... are respectively a key that is used in:common between subscribers A and B, a key that is used in common between subscribers A and C, ..... Joint ownership of a key can be accomplished by the manager of a network setting such a key in advance. Further, the joint ownership of a key can be provided by a well known system for establishing the joint ownership of a key, as is described in Tsujii and Kasahara, "Cryptography And Information Security", Shokosha Co., Ltd., pp. 72 and 73, and pp. 97 to 104, 1990.

For cryptographic communication from the subscriber A to the subscriber B, according to the present invention, the following procedures are performed.

Preprocedures 1 for Cryptographic Communication of the Present Invention

1. The sender A transmits information that indicates the processing rate for the encipherer 30 to the receiver B via the communication interface 40.

2. The receiver B receives from the sender A via the communication interface 40 the information that indicates the processing rate for the encipherer 30, confirms that the encipherer 30 of the communication terminal 60 of the receiver B can handle information at the designated processing rate, and notifies the sender A via the communication interface 40 that it is ready to begin cryptographic communication. When it is difficult for the receiver B to handle information at the designated processing rate, the receiver B transmits a processing rate of which it is capable to the sender A via the communication interface 40.

3. The above procedures are repeated until both subscribers agree on the processing rate for the encipherer 30.

Although in the preprocedures 1, the sender has transmitted information that indicates the processing rate for the encipherer 30, it is possible for the receiver to specify the rate as follows.

Preprocedures 2 for cryptographic communication of the Present invention

1. The receiver B transmits to the sender A via the communication interface 40 a request for information service, and information that indicates the processing rate for the encipherer 30.

2. The sender A receives from the receiver B via the communication interface 40 the request for information service and the information that indicates the processing rate for the encipherer 30, confirms that the encipherer 30 of the communication terminal 60 of the sender A can handle information at the designated processing rate, and notifies the receiver B via the communication interface 40 that it is ready to begin cryptographic communication. When it is difficult for sender A to handle information at the designated processing rate, the sender A transmits a processing rate of which it is capable to the receiver B via the communication interface 40.

3. The above procedures are repeated until both subscribers agree on the processing rate for the encipherer 30.

The above described procedures are very effective when the sender does not know the processing rate that can be set on the receiver's side, or when the receiver does not know the processing rate that can be set on the sender's side. When the sender knows the processing rate that can be set on the receiver's side, or when the receiver knows the processing rate that can be set on the sender's side, only procedure 1 need be performed to begin the next cryptographic communication.

For a cryptographic communication network that employs a key co-ownership system wherein a sender and a receiver exchange a cryptographic key before commencing cryptographic communication, not only information for owning a key in common but also information for a processing rate can be used in common as a key co-ownership protocol. In this case, only procedure 1 need be performed to start cryptographic communication.

An explanation will be given for the procedures for selecting a processing rate for the encipherer 30 at which enciphering (deciphering) will be performed between the sender A and the receiver B.

Enciphered Data Communication Procedures of the Present Invention (for Sender A)

1. The processing rate is set in consonance with a rate setting signal to a value that is determined by employing the preprocedures.

2. Secret key K which is used in common with the receiver B, is set to the encipherer 30 in advance.

3. The data are enciphered by the encipherer 30, and the enciphered data are transmitted to the receiver B via the communication interface 40.

Enciphered Data Communication Procedures of the Present Invention (for Receiver B)

1. The processing rate is set in consonance with a rate setting signal to a value that is determined by employing the preprocedures.

2. Secret key $K_{AB}$, which is used in common with the sender A, is set to the encipherer 30 in advance.

3. The enciphered data are received from the sender A across a transfer path via the communication interface 40, and are deciphered by the encipherer 30.

Through the above procedures, the enciphering rate can be selected with a high degree of freedom. Even when the communication terminals 60 of the sender and the receiver differ in their processing capabilities, they can be adjusted by performing procedures 1 and 2, so that cryptographic communication is possible. Therefore, when, for example, enciphered real-time information is to be exchanged between the, communication terminals 60 of subscribers whose processing capabilities differ, the communication quality is lowered and the quantity of information is reduced, and as a result, cryptographic communication can be performed in consonance with an enciphering rate for a communication terminal having a low capability.

The preprocedures 1 and 2 do not have to be performed for each communication exchange. For example, If the sender and the receiver agree to a specific processing speed in advance and perform communication at that processing speed, the preprocedures 1 and 2 are not required.

Figure 22:
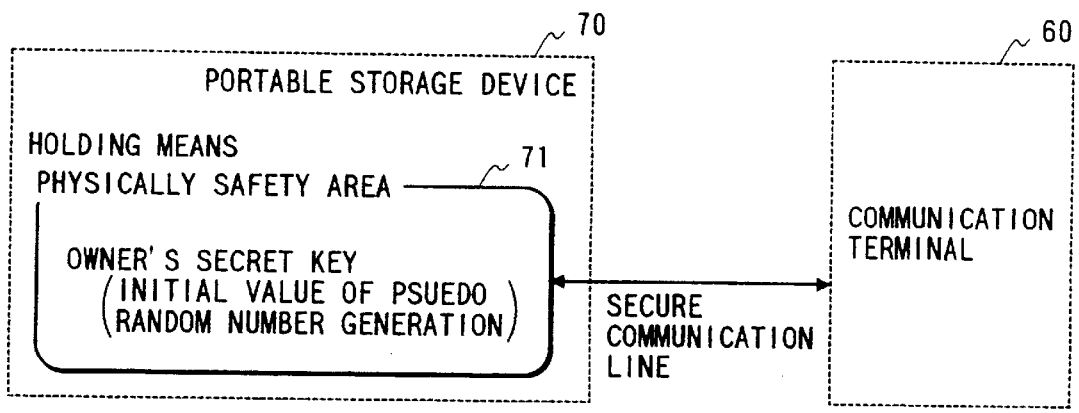
FIG. 22 is a block diagram illustrating a portable storage device according to the sixth through fourteenth embodiments of the present invention.

Each subscriber of a cryptographic communication network may have the portable storage device 70 shown in FIG. 22 for the storage of secret information, such as a user's key that is required for cryptographic communication. In the portable storage device 70 is stored secret information for each user that is required for cryptographic communication. Taking security into consideration, the portable storage device for each user is provided separately from the communication terminal 60. Although the portable storage device 70 may be a part of the communication terminal 60, so long as a physically secure area for each user is ensured, the use of the communication terminal 60 for cryptographic communication for each user is limited. It is better that the communication terminal 60 and the portable storage device 70 is separately provided and that secret information for each user not be stored in the communication terminal 60. With this arrangement, which is convenient for users, whatever types of communication terminals 60 users may use, the users can exchange secret information via their own portable storage devices 70 for cryptographic communication exchanges.

The portable storage device 70 can exchange information with the communication terminal 60 across a safe communication path, and has a physically secure area as holding means 71. Only an authorized owner can correctly operate the portable storage device, and the procedure for verifying a password, etc., is performed to determine whether or not a user is an authorized owner. An IC card, etc., is employed as the portable storage device 70.

The portable storage device 70 can be employed in the following seventh through fourteenth embodiments.

Seventh Embodiment

Figure 23:
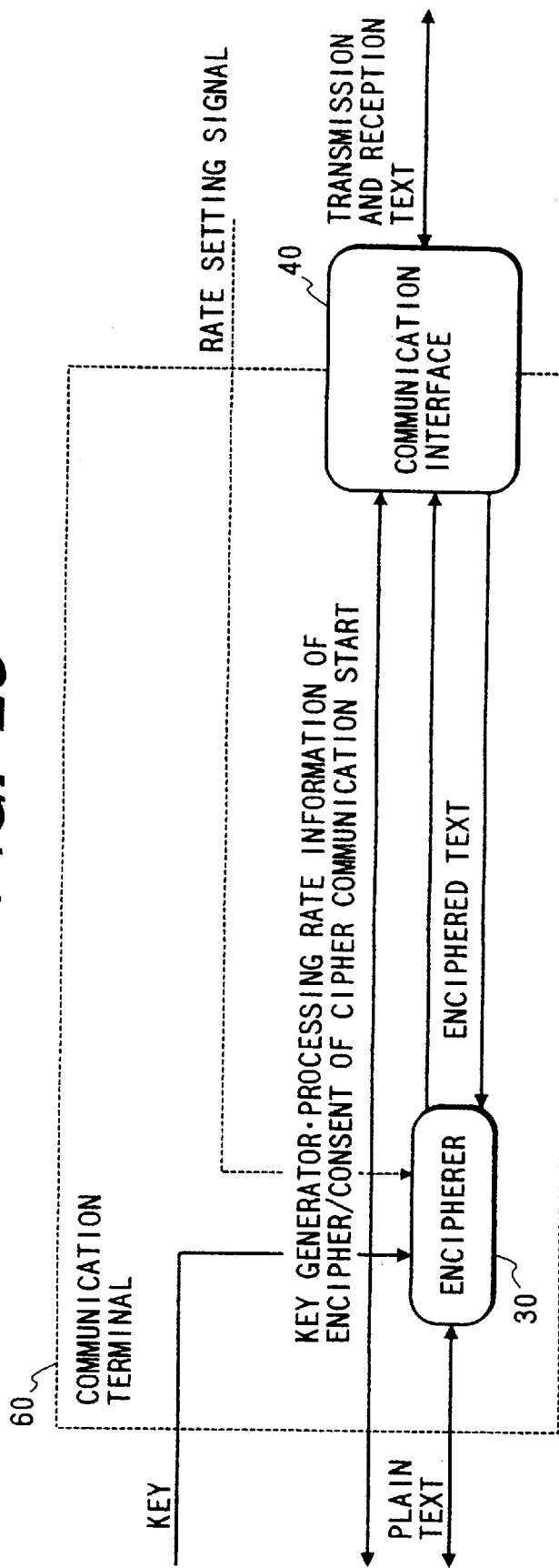
FIG. 23 is a block diagram illustrating a communication terminal according to a seventh and an eighth embodiment of the present invention.

In this embodiment, a communication terminal shown in FIG. 23 is employed for cryptographic communication. Because it is simple, DES cryptography is used as an enciphering system in this embodiment. Since DES cryptography is an algorithm by which the same process is repeated at 16 stages, as was previously described, a single circuit can perform the repetitive process. If a circuit is fabricated by employing a one-stage DES enciphering process as one processing unit (PE), an encipherer 30 described below can be provided for which the processing rate can be changed.

Figure 24:
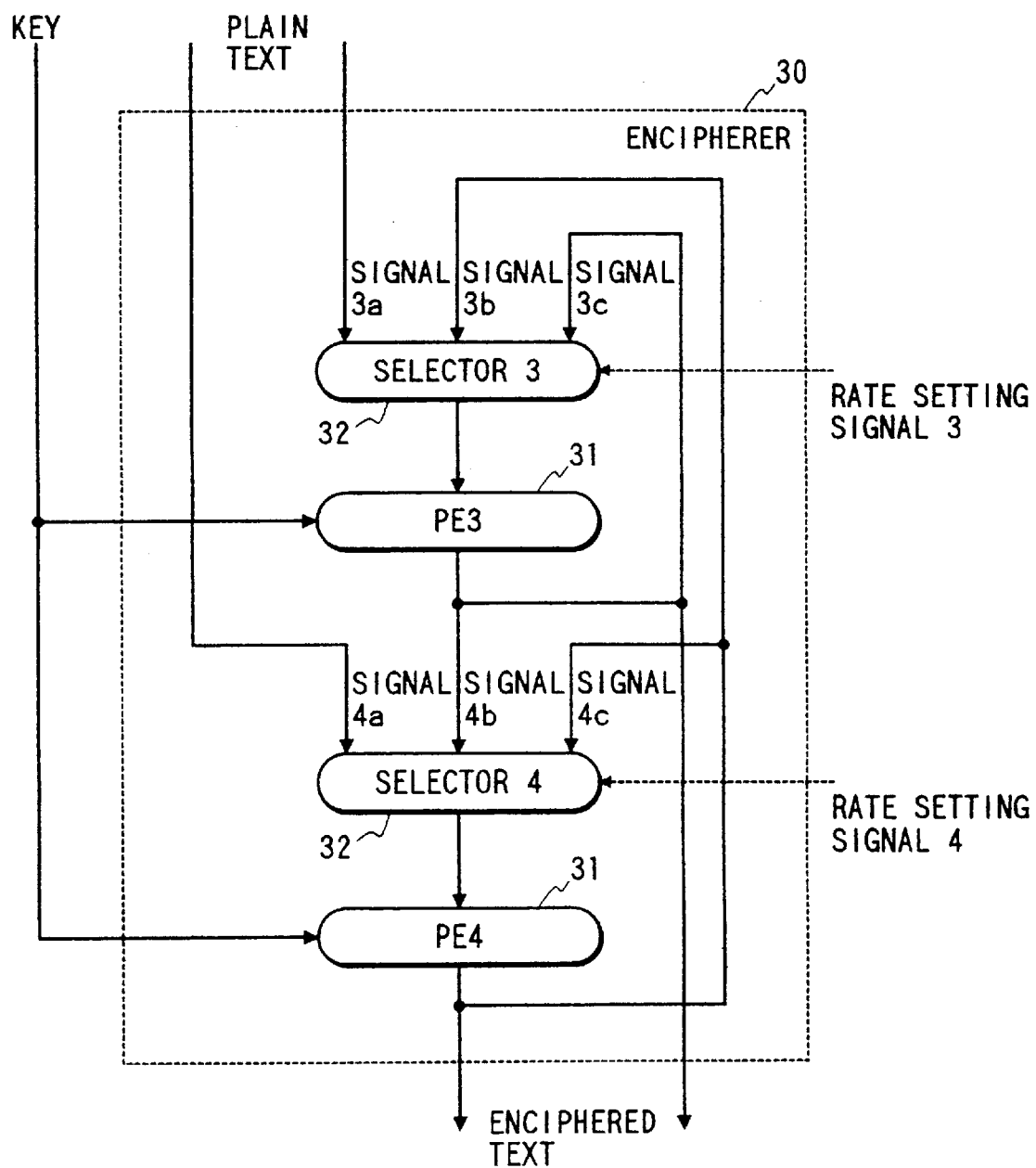
FIG. 24 is a block diagram illustrating an encipherer that can set an enciphering rate according to the seventh embodiment of the present invention.

In this embodiment, the DES enciphering circuit is fabricated by using a plurality of circuits, wherein a selector is located at each PE input terminal, to provide the encipherer 30 for which the enciphering (deciphering) rate can be changed in consonance with a desired rate. An example encipherer 30, according to the present invention, for which the processing rate can be varied, is shown in FIG. 24. The encipherer 30 in FIG. 24 comprises two PEs (operators) 31, PE3 and PE4, that are processors for one stage of DES enciphering; and two selectors 32, selector 3 and selector 4. The selectors 32 are controlled by a rate setting signal.

When the encipherer 30 is to be operated at high speed, both PEs are used for enciphering. More specifically, when the operation is begun, the selector 3 selects signal 3a while the selector 4 selects signal 4b. Thereafter, the selector 3 selects signal 3b and the PE3 and PE4 are used repeatedly, eight times each.

When the encipherer 30 is to be operated at a low speed, only one PE (PE4) is used for enciphering. More specifically, when the operation is begun, the selector 4 selects signal 4a. The selector 4 thereafter selects: signal 4c and the PE4 is used repeatedly, 16 times. The selector 3 and PE3 are not employed. In this case, the time required for DES enciphering is twice the time required when two PEs are employed, and the processing rate is reduced by half.

Further, when the encipherer 30 is to be operated at a low speed, the PE3 and PE4 use different keys to perform enciphering for different users. More specifically, when the operation is begun, the selector 3 selects signal 3a while the selector 4 selects signal 4a. Thereafter, the selector 3 selects signal 3c while the selector 4 selects signal 4c, and the PE3 and PE4 are used repeatedly, 16 times each. At this time, if the keys for different users are set by the PE3 and the PE4, enciphered text for different subscribers can be acquired.

That is, a plurality of such PEs are prepared to provide the encipherer 30, and the processing route is determined in consonance with a requested processing rate, so that the encipherer 30 for which the processing rate can be varied can be obtained. Although two PEs were employed in FIG. 24, the present invention does not limit the number of PEs that may be used.

The communication interface 40 in the sixth embodiment can also be used in this embodiment, and the cryptographic communication network shown in FIG. 4 is used.

The cryptographic communication from subscriber A to subscriber B is performed using the same procedures as those in the sixth embodiment.

In this embodiment as well as in the sixth embodiment, even if the enciphering capabilities of the communication terminals 60 of the sender and the receiver differ, cryptographic communication can be performed.

Eighth Embodiment

Figure 25:
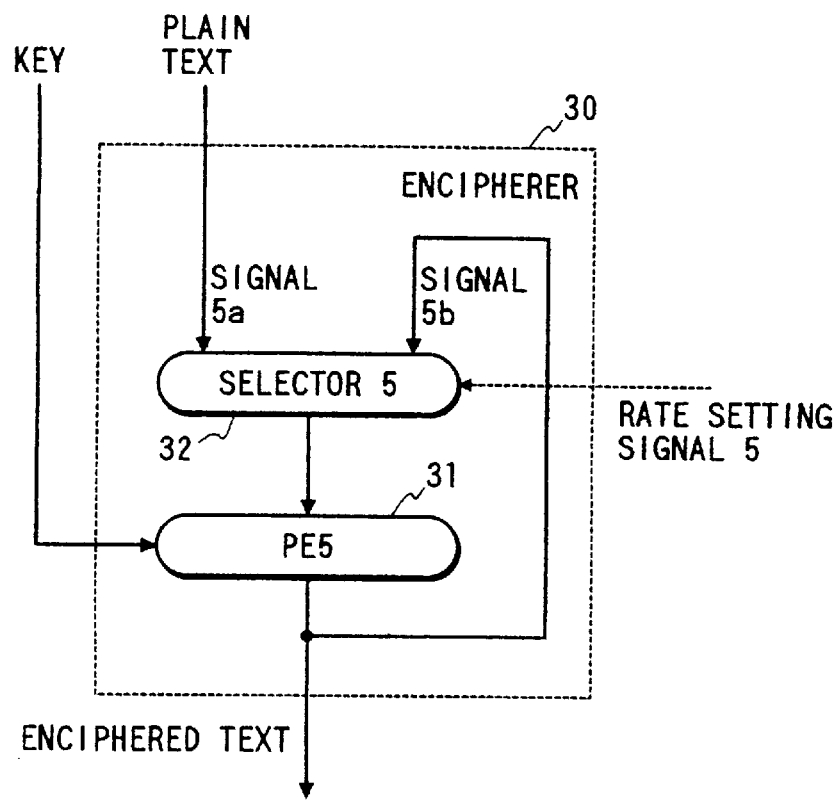
FIG. 25 is a block diagram illustrating an encipherer that can set an encipher power and processing speed according to an eighth embodiment of the present invention.

Because of its simpleness, the DES cryptography is also used as an enciphering system also in this embodiment. Cryptography communication is performed by using a communication terminal 60 shown in FIG. 23. In addition, an encipherer 30 shown in FIG. 25 is employed that comprises: a PE 31 (PE5) for performing a one-stage process for DES cryptography, and a selector 32 (selector 5). The selector 32 is controlled by a rate setting signal.

Cryptographic communication at high power for which the encipherer 30 is used is provided by performing the enciphering process using the PE5 many times. More specifically, when operation is begun, the selector 5 selects signal 5a, and thereafter selects signal 5b, and the PE5 is used repeatedly until a desired power is obtained. Since, for example, 16stage DES enciphering is performed, the PE5 may be repeatedly used more than 16 times to increase the power relative to that of DES cryptography. It should be noted that the enciphering rate is reduced in inverse proportion to the count at which the PE5 is repeatedly used.

Cryptographic communication at a low power for which the encipherer 30 is employed can be provided by performing the enciphering process using the PE5 at a reduced count. It should be noted that the enciphering rate is increased as the use count after the PE5 is reduced. Since 16-stage processes are performed for DES cryptography, the PE5 can be repeatedly used fewer than 16 times to decrease the power relative to that of DES cryptography.

In other words, the rate setting signal 5 for controlling the selector 5 can be used to change the power of cryptography and its enciphering rate.

Although one PE was used in FIG. 25, the number of PEs is not particularly limited.

The communication interface 40 in the sixth embodiment can also be used in this embodiment, and the cryptographic communication network shown in FIG. 4 is used.

The cryptographic communication from subscriber A to subscriber B is performed using the same procedures as those in the sixth embodiment.

According to this embodiment, cryptographic communication can be so performed that the cryptographic power for the communication terminals 60 can be selected by the sender and the receiver.

Ninth Embodiment

In this embodiment, a pseudo-random number generator 10 is employed for which a pseudo-random number generation rate can be set by a generation rate setting device.

Figure 26:
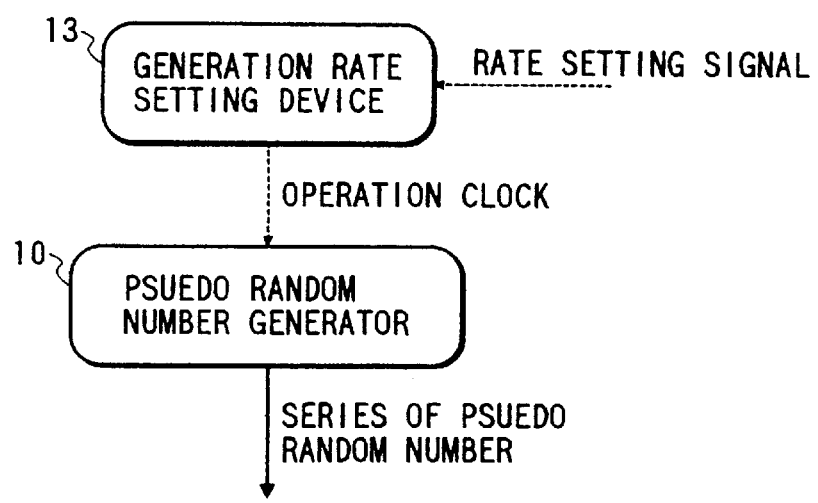
FIG. 26 is a block diagram illustrating a pseudo-random number generator that can set a processing speed by employing a generation rate setting device according to a ninth embodiment of the present invention.

In this embodiment, as is shown in FIG. 26, the generation rate for the pseudo-random number generator 10 can be set by the pseudo-random number rate setting device 13. This can be performed in such a manner that a plurality of clocks with different frequencies are prepared to operate the pseudo-random number generator 10, and from among them, one operation clock is selected in consonance with the pseudo-random number generation rate that is externally set.

It should be noted that the generation rate setting device 13 shown in FIG. 21 is employed in this embodiment.

The algorithm used for generation of a pseudo-random number sequence is not limited to the one that is employed in this embodiment, any algorithm can be used. An explanation will be given for a case wherein employed is an algorithm for generation of a pseudo-random number sequence that is secure from a calculation amount, especially, an algorithm for generation of a square-type pseudo-random number sequence.

A square-type pseudo-random number sequence is a sequence $b_1, b_2, \ldots$, which is generated by using the following procedures.

Square-type Pseudo-random Number Sequence

Supposing that p and q are prime numbers that satisfy $p \equiv q \equiv 3 \pmod 4$ and $N = p \cdot q$, a bit sequence, $b_1, b_2, \ldots$, which is acquired by initial value $x_0$ (where x is an integer $1 < x_0 < N-1$) and the following reflexive relations:

$$x_{i+1} = x_i^2 \bmod N \ (i=0, 1, 2, \ldots) \quad (3)$$

$$b_i = \mathrm{lsb}_j(x_i) \ (i 1, 2, \ldots) \quad (4),$$

is called a square-type pseudo-random number sequence. It should be noted that lsbJ(xi) represents the lower j bits, and when the number of bits for modulo N is n, $j=0(\log_2 n)$.

The square-type pseudo-random number sequence is one that is secure from a calculation amount on an assumption that the determination of a root remainder for N is difficult from the view of a calculation amount.

In order to adequately secure the square-type pseudo-random numbers, it is preferable that the bit count n for modulo N in the square expression (3) be approximately 512. Secret keys (initial values for the pseudo-random number generator 54) $K_A, K_B, \ldots$, which are employed in common between the subscribers, are $1 < K_A, K_B, \ldots, < N-1$.

The pseudo-random number generator 10 for generating the square-type pseudo-random number sequence is the same as is shown in FIG. 19.

Figure 27:
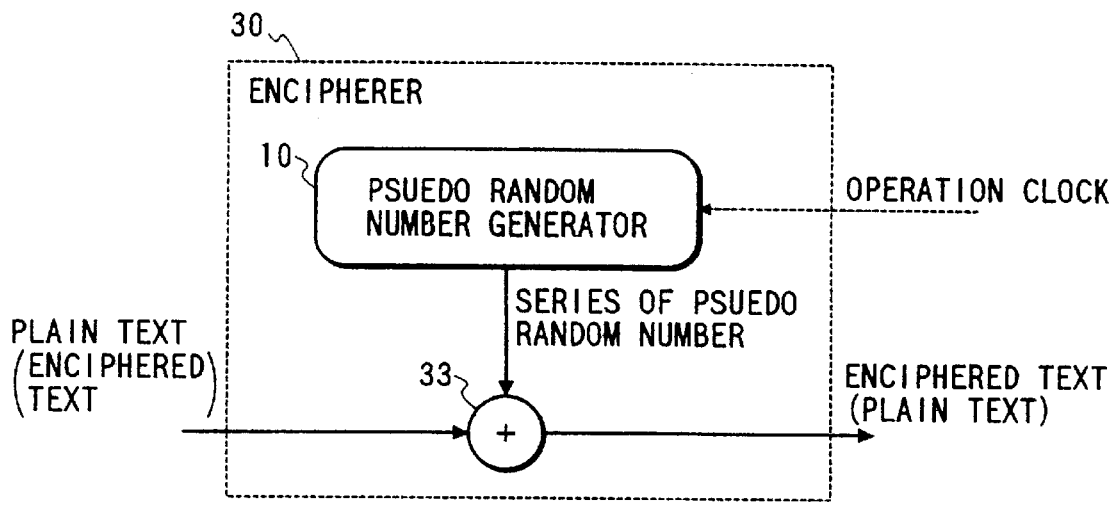
FIG. 27 is a block diagram illustrating an encipherer that can set an enciphering rate according to the ninth embodiment of the present invention.

The encipherer 30 for which the processing rate can be set can be designed as is shown in FIG. 27 by using the above described pseudo-random number generator 10. The enciphering system that is employed by encipherer 30 in this embodiment is a stream enciphering system. An encipherer 30 in FIG. 27 comprises a pseudo-random number generator 10 and an exclusive OR circuit 33.

To perform enciphering using the encipherer 30, an exclusive OR is performed with each bit in input plaintext and a pseudo-random number sequence that is generated by the pseudo-random number generator 10, and as a result, enciphered text is obtained. For deciphering, an exclusive OR is performed with each bit in input enciphered text and a pseudo-random number sequence (the same as that used for enciphering) that is generated by the pseudo-random number generator 10, and as a result, plaintext is acquired.

In this embodiment as well as in the previous embodiments, the communication terminal 60 that is shown in FIG. 20 is used for cryptographic communication.

In this embodiment as in the sixth embodiment, even if the enciphering capabilities of the communication terminals 60 of a sender and a receiver differ, the cryptographic communication can be performed.

Tenth Embodiment

Figure 28:
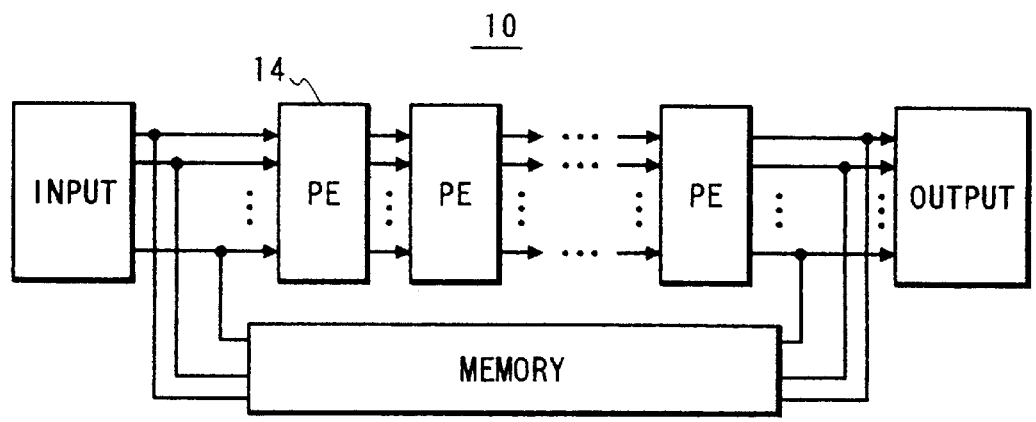
FIG. 28 is a block diagram illustrating a pseudo-random number generator that employs PEs according to a tenth embodiment of the present invention.

In this embodiment, a pseudo-random number generator 10 shown in FIG. 28 is employed for which the pseudo-random number generation rate can be set.

Figure 29:
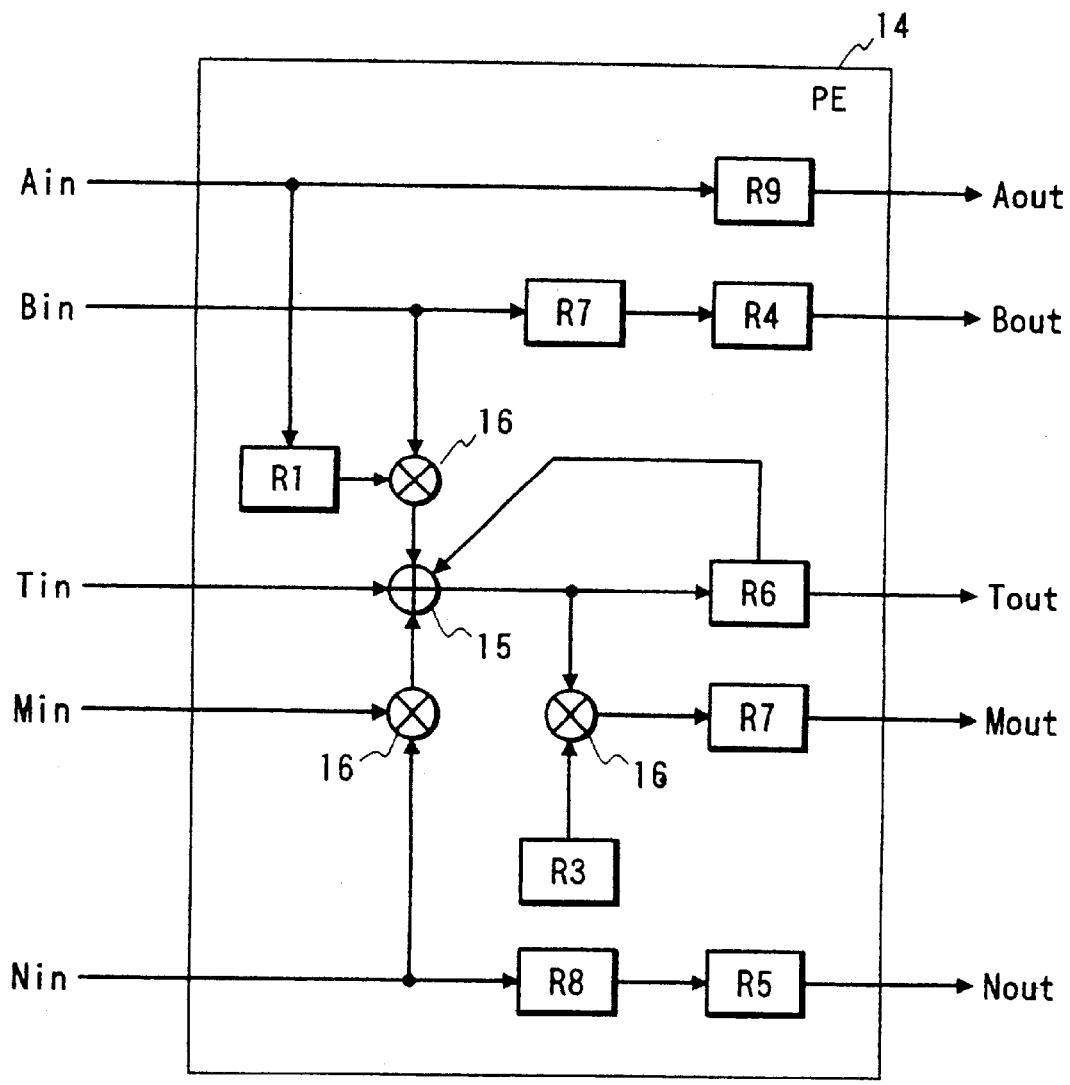
FIG. 29 is a block diagram illustrating the PE according to the tenth embodiment of the present invention.

The generation rate for the pseudo-random number generator 10 in this embodiment can be set externally. To do this, the pseudo-random number generator 10 can be structured as is described in reference 3, Keiichi Iwamural Tsutomu Matsumoto and Hideki Imai, "Remainder Multiplication By Montogomery Method Appropriate For Power Remainder, And Cistric Array for Accomplishing It", Paper of electronics information and communication engineers (A), Vol. 76, No. 8, pp. 1214 to 1223, 1993. According to this method, the pseudo-random number generator 10 can be provided by performing a repetitive process using an operator (processing element: PE) shown in FIG. 11, and a circuit ranging from a small one (low-speed processing) to a large one (high-speed processing) can be provided in consonance with the number of PEs 14 that are employed. The PE 14 shown in FIG. 28, which is so structured as is shown in FIG. 29, comprises registers R1, R2, . . . and R9; an adder 15; and a multiplier 16.

When the pseudo-random number generator 10 is so arranged in advance that a plurality of PEs are employed to perform a repetitive process, the pseudo-random number generator 10 generates pseudo-random numbers at a high rate when all the PEs are operated, while it generates pseudo-random numbers at a low rate when only several PEs are operated.

Figure 30:
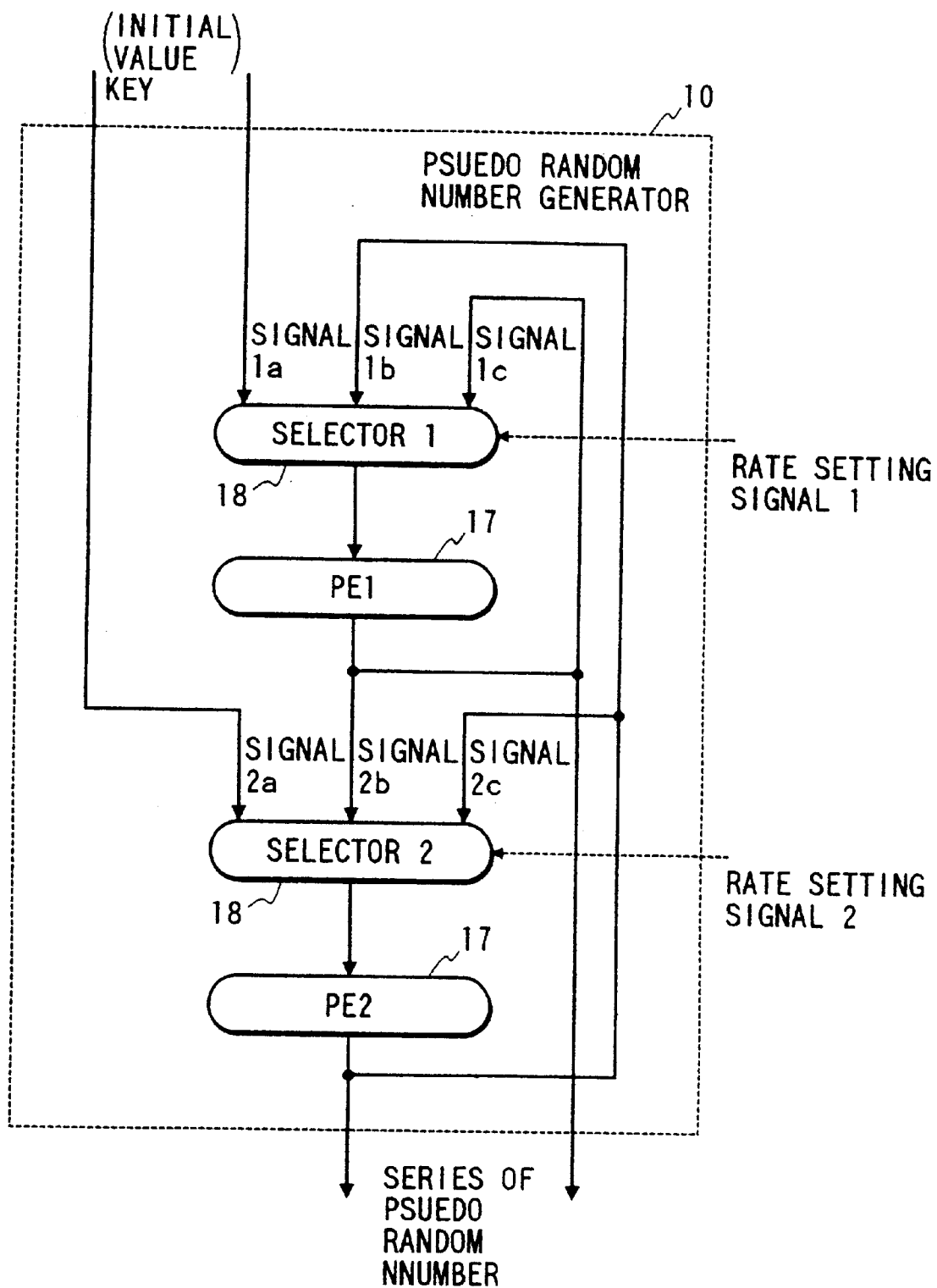
FIG. 30 is a block diagram illustrating a pseudo-random number generator that can set a generation rate according to the tenth embodiment of the present invention.

An example pseudo-random number generator 10, according to the present invention, for which the processing rate can be varied, is shown in FIG. 30. The pseudo-random number generator 10 in FIG. 30 comprises two PEs 17, PE1 and PE2, which are described in the above reference; and two selectors 18, selector 1 and selector 2. The selectors 18 are controlled by a rate setting signal.

When the pseudo-random number generator 10 is to be operated at high speed, both PEs are used to generate pseudo-random numbers. More specifically, when the operation is begun, the selector 1 selects signal 1a while the selector 2 selects signal 2b. Thereafter, the selector 1 selects signal 1b and the PE1 and PE2 are used repeatedly as many times as one are required for the square-type operation.

When the pseudo-random number generator 10 is to be operated at a low speed, only one PE (PE2) is used to generate pseudo-random numbers. More specifically, when the operation is begun, the selector 2 selects signal 2a. The selector 2 thereafter selects signal 2c and the PE2 is used repeatedly as many times as are required for the square-type operation. The selector 1 and PE1 are not employed. In this case, the time required for the square-type operation is twice the time required when two PEs are employed, and the generation rate is reduced by half.

Further, when the pseudo-random number generator 10 is to be operated at a low speed, the PE1 and PE2 use different keys to perform enciphering for different users. More specifically, when the operation is begun, the selector 1 selects signal 1a while the selector 2 selects signal 2a. Thereafter, the selector 1 selects signal 1c while the selector 2 selects signal 2c, and the PE1 and PE2 are used repeatedly as many times as are required for the square-type operation. At this time, if the keys for different users are set by the PE1 and the PE2, enciphered text for different subscribers can be acquired.

That is, a plurality of such PEs ate prepared to provide the pseudo-random number generator 10, and the processing route is determined in consonance with a requested processing rate, so that the pseudo-random number generator 10 for which the processing rate can be varied can be obtained. Although two PEs were employed in FIG. 30, the present invention does not limit the number of PEs that may be used.

Figure 31:
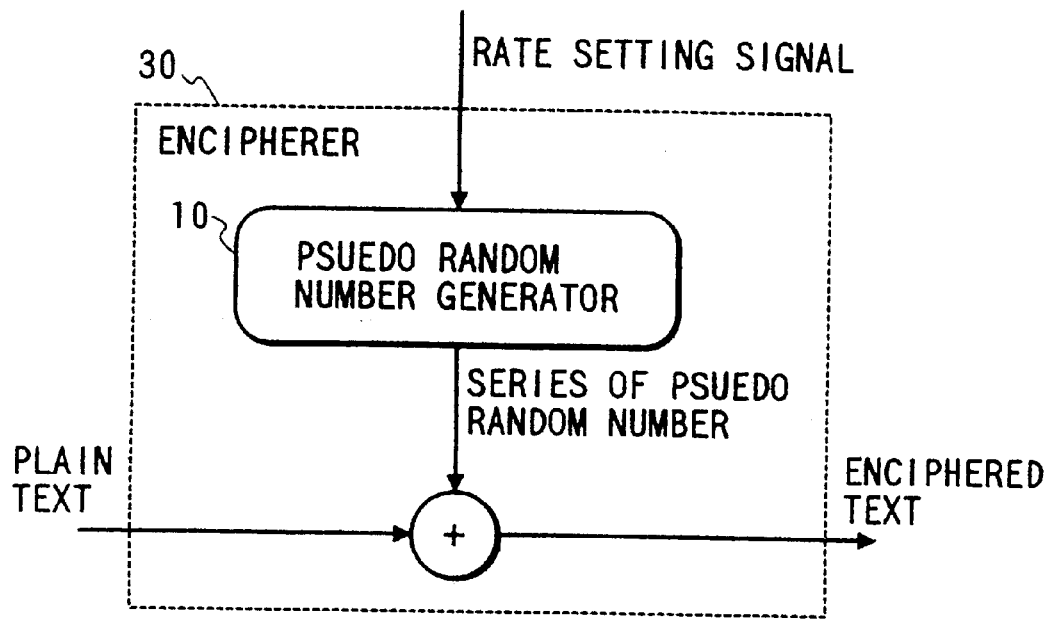
FIG. 31 is a block diagram illustrating an encipherer that can set an enciphering rate according to the tenth embodiment of the present invention.

An encipherer that includes the pseudo-random number generator 10 of this embodiment is structured as is shown in FIG. 31. Further, in this embodiment, a communication terminal 60 shown in FIG. 23 is used for cryptographic communication.

The communication interface 40 in the sixth embodiment can also be used in this embodiment, and the cryptographic communication network shown in FIG. 4 is used.

The cryptographic communication from subscriber A to subscriber B is performed using the same procedures as those in the ninth embodiment.

In this embodiment, as well as in the sixth embodiment, even if the enciphering capabilities of the communication terminals 60 of the sender and the receiver differ, cryptographic communication can be performed.

Eleventh Embodiment

A pseudo-random number generator 10 for which a pseudo-random number generation rate can be set is also employed in this embodiment. In the ninth and tenth embodiment, since a key that is employed in common between the subscribers is fixed, the initial value for the pseudo-random number generator 10 is a constant value when a sender and a receiver are the same, and thus the same pseudo-random number sequence is generated.

In this embodiment, even if the sender and the receiver are the same, the initial value of the pseudo-random number generator 10 is altered each time and the security is increased.

In expressions (3) and (4) in the ninth embodiment that are the procedures for generating pseudo-random numbers, $x_{i+1}$, which is sequentially updated by the feedback calculation, is called an internal variable of the pseudo-random number generator 10.

Figure 32:
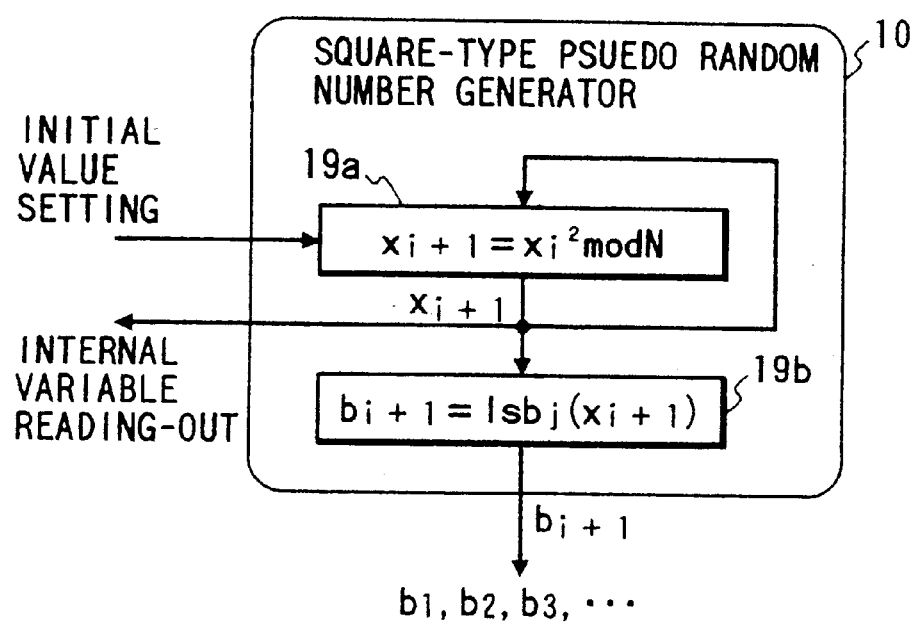
FIG. 32 is a block diagram illustrating a square-type pseudo-random number generator according to an eleventh embodiment of the present invention.

The pseudo-random number generator 10 in this embodiment includes a processor 19a for performing feedback calculation of expression (3), and a processor 19b for performing feedback calculation of expression (4), as is shown in FIG. 32, and reads the internal variable that is updated by expression (3). The internal variable is stored in holding means 71 of a portable storage device 70, which is connected to a communication terminal 60 shown in FIG. 20, for example. In the ninth and tenth embodiment, since the initial value is set to the pseudo-random number generator 10, movement of data is unidirectional only. In this embodiment, however, the internal variable can be read from the pseudo-random number generator 10 in the reverse direction. A common key, which was used for the current information servicing, is then replaced by the internal variable that was read and that will be used as a common key for the next information servicing.

Since the pseudo-random number 10 is replaced by that shown in FIG. 27 or 31, its processing rate can be varied, so that an encipherer 30 can be provided wherein the processing rate can be changed each time the initial value for the pseudo-random number generator 10 is used. Further, the previously mentioned communication terminal 60 can be designed by using such an encipherer 30.

The cryptographic communication in this embodiment from subscriber A to subscriber B is performed using the same procedures as are shown in the ninth embodiment. It should be noted that, for both sender and receiver, an additional cryptographic communication procedure is required at the last in which "an internal variable value of the pseudo-random number generator when deciphering of enciphered data is completed is secretly held, in the holding means of the portable storage device, as a new initial value for the next cryptographic communication with subscriber A (or B)."

In this embodiment, as well as the sixth embodiment, even if the enciphering capabilities of the communication terminals 60 of the sender and the receiver differ, cryptographic communication can be performed.

Twelfth Embodiment

This embodiment shows an enciphering system wherein a pseudo-random number sequence that is generated by the pseudo-random number generator 10, for which the processing rate can be set as is explained in the ninth, tenth and eleventh embodiments, is employed as a key series for the encipherer, for which the processing rate can be set as is explained in the sixth, seventh and eighth embodiments. This enciphering system differs from the conventional enciphering system (Yamamoto, Iwamura, Matsumoto and Imai: "Square-type pseudo-random number generator and practical enciphering system employing block encipher," Institute of electronic information and communication engineers, ISEC 93-29, 1993-08) in that the processing rates for the encipherer and the pseudo-random number generator can be set.

The enciphering system in this embodiment can be provided by an arbitrary combination of the pseudo-random number generator 10 in the seventh, tenth or eleventh embodiment for which the processing rate can be set, and the encipherer 30 in the sixth, seventh or eighth embodiment, for which the processing rate can be set.

In this embodiment, an explanation will be given specifically for a case wherein a pseudo-random number sequence that is generated by the pseudo-random number generator 10 in the ninth embodiment, for which the processing rate can be set, is employed as a key series for the encipherer 30 in the sixth embodiment, for which the processing rate can be set.

Figure 33:
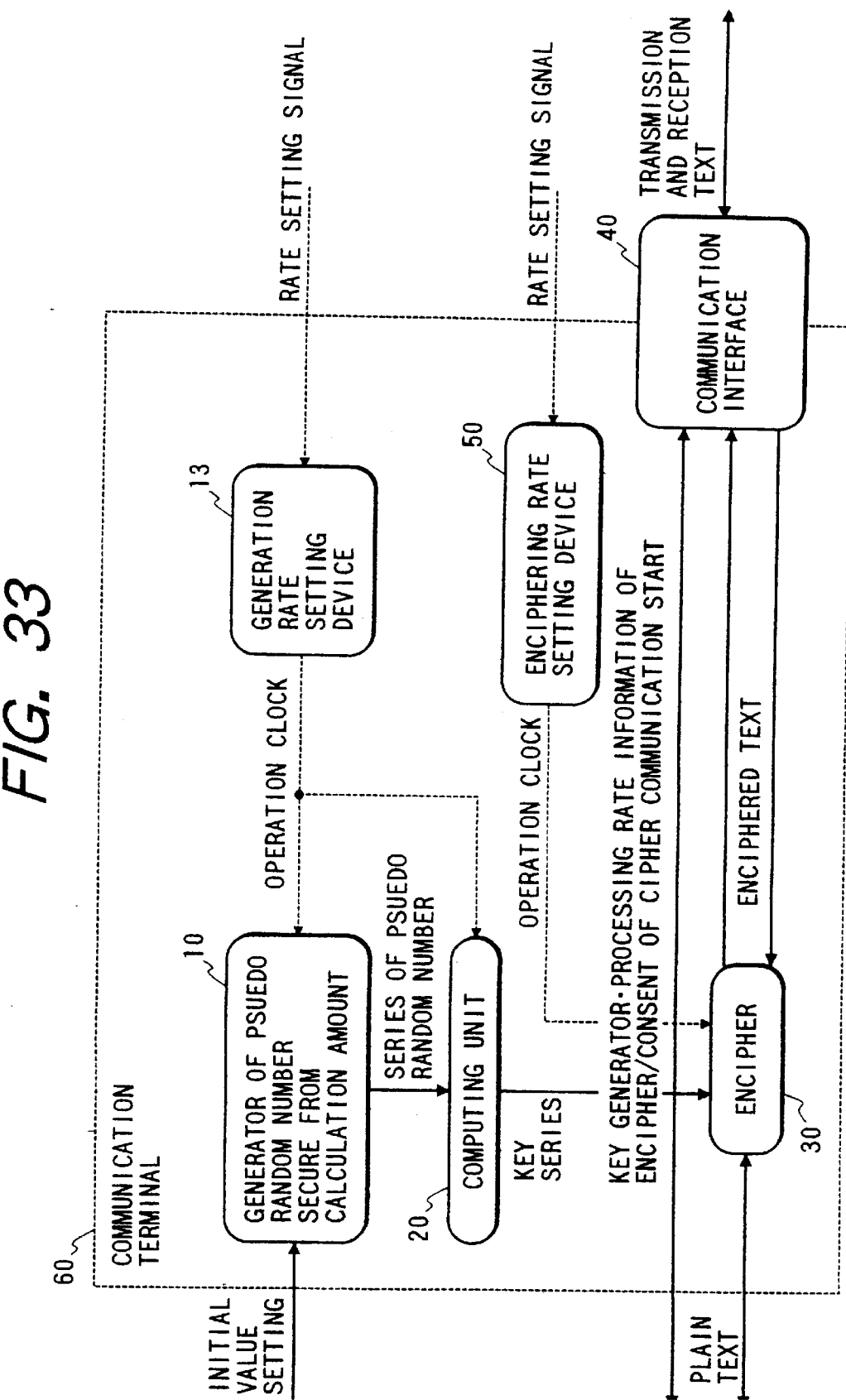
FIG. 33 is a block diagram illustrating a communication terminal according to the twelfth embodiment of the present invention.

As is shown in FIG. 33, a communication terminal 60 in this embodiment comprises: an encipherer 30, for performing enciphering (deciphering) according to an algorithm that is specified by a network; a pseudo-random number generator 10, for generating random numbers, which are secure from a calculation amount, according to an algorithm that is specified by the network; a computing unit 20, for converting the pseudo-random numbers that are output by the pseudo-random number generator 10 into a key series for the encipherer 30; a communication interface 40; an enciphering rate setting device 50; and a generation rate setting device 13.

The enciphering rate setting device 50 in this embodiment is shown in FIG. 21. The processing rate for the encipherer 30 can be set externally by the enciphering rate setting device 50.

The generation rate setting device 13 in this embodiment is also shown in FIG. 21. The processing rate for the pseudo-random number generator 10 can be set externally by the generation rate setting device 13.

As is described in the related prior art, the computing unit 20 converts a pseudo-random number sequence that is output by the pseudo-random number generator 10 into a series of keys for the encipherer 30. Therefore, the processing rate for the computing unit 20 should be changed in proportion to the processing rate for the pseudo-random number generator 10. A clock signal that is selected by the generation rate setting device 13 is also used to change the processing rate for the computing unit 20.

Further, a selective combination of clocks for the enciphering rate setting device 50 and the generation rate setting device 13 permits further flexibility.

The communication interface 40 in the sixth embodiment is also used in this embodiment, and the cryptographic communication network in FIG. 21 is used for this embodiment.

The cryptographic communication from subscriber A to subscriber B is performed using the following procedures.

An explanation for the preprocedures for cryptographic communication will not be given since they are the same as those in the sixth embodiment, with the exception that instead of "information that indicates the processing rate for the encipherer 30", "information that indicates the processing rate for the encipherer 30 and the processing rate for the pseudo-random number generator 10" is exchanged via the communication interface 40. An explanation will now be given for the procedures used when a sender A and a receiver B agree on the enciphering (deciphering) rate for the encipherer 30 and the pseudo-random number generation rate.

Enciphered Data Communication Procedures of the Present Invention (for Sender A)

1. The processing rates for the encipherer 30 and the pseudo-random number generator 10 are set in consonance with rate setting signals to those that are determined using the preprocedures.

2. Secret key $K_{AB}$, which is owned in common with the receiver B, is set as the initial value $x_0$ to the pseudo-random number generator 10.

3. The pseudo-random number generator 10 is operated to generate a pseudo-random number sequence that is secure from a calculation amount.

4. The computing unit 20 converts the generated pseudo-random number sequence into a series of keys for the encipherer 30.

5. While the series of keys that is output by the computing unit 20 is updated as keys for the encipherer 30, the encipherer 30 enciphers the data using the keys, and transmits the enciphered data to the receiver B via the communication interface 40.

Enciphered Data Communication Procedures of the Present Invention (for Receiver B)

1. The processing rates for the encipherer 30 and the pseudo-random number generator 10 are set in consonance with rate setting signals to those that are determined through the preprocedures.

2. Secret key $K_{AB}$, which is owned in common with the sender A, is set as the initial value $x_0$ to the pseudo-random number generator 10.

3. The pseudo-random number generator 10 is operated to generate a pseudo-random number sequence that is secure from a calculation amount.

4. The computing unit 20 converts the generated pseudo-random number sequence into a series of keys for the encipherer 30.

5. Enciphered data are received across a transfer path via the communication interface 40, and while the series of keys that is output by the computing unit 20 is updated as keys for the encipherer 30, the encipherer 30 deciphers the enciphered data received from the sender A.

Through the above procedures, the trade-off of the security of cryptography can be selected with a high degree of freedom. When the pseudo-random number generator 10 is the one in the eleventh embodiment, for a sender and a receiver, a procedure in which "the internal variable value of the pseudo-random number generator 10, when the deciphering of the enciphered data is completed, is secretly held, as an initial value for the next cryptographic communication with A (or B), in the holding means 71 of the portable storage device" is required as the last of the cryptographic communication procedures.

Even when the capabilities of the communication terminals 60 of the sender and the receiver differ, they can be adjusted at the preprocedures 1 and 2 and cryptographic communication can be performed. Therefore, the processing rate for the encipherer and the pseudo-random number generation rate can be selected in consonance with the secrecy of the data. For example, it is preferable that for very highly classified data the processing rate for the encipherer 30 be almost the same as the generation rate for pseudo-random numbers that are secure from a calculation amount.

In the sender's procedure 4 and the receiver's procedure 4, there is a method whereby from the beginning the obtained pseudo-random number sequence is divided by the computing unit 20 into individual key bit lengths (56 bits each) for DES cryptography, and the divided bit sets are employed as keys for the DES cryptography. Another method, whereby the computing unit 20 converts the pseudo-random number sequence into a series of keys for DES cryptography, may be employed so long as it is common to a sender and a receiver even though it is not used in common by a cryptographic communication network. Although the modulo N in the square calculation is 512 bits, any other number of bits can be used.

Although DES cryptography is employed in this embodiment, the cryptography is not limited to DES, and any other common-key cryptography, such as FEAL cryptography, can be used. In addition, although a single DES encipherer is used as the encipherer 30, a plurality of DES encipherers or a combination of a DES encipherer and a FEAL encipherer can be employed.

Further, although the square-type pseudo-random numbers are used as an algorithm for the generation of pseudo-random numbers that are secure for a calculation amount, another algorithm that is used to generate pseudo-random numbers that are secure from a calculation amount can be used. As is described in, for example, the above reference 2, an algorithm for which RSA cryptography, discrete logarithms, or reciprocal cryptography is employed also can be applied as the algorithm of the present invention for generation of pseudo-random numbers.

Thirteenth Embodiment

In the twelfth embodiment, an explanation was given for the enciphering system provided by a combination of the pseudo-random number generator 10 in the seventh, tenth and eleventh embodiments, for which the processing rate can be set, and the encipherer 30 in the sixth, seventh and eighth embodiments, for which the processing rate can be set. The present invention additionally includes an enciphering system provided by a combination of the pseudo-random number generator 10, as explained in the ninth, tenth and eleventh embodiments and for which the processing rate can be set, and an encipherer 30 having a constant processing rate, and an enciphering system provided by a combination of the encipherer 30 in the sixth, seventh and eighth embodiments and for which the processing rate can be set, and a pseudo-random number generator 10 having a constant processing rate.

In this embodiment, an explanation will be given specifically for a case wherein a pseudo-random number sequence, which is generated by the pseudo-random number generator 10 having a constant processing rate, is employed as a key series for the encipherer 30 in the sixth embodiment, for which the processing rate can be set.

Figure 34:
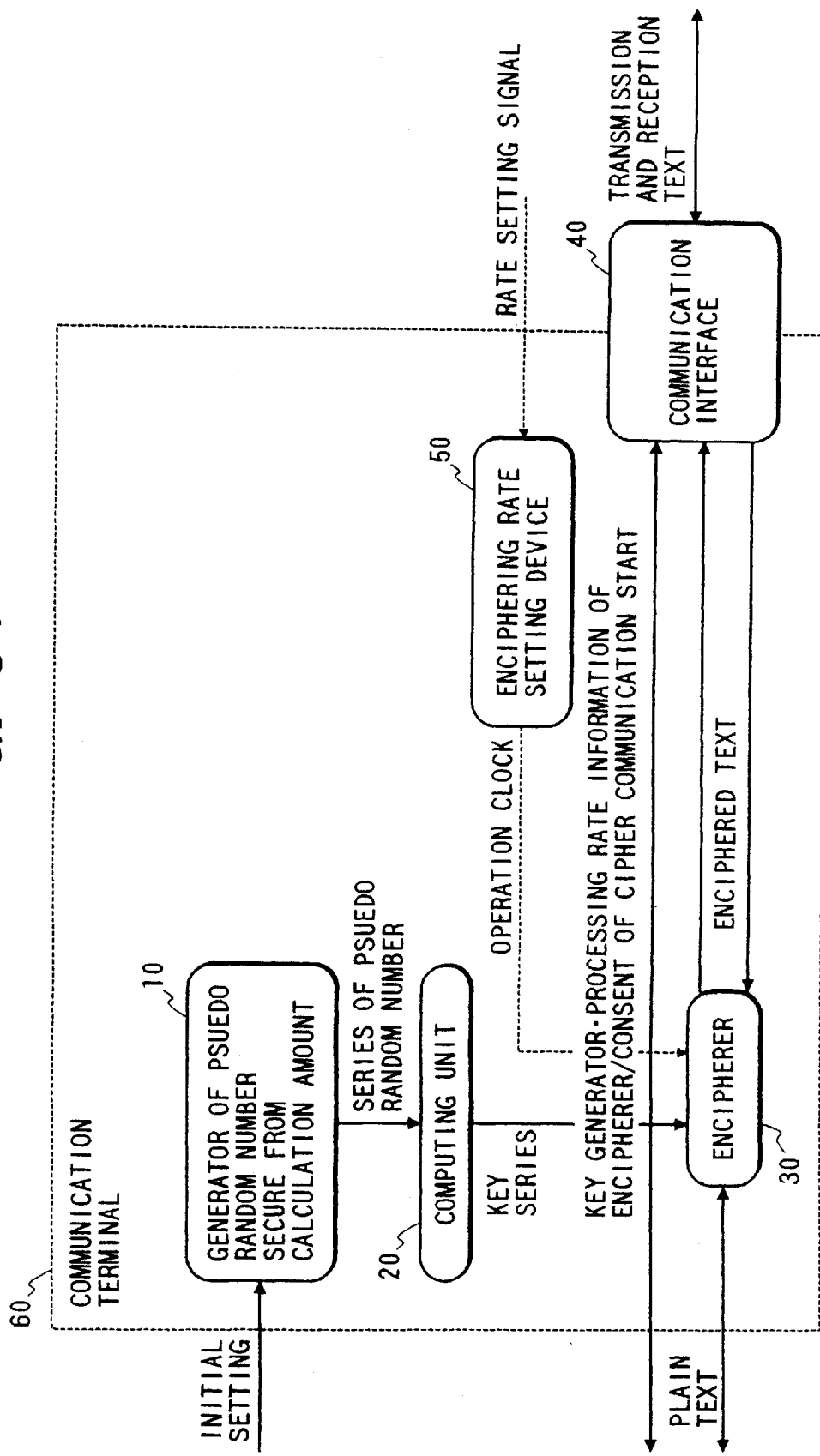
FIG. 34 is a block diagram illustrating a communication terminal according to a thirteenth embodiment of the present invention.

As is shown in FIG. 34, a communication terminal 60 in this embodiment comprises: an encipherer 30, for performing enciphering (deciphering) according to an algorithm that is specified by a network; a pseudo-random number generator 10, for generating random numbers, which are secure from a calculation amount, according to an algorithm that is specified by the network; a computing unit 20, for converting the pseudo-random number that is output by the pseudo-random number generator 10 into a key series for the encipherer 30; a communication interface 40; an enciphering rate setting device 50; and a generation rate setting device 13.

The enciphering rate setting device 50 in this embodiment is shown in FIG. 21. The processing rate for the encipherer 30 can be set externally by the enciphering rate setting device 50.

The communication interface 40 in the sixth embodiment is also used in this embodiment, as is the cryptographic communication network in FIG. 21. Cryptographic communication from subscriber A to subscriber B is performed using the same procedures as those in the twelfth embodiment, with the exception that instead of "information that indicates the processing rate for the encipherer 30 and the processing rate for the pseudo-random number generator 10," only "information that indicates the processing rate of the encipherer 30" is exchanged via the communication interface 40.

Fourteenth Embodiment

Figure 35:
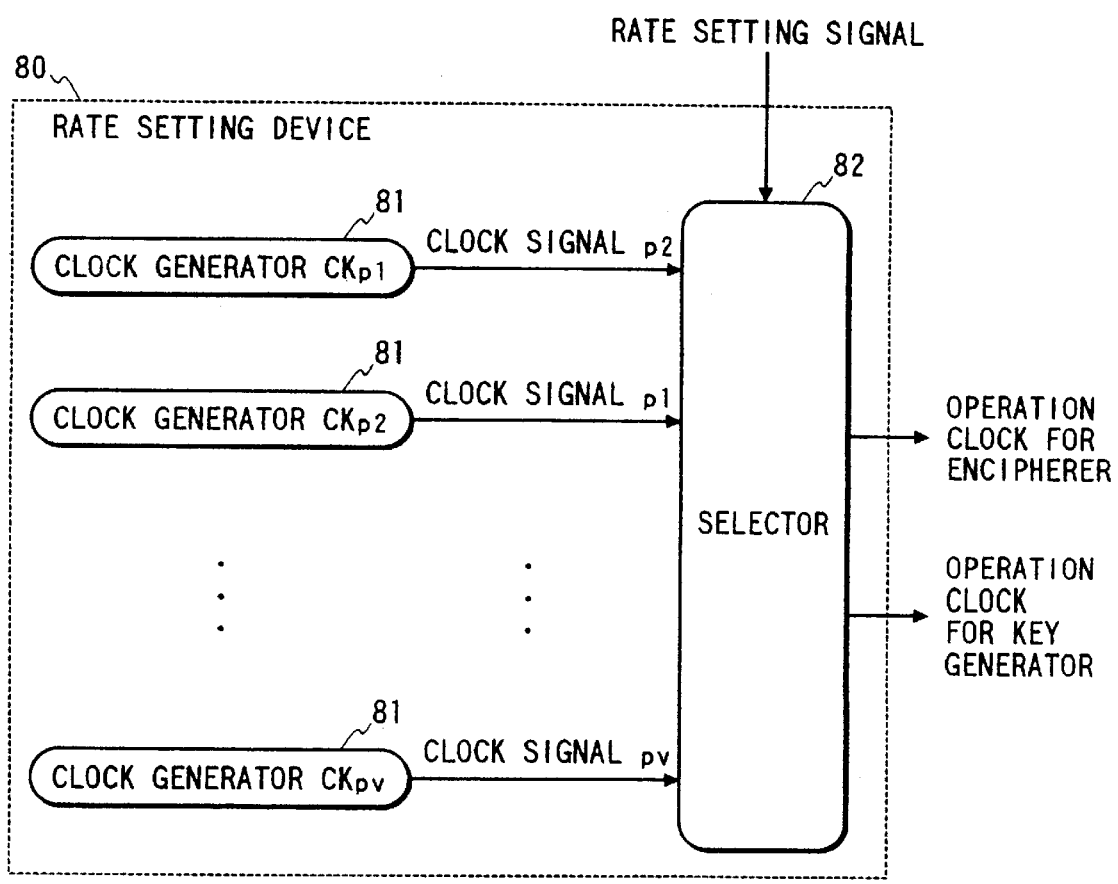
FIG. 35 is a block diagram illustrating a rate setting device according to a fourteenth embodiment of the present invention.

Although in the twelfth embodiment, the enciphering rate setting device 50 and the generation rate setting device, 13 in FIG. 21 are independent devices, in this embodiment, as is shown in FIG. 35, the two devices are integrally formed to provide a single rate setting device 80.

The rate setting device 80 in FIG. 35 comprises v clock generators 81 and a selector 82. Each of the clock generators 81, $CK_{pi}$, generates a clock signal $p_1$. The clock signals $p_1$, $p_2$, . . . and $p_v$ that are generated by the respective clock generators 81 are transmitted to the selector 82. The selector 82 transmits two output types: one is used as an operation clock for the encipherer 30, and the other is used as an operation clock for the pseudo-random number generator 10 and the computing unit 20. The selector 82 is controlled by a rate setting signal that is transmitted by a subscriber that operates the communication terminal 60, and the selector 82 inputs two of the three inputs.

With the arrangement shown in FIG. 35, the enciphering rate setting device and the generation rate setting device can be integrally formed.

As is described above, according to the embodiments, the enciphering rate and an encipher power are changed between a sender and a receiver that perform cryptographic communication, and a new enciphering rate and encipher power are used in common by the sender and the receiver before the transmission of enciphered text. As a result, a tradeoff involving the security for cryptography and the processing rate can be selected, which is conventionally impossible, and cryptographic communication having a high degree of freedom can be provided. In addition, even when the processing capability of the encipherer and pseudo-random number generator of the sender do not correspond to those of the receiver, cryptographic communication can be performed.

Fifteenth Embodiment

A fifteenth embodiment will now be described.

In this embodiment, in the system in the above embodiment wherein the enciphering (or deciphering) rate can be varied, a fee for an information providing service is assessed in consonance with the set processing rate. The accounting method is changed in consonance with one, or more, of a process repetition count for enciphering, a pseudo-random number generation rate, and a process repetition count for generation of pseudo-random numbers, as is described in the above embodiments.

A specific example for changing the accounting method in consonance with an enciphering rate will now be described.

Figure 36:
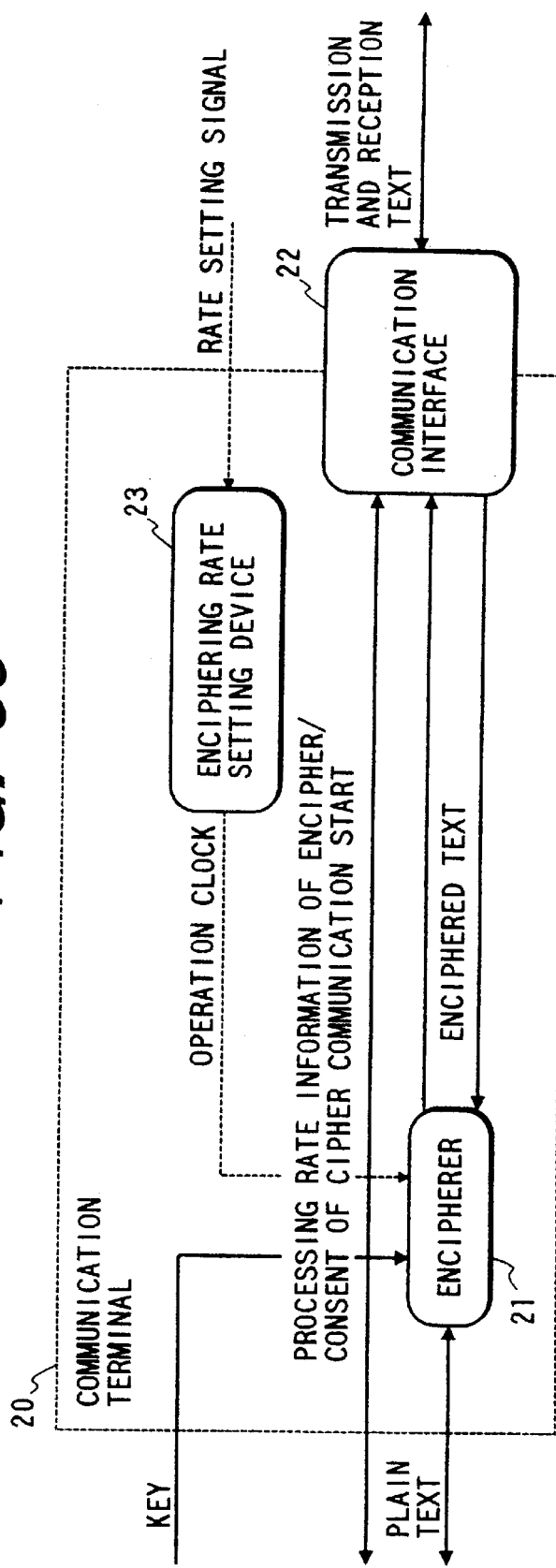
FIG. 36 is a block diagram illustrating a communication terminal according to a fifteenth embodiment of the present invention.

In this embodiment, an information providing center 10 and users of an information providing service perform cryptographic communication by using a communication terminal 20, as is shown in FIG. 36, that comprises an encipherer 21, for performing enciphering (deciphering) according to an algorithm that is specified by a network; a communication interface 22; and an enciphering rate setting device 23.

The enciphering rate for the encipherer 21 can be set by the enciphering rate setting device 23. A plurality of operation clocks having different frequencies are prepared for the encipherer 21, and one of these operation clocks is selected in consonance with the external setting for the enciphering rate.

Figure 37:
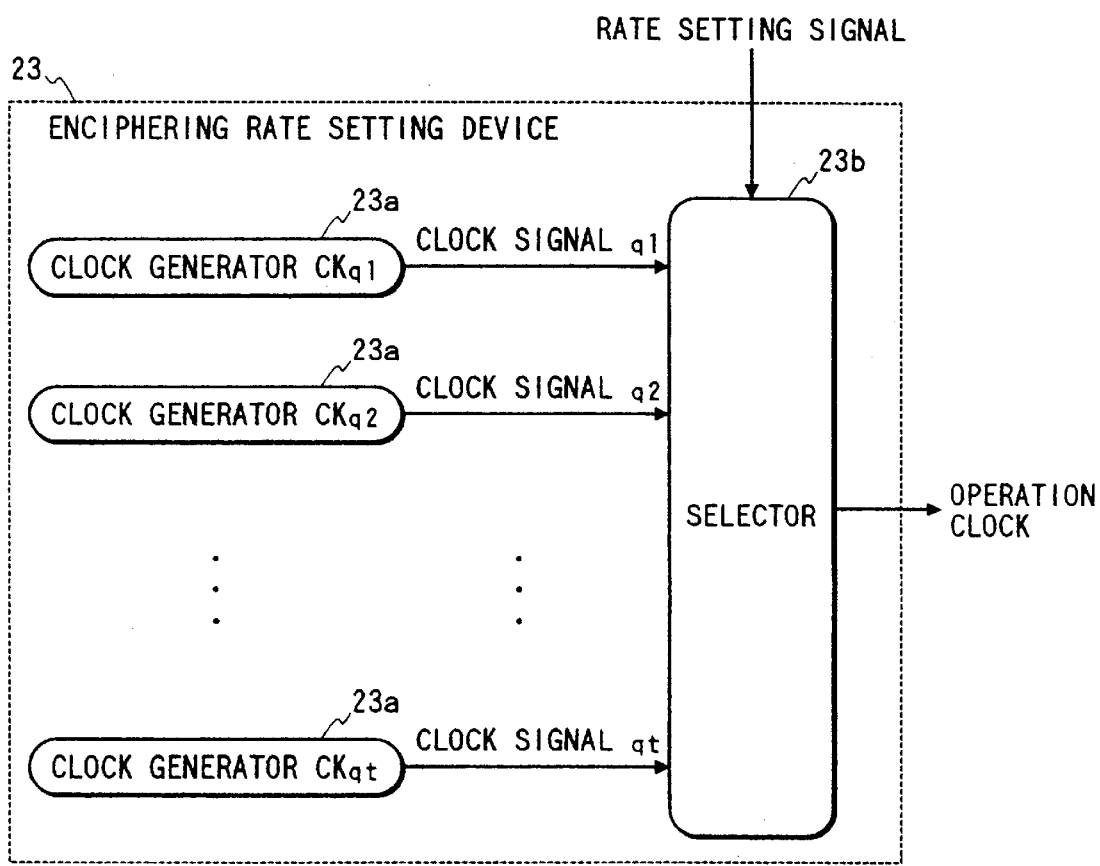
FIG. 37 is a block diagram illustrating an enciphering rate setting device for an encipherer according to the fifteenth embodiment of the present invention.

In FIG. 37 is shown an example enciphering rate setting device 23, which comprises t clock generators 23a and a selector 23b. Each of the clock generators 23a, $CK_{qi}$, generates a clock signal $q_i$. The clock signals $q_1$, $q_2$, . . . and $q_t$ that are generated by the clock generators 23a are transmitted to the selector 23b, and one of the input clock signals is selected by an information providing server and a user, who each use the communication terminal 20. The selector 23b is controlled by using a rate setting signal.

The communication interface 22 is employed to transmit to, or receive from, a transfer path information that indicates an enciphering (deciphering) rate, and transmission text that is enciphered by the encipherer 21.

The cryptographic communication network employed for this embodiment, which is shown in FIG. 4, comprises the information providing center and users A, B, . . . and M. Inherent and secret keys $K_A$, $K_B$, . . . and $K_M$ are employed in common between the information providing center and the users. The owning of a key in common can be accomplished by the information providing center setting the keys in advance, or by a well known system for the joint ownership of a key, as is described in Tsujii and Kasahara, "Cryptography And Information Security", Shokosha Co., Ltd., pp. 72 and 73, and pp. 97 to 104, 1990.

The users A through M of the cryptographic communication network in FIG. 4 that performs the information providing service have a portable storage device 30 shown in FIG. 22. A secret key, of the user that owns the portable storage device 30, that is required for cryptographic communication is stored in the portable storage device 30. If a user other than the owner knows the secret key, secret communication is not performed and a reliable information providing service can not be provided. Therefore, while taking security into consideration so as to restrict access to a secret key to an owner only, the portable storage device 30 is provided for each user in addition to the communication terminal 20. Although the portable storage device 30 may be part of the communication terminal 20, so long as a physically secure area can be ensured for each user, the communication terminal 20 that can be used for cryptographic communication by each user is limited. It is better for the communication terminal, 20 and the portable storage device 30 to be separately provided and for secret information belonging to each user to be not stored in the communication terminal 20. With this arrangement, which is convenient for a user, whatever type of communication terminal 20 a user may employ, the user can exchange secret information via his or her own portable storage device 30 for cryptographic communication.

The portable storage device 30 can exchange information with the communication terminal 20 across a safe communication path, and as a physically secure area, has holding means 31. Only an authorized owner can normally operate the portable storage device 30, and a procedure for the verification of a password, etc., is performed to determine whether or not a user is an authorized owner. An IC card, etc., is employed as the portable storage device 30.

Figure 38:
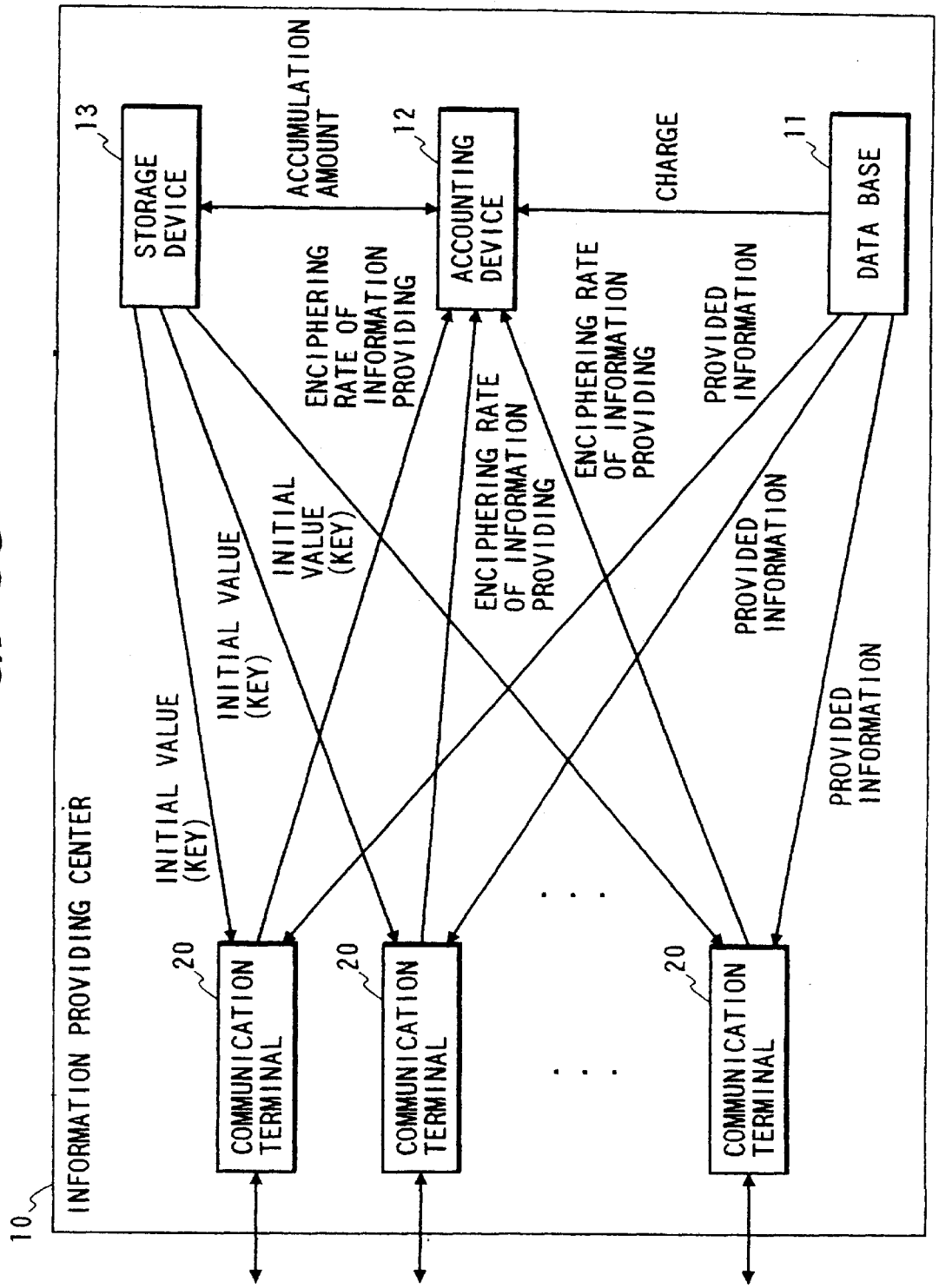
FIG. 38 is a block diagram illustrating an information providing center according to the fifteenth embodiment of the present invention.

As is shown in FIG. 38, the information providing center 10 comprises at least each of the following components: the communication terminal 20; a database 11, wherein information to be provided is stored; an accounting device 12, for calculating a charge in consonance with provided information and conditions for providing information; and a storage device 13, wherein are stored the secret keys of all the users, who are required for cryptographic communication, and service fee information. In FIG. 37, a plurality of communication terminals 20 are provided to enable the simultaneous transmission of information to a plurality of users. For a larger information providing system, more than one database 11, accounting device 12 and storage device 13 may be provided.

Figure 39:
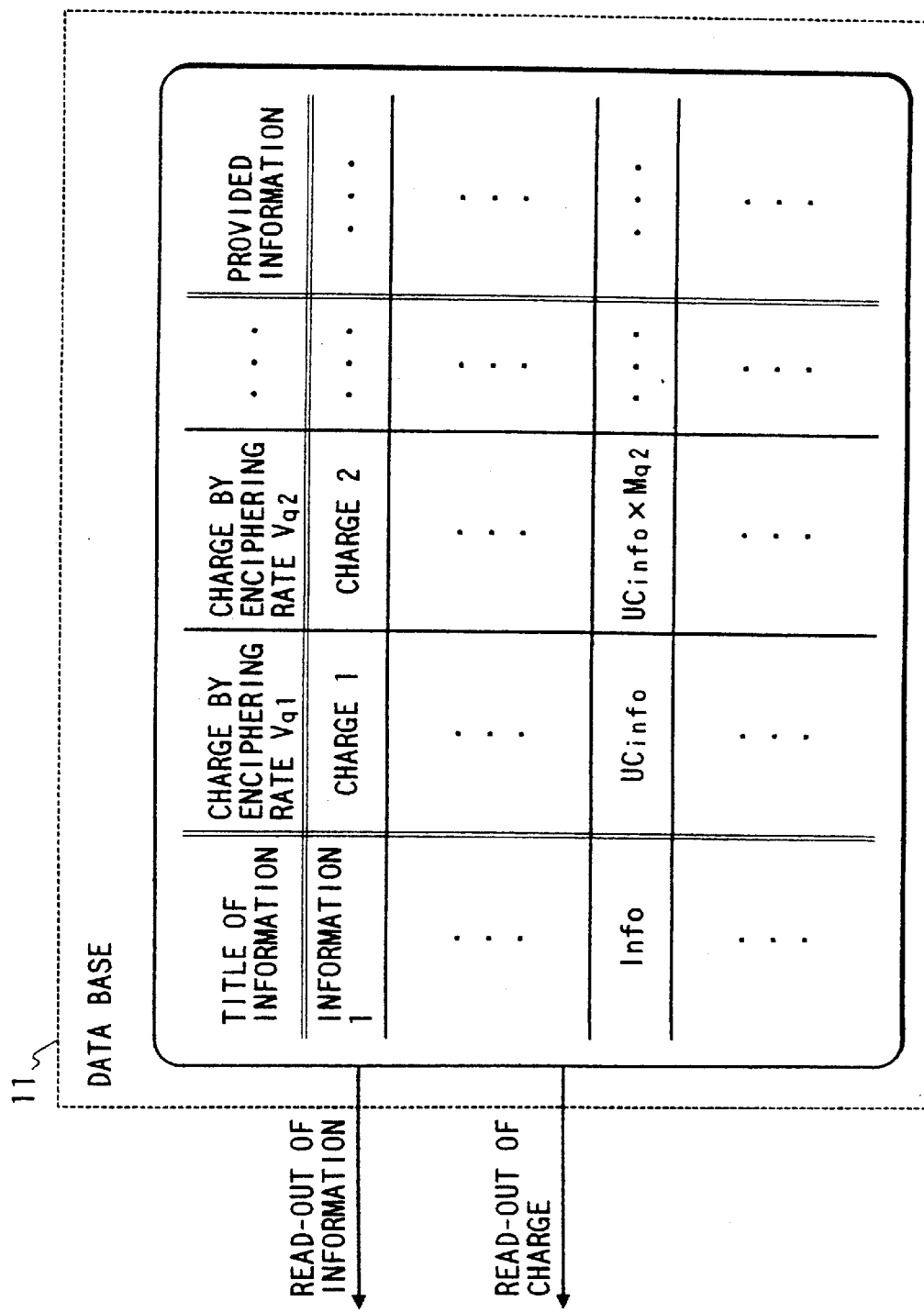
FIG. 39 is a block diagram illustrating a database according to the fifteenth embodiment of the present invention.

In the database 11 that is designed as is shown in FIG. 39 are stored information that is to be provided for users and corresponding charge information of providing information service. Charges in the charge information are divided in consonance with an enciphering rate at which the information is enciphered for the service. When, for example, the enciphering rate can be set to $V_{q1}$, $V_{q2}$, . . . or $V_{qt}$ by the enciphering rate setting device 23, a fee for providing the information at enciphering rate $V_{q1}$ is employed as a basic fee, and a fee for providing information at enciphering rate $V_{q2}$ is $M_{q2}$ times the basic fee, . . . , and a fee for providing information at enciphering rate $V_{qt}$ is $M_{qt}$ times the basic fee. A name is given to information so that a user can specify the information desired. The above described database 11 can be easily designed by using a conventional database as a base.

Figure 40:
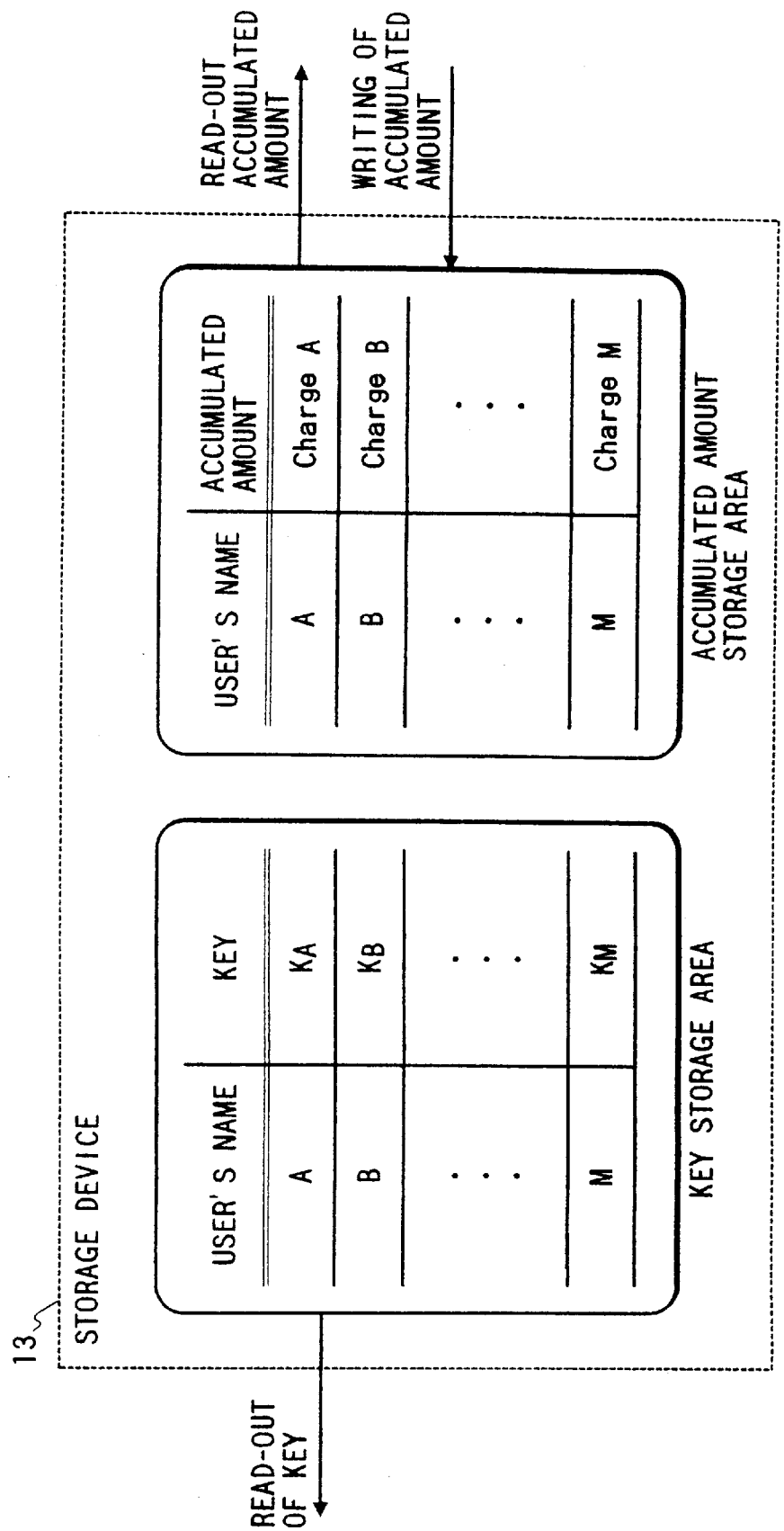
FIG. 40 is a block diagram illustrating a storage device according to the fifteenth embodiment of the present invention.

The storage device 13 that is designed as is shown in FIG. 40 has a key storage area, in which a secret, key that is required for cryptographic communication is stored for each user who is a member of the information providing network; and a cumulative account total storage area, in which a cumulative account total of service fees assessed during a specific period. This period is called a service fee totalization period. The fee totalization period is specified as one month, for example. The information providing center 10 employs the cumulative account total for each user that is stored in the cumulative account total storage area to calculate an information providing service fee for each user during the fee totalization period, and charges the user the calculated fee. When a specific fee totalization period has expired, the service fee for each user during the period that it was stored in the cumulative account total storage area is shifted as backup information to another storage means, and a service fee for each user in the cumulative account total storage area is reset.

Figure 41:
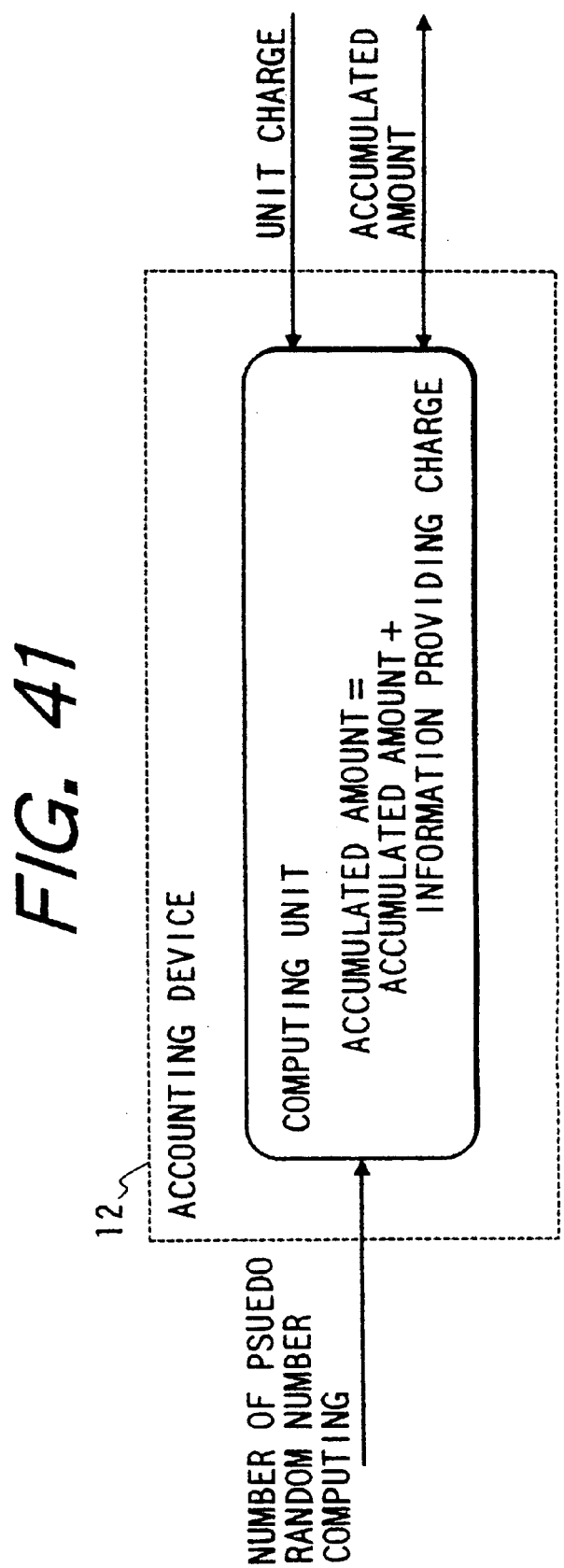
FIG. 41 is a block diagram illustrating an accounting device according to the fifteenth embodiment of the present invention.

The accounting device 12 is designed as is shown in FIG. 41. For the information that is currently being provided., the accounting device 12 assesses a fee in consonance with the enciphering rate that is employed for providing the information. The accounting device 12 can extract charge information from the database 11. The accounting device 12 adds a current information service fee to the cumulative account total, of a user to whom the information was provided, that is held in the storage device 13 in order to update the cumulative account total, and writes the new cumulative account total for the user in the cumulative account total storage area in the storage device 13.

The above described devices constitute the information providing network for this embodiment.

The following procedures are performed for a case wherein the user A requests specific information from the information providing center 10, the information providing center 10 transmits the requested information to the user A and charges the user A a fee for the information providing service. It is assumed herein that the user A has received the information service from the information providing center 10 several times during a current service fee totalization period, and that the cumulative charge for the user A for the current period, which is stored in the cumulative account total storage area in the storage device 13, is $Charge_A$. Further, it is assumed that the name of the information for which the user A requests the service is Info, and that a basic charge (the charge for providing the information at the enciphering rate $V_{q1}$) for Info is $UC_{Info}$. Further, it is assumed that the user A accepts enciphered rate $V_{qi}$ for providing Info. In addition, it is assumed that the information providing service fee at the enciphering rate $V_{qi}$ is $M_{qi}$ times the basic fee $UC_{Info}$ in consonance with the amount of information and the enciphering rate. Furthermore, it is assumed that the user A knows the information name. Info and the basic charge $UC_{Info}$, in advance. In the following explanation, it is assumed that authorization of the authentic user A to use his or her own portable storage device 30 has been obtained, and that the portable storage device 30 is so set in the operating state that it can communicate with the communication terminal 20. In addition, it is assumed that authorization has been obtained for the user A, as an authentic subscriber, to use the information providing center 10. The two authorizations can be provided by a well known authorization technique.

Information Providing Preprocedures of the Present Invention

1. The user A requests that the information providing center 10 provide the service for Info, and at the same time, notifies it of a desired enciphering rate, $V_{qi}$, for providing information.

2. Upon the request from the user A that the service for Info be provided, the information providing center 10 calculates a charge for the information providing service by using the unit charge $UC_{Info}$ for Info and the information service fee at the enciphering rate $V_{qi}$ which is $M_{qi}$ times the basic fee $UC_{Info}$ for Info, and transmits the obtained service fee information to the user A.

3. If the user A agrees with the received service fee information for Info, the user A requests that the information providing center 10 provide the service for Info. If the user does not agree with the received service fee information, the user notifies the information providing center 10 to cancel the service for Info, and this procedure is thereafter terminated.

The following procedures are employed when the user A requests that the information providing center 10 provide the service for information Info.

Information Providing Procedures of the Present Invention (for Information Providing Center)

1. According to a rate setting signal, the enciphering rate for the encipherer 21 is set to a rate that is determined by the preprocedures.

2. The secret key $K_A$, which is held in the key storage area for the user A in the storage device 13, is set to the encipherer 21.

3. Data are enciphered by the encipherer 21, and the enciphered data are transmitted to the user A via the communication interface 22.

Information Providing Procedures of the Present Invention (for User A)

1. According to a rate setting signal, the enciphering rate for the encipherer 21 is set to a rate that is determined by the preprocedures.

2. The secret key $K_A$, which is held in the portable storage device 30, is set to the encipherer 21.

3. The enciphered data are received from the information providing center 10 across the transfer path and via the communication interface 22, and are deciphered by the encipherer 21.

The accounting procedures will now be explained after the information providing center 10 has provided Info.

Present Invention Accounting Procedures (for Information Providing Center)

1. The accounting device 12 extracts the basic charge information $UC_{Info}$ for Info from the database 11, and also extracts information that a charge for the information providing service at the enciphering rate $V_{qi}$ is $M_{qi}$ times the basic charge $UC_{Info}$.

2. The accounting device 12 calculates an information providing charge from the basic charge information $UC_{Info}$ and $M_{qi}$. In this case, the charge is $M_{qi} \times UC_{Info}$.

3. The accounting device 12 adds the charge $M_{qi} \times UC_{Info}$ to the cumulative account total $Charge_A$ of the user A that is held in the storage device 13 to acquire a new cumulative account total, $Charge_A + M_{qi} \times UC_{Info}$, which is then written in the cumulative account total storage area for the user A in the storage device 13. It should be noted that the calculation of the cumulative account total is not required when a charge is cleared off each time.

Each time the service fee totalization period has expired, the information providing center 10 charges individual users the cumulative account total of fees for the users. Further, when the service fee totalization period is over, the;service charge, for each user for the period, that is held in the cumulative account total storage area is moved as backup information to another storage means, and the service fee for each user in the cumulative account total storage area is reset.

Through the above procedures, the enciphering rate can be selected with a high degree of freedom. When the capability of the communication terminal 20 of a user is low, a low charge for the information providing service can be set. When a user has a communication terminal 20 having a high capability and desires to use the high capability, a high charge for information providing service can be set.

It is not necessary to perform "Information providing preprocedures 1 of the present invention" for each communication. It is not required when, for example, a sender and a receiver determine a processing rate in advance and perform cryptographic communication in consonance with the rate.

Although in this embodiment, the accounting method is changed in consonance with the enciphering rate, the accounting method can be changed in consonance with a pseudo-random number generation rate, etc.

As is described, according to the above embodiments, the enciphering rate and the encipher power can be selected and the accounting procedures can be performed in consonance with a selected enciphering rate and encipher power. As a result, security for enciphering information can be provided and a service charge for it, or an enciphering rate and a corresponding service charge, can be selected that conventionally are not taken into consideration, and thus a charging system for information providing service with a high degree of freedom can be provided.

An explanation will be given for the invention for selectively using one of a plurality of enciphering systems, and the sixteenth through twenty-third embodiments for changing an accounting method in consonance with a selected enciphering system. The sixteenth through twenty-third embodiments are based on the following view points.

Sixteenth Embodiment: One enciphering system is selected from among a plurality of enciphering systems, and a charge for information providing service is calculated in accordance with a selected enciphering system.

Seventeenth Embodiment: An enciphering system is set for common-key cryptography and public-key cryptography, and a charge for information providing service is calculated in accordance with a set enciphering system.

Eighteenth Embodiment: One enciphering system is selected from among a plurality of block enciphering systems, and a charge for information providing service is calculated in accordance with a selected enciphering system.

Nineteenth Embodiment: A plurality of f functions are prepared for DES cryptography. One of them is selected to set an enciphering system, and a charge for information providing service is calculated in accordance with a selected enciphering system.

Twentieth Embodiment: One enciphering system is selected for block cryptography from among a plurality of operational modes, and a charge for information providing service is calculated in, accordance with a selected enciphering system.

Twenty-first Embodiment: One enciphering system is selected from among a plurality of enciphering systems "for performing enciphering while updating a key", and a charge for information providing service is calculated in accordance with a selected enciphering system.

Twenty-second Embodiment: Either an enciphering system "for performing enciphering using a fixed key" or an enciphering system "for performing enciphering while updating a key" is selected for block cryptography, and a charge for providing information service is calculated in accordance with a selected enciphering system.

Twenty-third Embodiment: It is possible to read an internal variable of a key generation and selection device that employs an enciphering system "for performing enciphering while updating a key" in the twenty-second embodiment.

The essence of this invention is that information providing service is provided between a sender and a receiver by using communication terminals that have selection means for selecting a specific enciphering system from among a plurality of enciphering systems, and that accounting means is included for calculating a charge for information providing service in accordance with an enciphering system that is set at the communication terminal. Therefore, by employing the above described communication terminal, an encipher power can be selected, and a charge for information providing service can be calculated in accordance with the security and a processing rate that are provided by the selected enciphering system.

The plurality of enciphering systems to be selected are not limited to the enciphering systems shown in the following embodiments. As is explained for the related art, there are many enciphering systems that are currently proposed and not all the enciphering systems can be explained in the embodiments. An enciphering system made by combining a plurality of enciphering systems is included as an enciphering system to be selected in the present invention.

Sixteenth Embodiment

Figure 42:
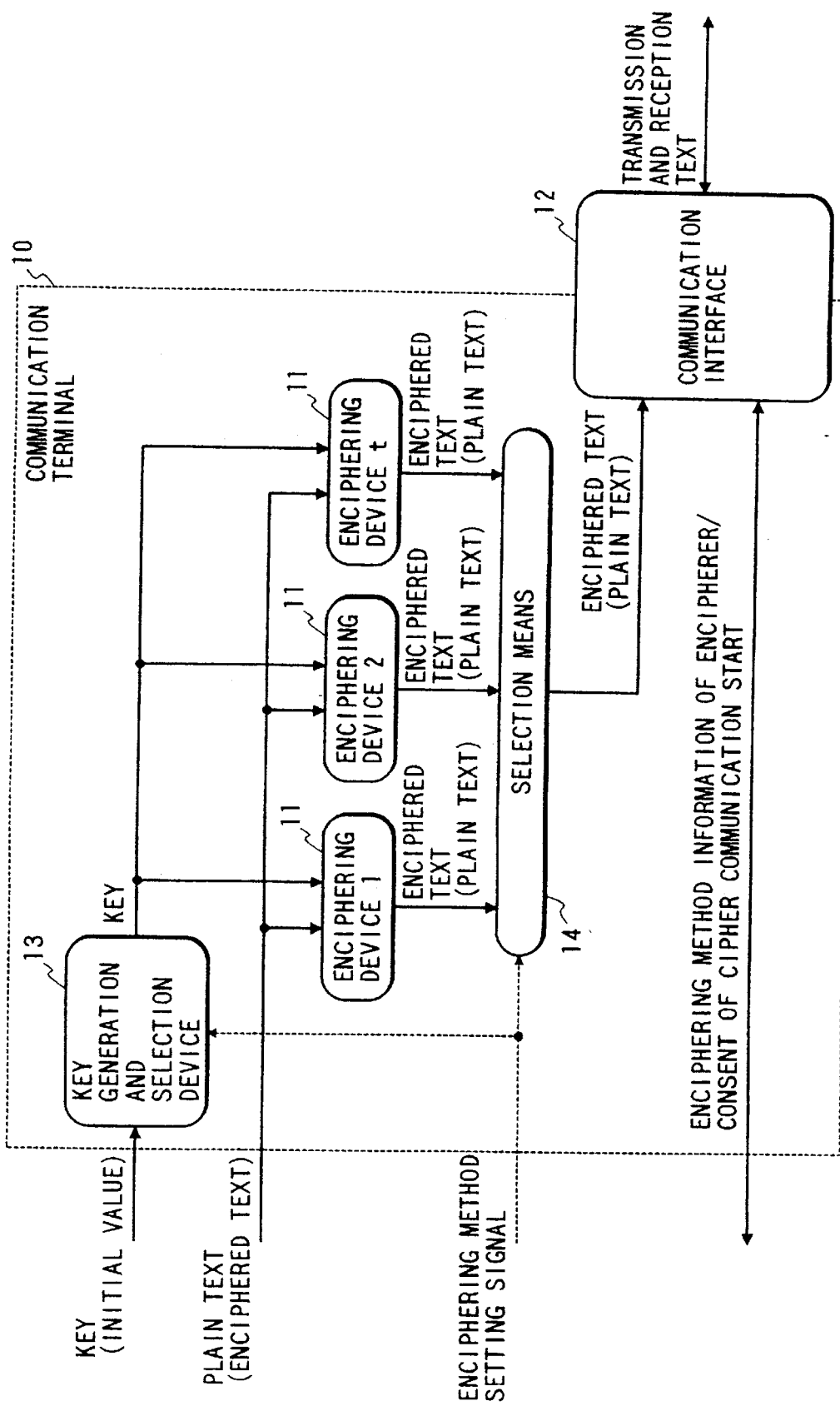
FIG. 42 is a block diagram illustrating a communication terminal according to a sixteenth embodiment of the present invention.

In this embodiment, cryptography communication is performed by using a communication terminal 10, shown in FIG. 42, that comprises a plurality of enciphering devices 11 for performing enciphering (and deciphering); a communication interface 12; a key generation and selection device 13; and selection means 14 for selecting one of the outputs of the enciphering devices 11.

The enciphering devices 11 employ different enciphering systems. In this embodiment, it is assumed that there are t types of enciphering systems: enciphering system 1, enciphering system 2, . . . , and enciphering system t. The processing for these enciphering systems is performed by the enciphering devices 11: enciphering device 1, enciphering device 2, . . . and enciphering device t. Further, one of the enciphering devices 11 that is to be used can be selected by an enciphering method setting signal. In the following explanation, an enciphering device 11 is called encipherer 1, . . . or t, as needed.

The selection means 14 is controlled by an enciphering method setting signal, and can select one of the enciphering devices 11. When it is desired that a process for the enciphering system 1 be performed, the selection means 14 is so set by an enciphering method setting signal that it selects the output of encipherer 1. Similarly, when a process for the enciphering system 2 is to be performed, the selection means 14 is so controlled by an enciphering method setting signal that it selects the output of encipherer 2.

The communication interface 12 is employed to transmit to, or receive from, a transfer path information that designates an enciphering system and transmission text that is enciphered by the enciphering device 11.

Since generally the length of a key differs for each enciphering system, the key generation and, selection device 13 is also provided as means for generating or selecting a key that corresponds to an enciphering system, which is selected by an enciphering method setting signal. The key generation and selection device 13 generates, from a single key that has a specific length, a key that corresponds to a selected enciphering system. Or, the key generation and selection device 13 prepares, in advance, corresponding keys in a number equivalent to the number of enciphering systems that can be realized by the enciphering devices 11, and selects a key from among them that corresponds to a selected enciphering system.

Figure 43:
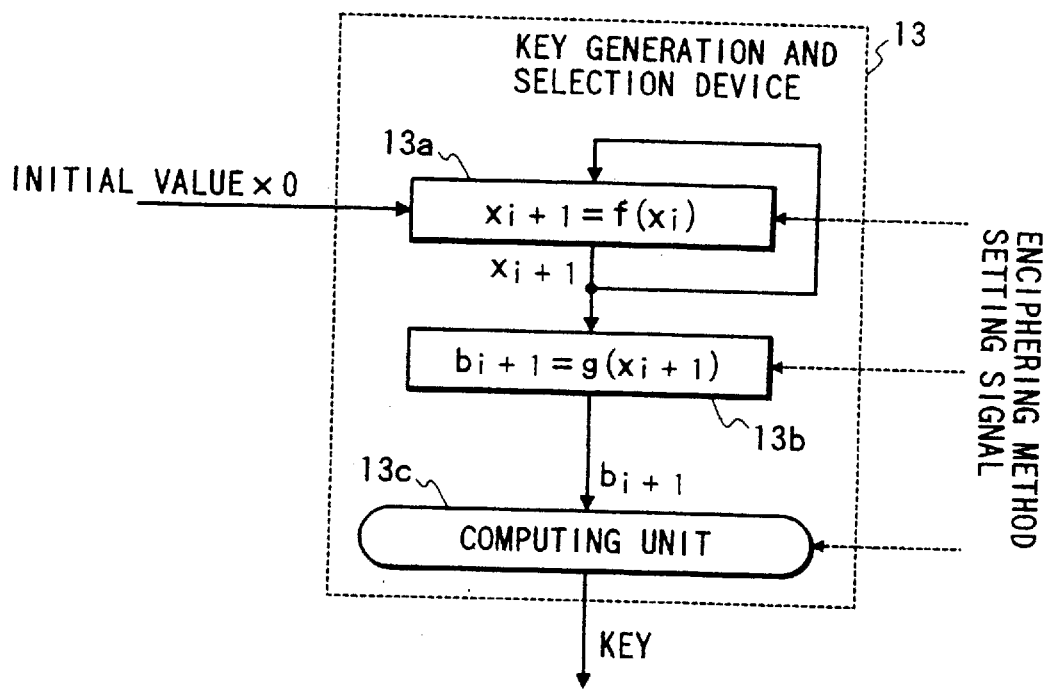
FIG. 43 is a block diagram illustrating a key generation and selection device according to the sixteenth embodiment of the present invention.

In FIG. 43 is an example key generation and selection device 13. The key generation and selection device 13 generates a key according to the following algorithm. One key, which has a specific length, that is input to the key generation and selection device 13 is employed as an initial value ($x_0$) according to the following algorithm.

$$x_{i+1}=f(x_i)\ (i=0, 1, \ldots) \quad (1)$$

$$b_{i+1}=g(x_{i+1})\ (i0, 1, \ldots) \quad (2).$$

As is shown in FIG. 43, the key generation and selection device 13 comprises a processor 13a for performing feedback calculation using expression (1); a processor 13b for calculating expression (2); and a computing unit 13c for converting into a key an output having a length, which is provided by the processor for calculating expression (2), that is required for a key that corresponds to an enciphering system selected by an enciphering method setting signal.

The computing unit 13c converts $b_1, b_2, \ldots$ and $b_i$, which are output by the processor 13b for calculating expression (2), into keys having lengths that correspond to an enciphering system that is selected by an enciphering method setting signal. A key is a series of bits having a length that is specified by the algorithm of the selected enciphering system. The series of bits is generated in such a manner that the computing unit 13c arranges $b_1, b_2, \ldots$ and $b_i$ in ascending order, or rearranges them.

The operation of the key generation and selection device 13 is as follows:

1. Initial value $x_0$ is input to the key generation and selection device 13.

2. $x_1, x_2, \ldots, x_i$ are generated by expression

3. The generated $x_1, x_2, \ldots, x_i$ are substituted into expression (2), and $b_1, b_2, \ldots, b_i$ are obtained and are output.

4. The computing unit 13c outputs $b_1$, $b_2$, ..., and bias keys that correspond to an enciphering system that is selected by an enciphering method setting signal.

For the key generation and selection device 13, how many times calculations for expressions (1) and (2) should be performed is designated by an enciphering method setting signal, and the length of a key to be output is controlled by the computing unit 13c. The key generation and selection device generates a key having a length that corresponds to an enciphering system that is selected by an enciphering method setting signal.

Figure 44:
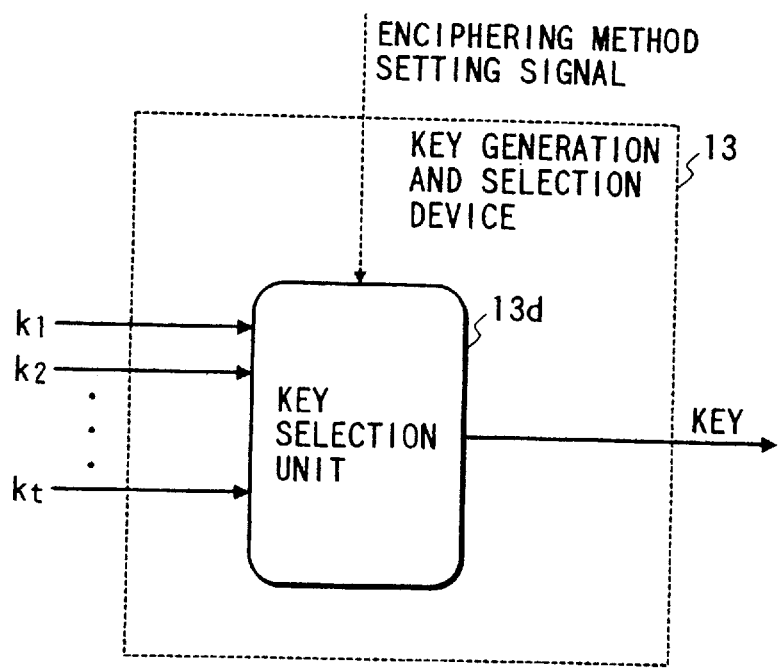
FIG. 44 is a block diagram illustrating another key generation and selection device according to the sixteenth embodiment of the present invention.

The key generation and selection device 13 can be designed as is shown in FIG. 44. The key generation and selection device 13 in FIG. 44 comprises t keys, $k_1$, $k_2$, ... and $k_t$, and key selection means 13d. The keys $k_1$, $k_2$, ... and $k_t$ are input to the key selection means 13d, and one of them is selected by an enciphering method setting signal. In this manner, a key is selected, which has a length that corresponds to an enciphering system that is selected by an enciphering method setting signal.

In this embodiment, the key generation and selection device 13 in FIG. 43 is employed, which generates from a key having a specific length a key that corresponds to a selected enciphering system.

A cryptographic communication network employed for this embodiment is shown in FIG. 4, which comprises the information providing center and users A, B, ... and M. Inherent and secret keys $K_A$, $K_B$, ... and $K_M$ are employed in common between the information providing center 10 and the users.

The ownership of a key in common can be achieved by the information providing center 10 setting the keys in advance, or by a well known system for the joint ownership of a key, as is described in Tsujii and Kasahara, "Cryptography And Information Security", Shokosha Co., Ltd., pp. 72 and 73, and pp. 97 to 104, 1990.

The users A through M of the cryptographic communication network that performs information providing service have a portable storage device shown in FIG. 22 that is described in the previously mentioned embodiments. A secret key, belonging to the user that owns the portable storage device 30, that is required for cryptographic communication is stored in the portable storage device 30. If a user other than the owner knows the secret key, secret communication can not be performed and a reliable information providing service can not be achieved. Therefore, taking security into consideration so as to limit the access to secret keys and release them only to owners, one of the portable storage devices 30 is provided for each user in addition to a communication terminal 10. Although the portable storage device 30 may be part of the communication terminal 10 so long as a physically secure area can be ensured for each user, the communication terminal 10 that can be used for cryptographic communication by each user is limited. It is better that the communication terminal 10 and the portable storage device 30 be separately provided and that secret information for each user not be stored in the communication terminal 10. With this arrangement, which is convenient for a user, whatever type of communication terminal 10 a user may employ, the user can exchange secret information via his or her own portable storage device 30 for cryptographic communication.

The portable storage device 30 can exchange information with the communication terminal 10 across a safe communication path, and has a physically secure area as holding means 30a. Only an authorized owner can normally operate the portable storage device 30, and the procedure for verifying a password, etc., is performed to determine whether or not a user is an authorized owner. An IC card, etc., is employed as the portable storage device 30.

Figure 45:
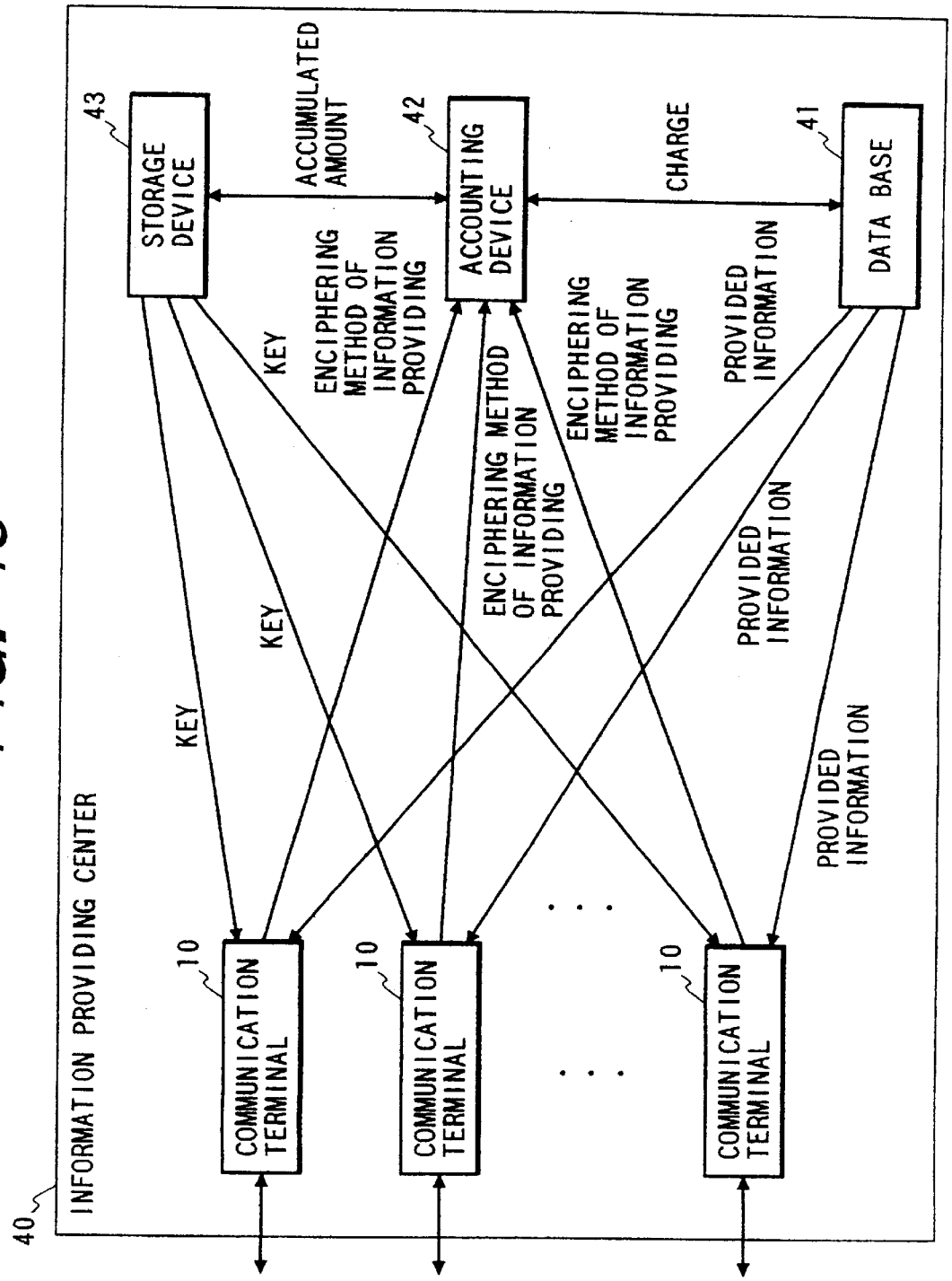
FIG. 45 is a block diagram illustrating an information providing center according to the sixteenth embodiment of the present invention.

In FIG. 45 is shown the arrangement of an information providing center 40. The information providing center 40 comprises at least each of the following components: a communication terminal 10; a database 41 wherein information to be provided is stored; an accounting device 42 for accounting a charge in consonance with provided information and conditions for information providing; and a storage device 43 wherein are stored the secret keys of all the users, which are required for cryptographic communication, and service fee information. In FIG. 45, a plurality of communication terminals 10 are provided to enable the simultaneous transmission of information to a plurality of users. For a larger information providing system, more than one database 41, accounting device 42 and storage device 43 may be provided.

In the database 41 that is designed as is shown in FIG. 46 are stored information that is to be provided for users and corresponding charge information for providing information service. Charges in the charge information are divided in consonance with an enciphering rate at which the information is enciphered for the service. When, for example, the enciphering system can be set to $C_1$, $C_2$, ... or $C_t$ by the enciphering method setting signal, a charge is set accordingly, with a fee for providing information i using the enciphering system $C_j$ being set to $P_{i,j}$. The above described database 41 can be easily designed by using a conventional database as a base.

When a charge is to be calculated while taking the communication time required for information providing service into consideration, $Pi_{i,j}$ is set as an information providing service charge for a unit of communication time. The number of units of communication time required for providing information providing service is calculated. The information providing service charge for the communication time unit is multiplied by an obtained value, and the resultant value is assessed as an information providing service fee.

Figure 47:
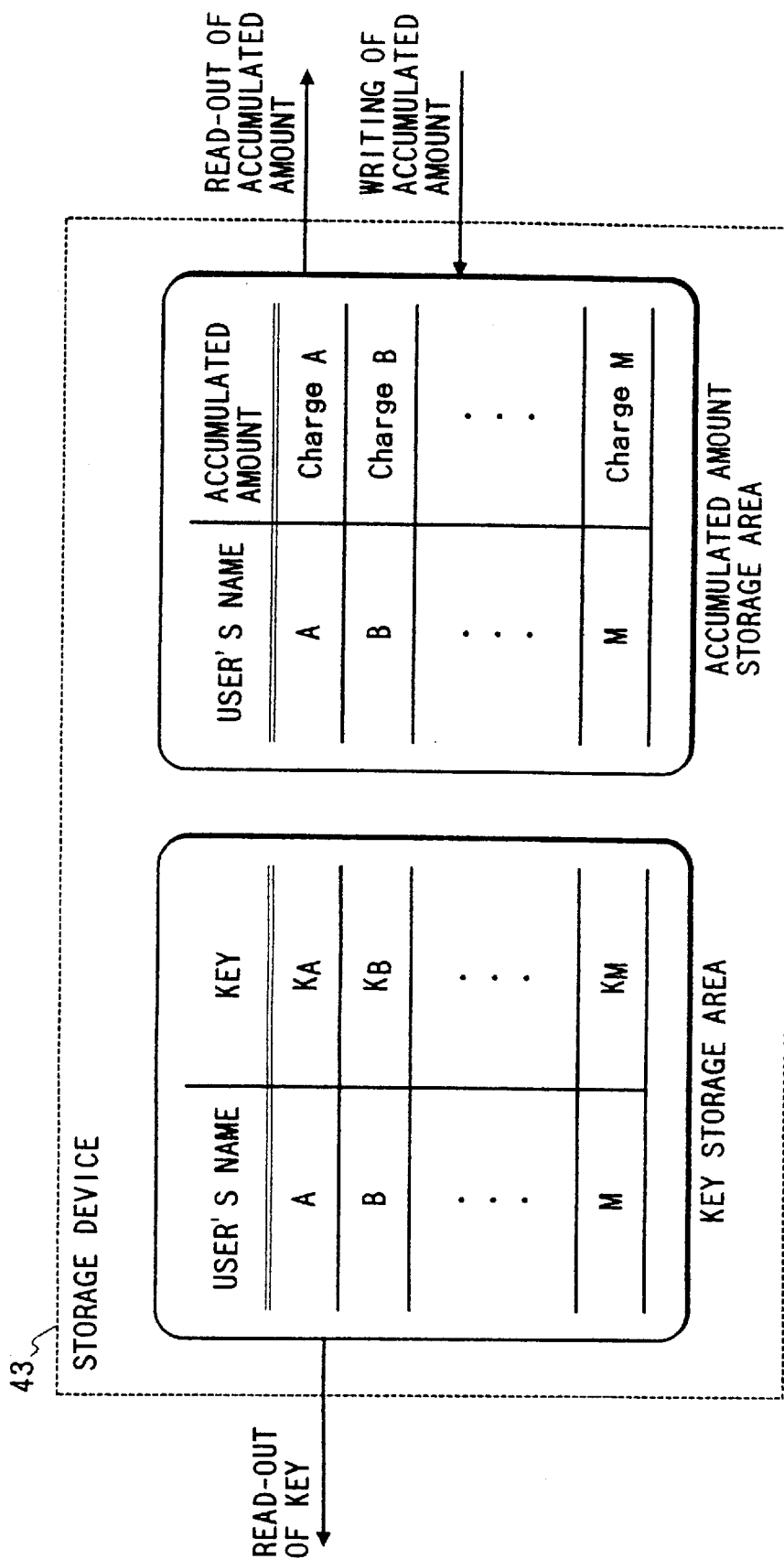
FIG. 47 is a block diagram illustrating a storage device according to the sixteenth embodiment of the present invention.

The storage device 43 that is designed as is shown in FIG. 47 has a key storage area, in which a secret key that is required for cryptographic communication is stored for each user who is a member of the information providing network, and a cumulative account total storage area, in which a cumulative account total of service fees assessed during a specific period is stored. This period is called a service fee totalization period. The fee totalization period is specified as one month, for example. The information providing center 40 employs the cumulative account total for each user that is stored in the cumulative account total storage area to calculate a fee for each user for information providing service during the fee totalization period, and charges the user the calculated fee. When a specific fee totalization period has expired, the service fee for each user during the period that was stored in the cumulative account total storage area is shifted as backup information to another storage means, and a service fee for each user in the cumulative account total storage area is reset. It should be noted that the cumulative account total storage area is not necessary when a charge is cleared off each time information is provided.

Figure 48:
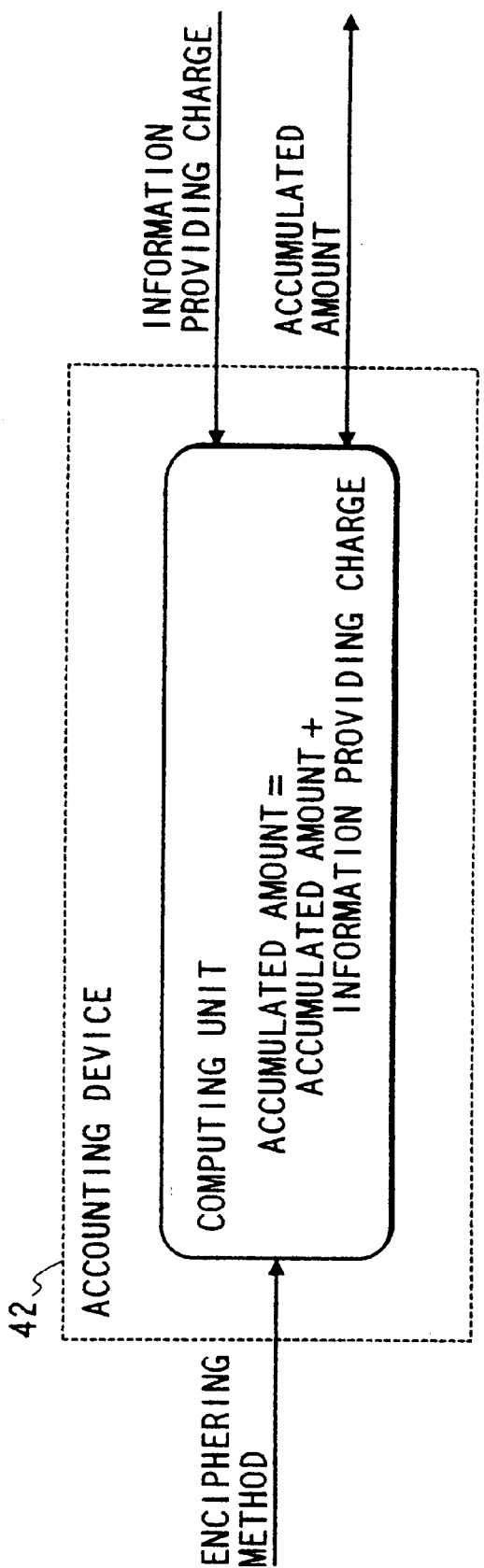
FIG. 48 is a block diagram illustrating an accounting device according to the sixteenth embodiment of the present invention.

The accounting device 42 is designed as is shown in FIG. 48. For information that is currently being provided, the accounting device 42 assesses a fee in consonance with the enciphering system that is employed for providing the information. The accounting device 42 can extract charge information from the database 41. The accounting device 42 adds a current information service fee to the cumulative account total, of a user to whom the information is provided, that is held in the storage device 43 to update a cumulative account total, and writes the new cumulative account total in the cumulative account total storage area for the user in the storage device 43. It should be noted that when a charge is cleared off each time information is provided, it is not necessary to calculate a cumulative account total and write it in a storage area.

The above described devices constitute the information providing network for this embodiment.

The following procedures are performed for a case wherein the user A requests specific information from the information providing center 40, the information providing center 40 transmits the requested information to the user A and charges the user A a fee for the information providing service.

It is assumed herein that the user A has received the information service from the information providing center 40 several times during a current service fee, 1totalization period, and that the cumulative charge for the user A for the current period, which is stored in the cumulative account total storage area in the storage device 43, is $Charge_A$. Further, it is assumed that the name of the information for which the user A requests the service is Info. Further, it is assumed that the user A desires enciphered system $C_j$ be used for providing Info. In addition, it is assumed that the information providing service fee for enciphering system $C_j$ is $P_{Info,j}$, in accordance with the amount of information and an enciphering rate. Furthermore, it is assumed that the user A knows the information name Info and the basic charge $P_{Info,j}$ in advance.

In the following explanation, it is assumed that authorization for the authentic user A has been provided by his or her own portable storage device 30 and that the portable storage device 30 is so set in the operating state that it can communicate with the communication terminal 10. In addition, it is assumed that authorization for the user A as an authentic subscriber has been provided by the information providing center 40. The two authorizations can be provided by a well known authorization technique.

Information Providing Preprocedures of the Present Invention

1. The user A requests that the information providing center 40 provide the service for Info, and at the same time, notifies it of a desired enciphering system, $C_j$, for providing information.

2. Upon the request from the user A for the service for Info, the information providing center 40 transmits to the user A the charge $P_{Info,j}$ for information providing service using enciphering system $C_j$.

3. If the user A agrees with the received information service fee for Info, the user A requests the information providing center 40 to provide Info. If the user does not agree with the received information service fee, the user notifies the information providing center 40 to cancel the service for Info, and this procedure is thereafter terminated.

The following procedures are employed when the user A requests the information providing center 40 for the service for information Info.

Information Providing Procedures of the Present Invention (for Information Providing Center)

1. The selection means 14 is so set by an enciphering method setting signal that it selects the output of an enciphering system that is determined by the preprocedures.

2. The secret key $K_A$, which is held for the user A in the key storage area in the storage device 43, is set as an initial value to the key generation and selection device 13. A key is generated that corresponds to the enciphering system that is selected according to the enciphering method setting signal. The generated key is set in the enciphering device 11.

3. The enciphering device 11 enciphers data, the selection means 14 selects enciphered text that is output by the enciphering device 11, which is determined by the preprocedures, and transmits the selected enciphered text to the user A via the communication interface 12.

Information Providing Procedures of the Present Invention (for User A)

1. The selection means 14 is so set by an enciphering method setting signal that it selects the output of the enciphering system that is determined by the preprocedures.

2. The secret key $K_A$, which is held in the portable storage device 30, is set as an initial value to the key generation and selection device 13, which in turn generates a key that corresponds to an enciphering system that is selected by an enciphering method setting signal. The generated key is set to the enciphering device 11.

3. The enciphered data are received from the information providing center 40 across a transfer path via the communication interface 12, and are deciphered by the enciphering device 11. The selection means 14 receives plaintext that is output by the enciphering device 11, which is determined by the preprocedures.

The key generation:and selection device in FIG. 44 can be used. In this case, the key shown in FIG. 4 is a series of a plurality of keys. In other words, key $K_A$, which is owned in common by the information providing center 40 and the user A, is constituted by key $K_{A1}$ for enciphering system 1, $K_{A2}$ for enciphering system 2, . . . , and $K_{At}$ for enciphering system t.

The information providing service from the information providing center 40 to the user A in this embodiment is performed according to the following procedures. As the preprocedures are the same as those described above, no explanation for them will be given.

Information Providing Procedures of the Present Invention (for Information Providing Center)

1. The selection means 14 is so set by an enciphering method setting signal that it selects the output of an enciphering system that is determined by the preprocedures.

2. The secret key $K_A$ (consisting of $K_{A1}, K_{A2}, \ldots$ and $K_{At}$), which is held for the user A in the key storage area in the storage device 43, is set to the key generation and selection device 13. A key is selected that corresponds to the enciphering system that is selected from among the plurality of keys $K_{A1}, K_{A2}, \ldots$ and $K_{At}$ according to the enciphering method setting signal. The generated key is set in the enciphering device 11.

3. The enciphering device 11 enciphers data, the selection means 14 selects enciphered text that is output from the enciphering device 11, which is determined by the preprocedures, and transmits the selected enciphered text to the user A via the communication interface 12.

Information Providing Procedures of the Present Invention (for User A)

1. The selection means 14 is so set by an enciphering method setting signal that it selects the output of:the enciphering system that is determined by the preprocedures.

2. The secret key $K_A$ (consisting of $K_{A1}, K_{A2}, \ldots$ and $K_{At}$), which is held in the portable storage device 30, is set to the key generation and selection device 13. From among the plurality of keys $K_{A1}, K_{A2}, \ldots$ and $K_{At}$, the key generation and selection device 13 selects a key that corresponds to an enciphering system that is selected by an enciphering method setting signal. The generated key is set to the enciphering device 11.

3. The enciphered data are received from the information providing center 40 across a transfer path via the communication interface 12, and are deciphered by the enciphering device 11. The selection means 14 receives plaintext that is output by the enciphering device 11, which is determined by the preprocedures.

The accounting procedures will now be explained for after the information providing center 40 has provided Info. This accounting procedures have the key generation and selection device 13 in common with FIGS. 43 and 44.

Present Invention Accounting Procedures

1. The accounting device 42 extracts from the database 41 information that a charge for providing Info with enciphering system $C_j$ is $P_{Info}$.

2. The accounting device 42 calculates an information providing charge. In this case, the charge is $P_{Info,j}$.

3. The accounting device 42 adds the charge $P_{Info}$ to the cumulative account total Charge$_A$ of the user A, which is held in the storage device 43, to acquire a new cumulative account total, Charge$_A$+$P_{Info,j}$, which is then written for the user A in the cumulative account total storage area in the storage device 43. It should be noted that the calculation of the cumulative account total is not required when a charge is cleared off each time.

Each time the service fee totalization period has expired, the information providing center 40 charges each individual user the cumulative account total of fees assessed for the user. Further, when the service fee totalization,period has expired, the service charge, for each user for the period, that is held in the cumulative account total storage area is moved as, backup Information to another storage means, and the service fee for each user in the cumulative account total storage area is reset.

Through the above procedures, the enciphering system can be selected with a high degree of freedom. When an enciphering system is to be selected wherein the security is high but a load imposed for enciphering is great, a charge for the information providing service can be set high. When an enciphering system is to be selected wherein the security is low but an imposed load for enciphering is small, a charge for the information providing service can be set low.

In other words, in this embodiment, between the information providing center 40 and a user, cryptographic communication can be performed for which the encipher power of the communication terminal 10 and the information providing service charge can be selected.

It is not necessary to perform the [Information providing preprocedures of the present invention] for each communication. It is not required, for example, when the information providing center 40 and a user determine an enciphering system in advance and perform cryptographic communication in consonance with the system.

Seventeenth Embodiment

Figure 49:
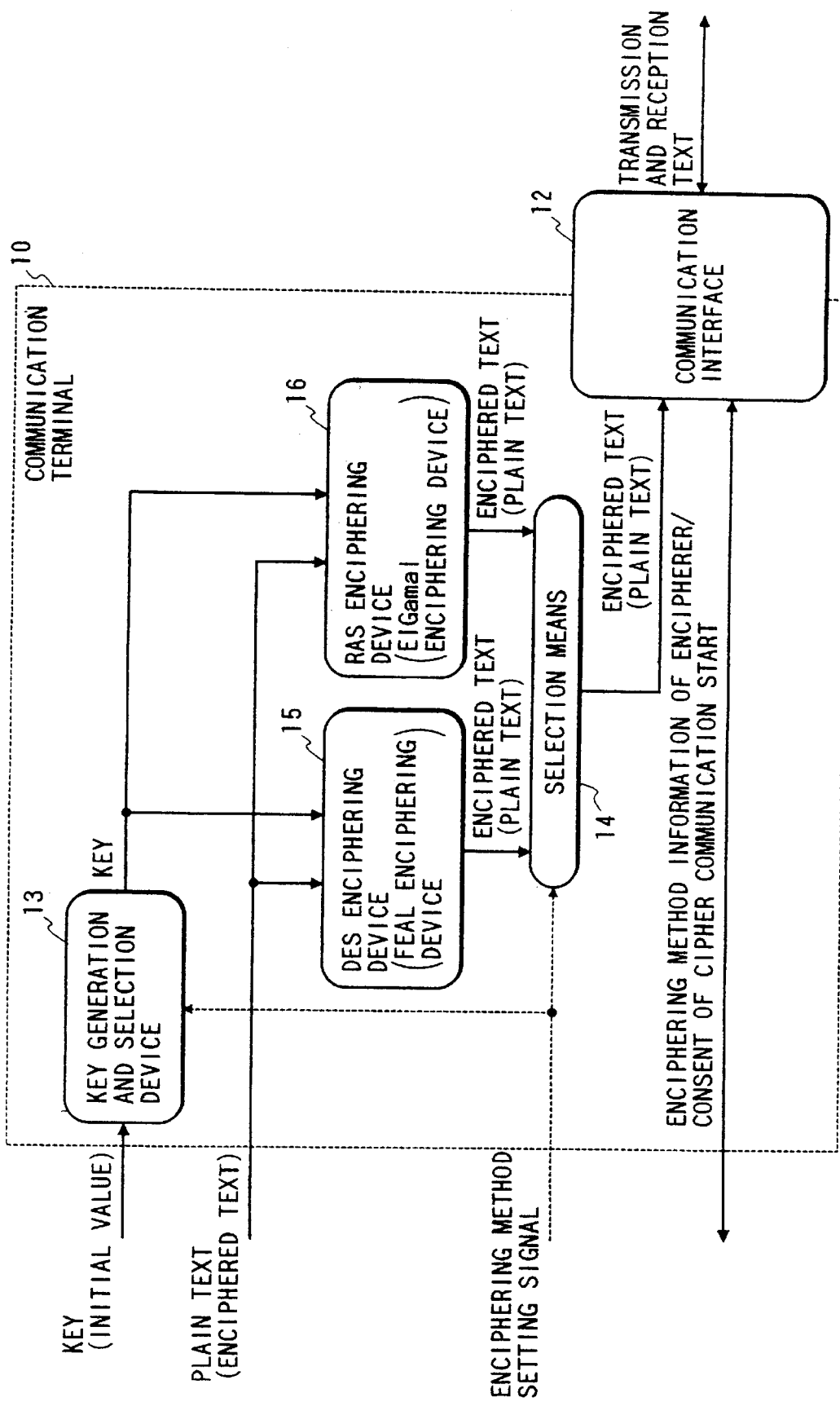
FIG. 49 is a block diagram illustrating a communication terminal according to a seventeenth embodiment of the present invention.

In this embodiment, a communication terminal 10 shown in FIG. 49 is employed, which comprises a plurality of encipherers, 15 and 16, for performing enciphering (and deciphering); a communication interface 12; a key generation and selection device 13; and selection means for selecting one of the outputs of the encipherers 15 and 16.

Two enciphering systems are employed in this embodiment:
 1. DES enciphering system (or FEAL enciphering system) as a specific common-key enciphering system;
 2. RSA enciphering system (or ElGamal enciphering system) as a specific public-key enciphering system. The DES enciphering device (or the FEAL enciphering device) 15 and the RSA enciphering device (or the ElGamal enciphering device) 16 accomplish the process of the embodiment. The DES enciphering system, the FEAL enciphering system, the RAS enciphering system, and the ElGamal enciphering system are introduced merely as specific examples for common-key enciphering or public-key enciphering, and the present invention is not limited to these and can be applied for other cryptographic algorithms.

When the communication terminal 10 in FIG. 49 is employed by the DES enciphering system, the selection means selects the output from the DES enciphering device 15. When the communication terminal 10 is employed by the RAS enciphering system, the selection means 14 selects the output from the RSA enciphering device 16.

The key generation and selection device 13, the communication interface 12 and the selection means 14 in this embodiment are the same as those in the sixteenth embodiment. It should be noted that the key generation and selection device 13 in FIG. 44 is employed to select a key that corresponds to an enciphering system, which is selected by an enciphering method setting signal. More specifically, when the DES enciphering system is selected, a key that is distributed in advance for DES enciphering is selected. When the RSA enciphering system, is selected, a public key for RSA enciphering is selected.

Figure 50:
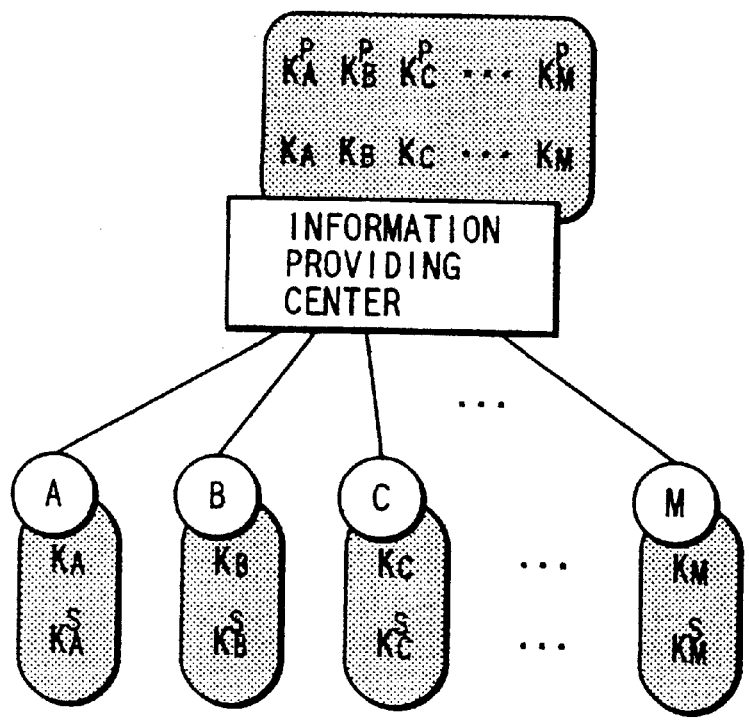
FIG. 50 is a diagram illustrating the configuration of a common-key and a public-key cryptographic communication network according to the seventeenth embodiment of the present invention.
Figure 51:
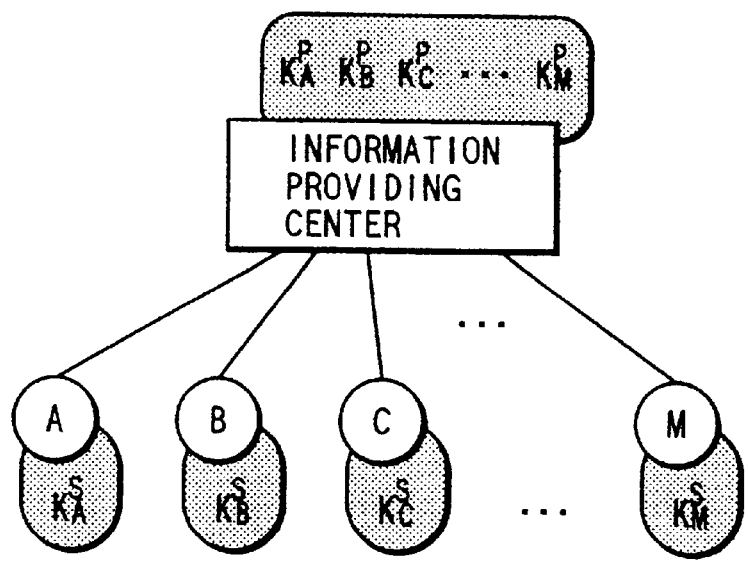
FIG. 51 is a diagram illustrating a public-key cryptographic communication network.

Further, a cryptographic communication network shown in FIG. 50 is employed for this embodiment. A common-key and public-key cryptographic communication network in FIG. 50 is provided by adding a public-key cryptographic communication network in FIG. 51 to the common-key cryptographic communication network in FIG. 4. For information providing service; since only an information providing center 40 performs enciphering, the information providing center 40 holds the public keys of individual subscribers in a database 41.

In the cryptographic communication network shown in FIG. 50, each subscriber secretly holds a secret key, which corresponds to his or her public key, and a key that is owned in common with the information providing center 40. In FIG. 50, public keys of users A, B, . . . and M are denoted by $K^P_A, K^P_B, \ldots$ and $K^P_M$, and their secret keys are denoted by $K^S_A, K^S_B, \ldots$ and $K^S_M$. $K_A, K_B, \ldots$ and $K_M$ indicate respectively a common key that is used in common by the information providing center 40 and user A, a common key that is used in common by the information providing center 40 and user B, . . . , and a common key that is used in common by the information providing center 40 and user M. Therefore, user j secretly holds his or her own secret key $K^S_j$ and common key $K_j$ along with the information providing center 40.

Information providing service from the information providing center 40 to the user A according to the present invention is performed using the following procedures. The preprocedures and the accounting procedures are the same as those in the sixteenth embodiment.

Information Providing Procedures of the Present Invention (for Information Providing Center)

1. The selection means 14 is so set by an enciphering method setting signal that it selects the output of an enciphering system that is determined by the preprocedures.

2. Either a common key $K_A$ or a public key $K^P_A$, which is held for the user A in the key storage area of the storage device 43, is selected as a key that corresponds to the selected enciphering system. The selected key is set to the enciphering device 15 or 16.

3. The encipherer 15 or 16 enciphers data, the selection means 14 selects enciphered text that is output by the enciphering device, which is determined by the preprocedures, and transmits the selected enciphered text to the user A Via the communication interface 12.

Information Providing Procedures of the Present Invention (for User A)

1. The selection means 14 is so set by an enciphering method setting signal that it selects the output of the enciphering system that is determined by the preprocedures.

2. According to an enciphering method setting signal, either common key $K_A$ or secret key $K^S_A$, which is held in the portable storage device 30, is selected as a key that corresponds to the selected enciphering system. The selected key is set to the enciphering device 15 or 16.

3. The enciphered data are received from the information providing center 40 across a transfer path via the communication interface 12, and are deciphered by the enciphering device 15 or 16. The selection means 14 receives plaintext that is output by the enciphering device 15 or 16, which is determined by the preprocedures.

Through the above procedures, an enciphering system can be selected in consonance with the secrecy of the information that is to be provided. For especially secret data, a public-key enciphering system can be selected. For data having a low secrecy level, common-key enciphering can be selected to simplify the processing. Therefore, an accounting system for information providing service that is consonant with a selected enciphering system can be provided.

Eighteenth Embodiment

Figure 52:
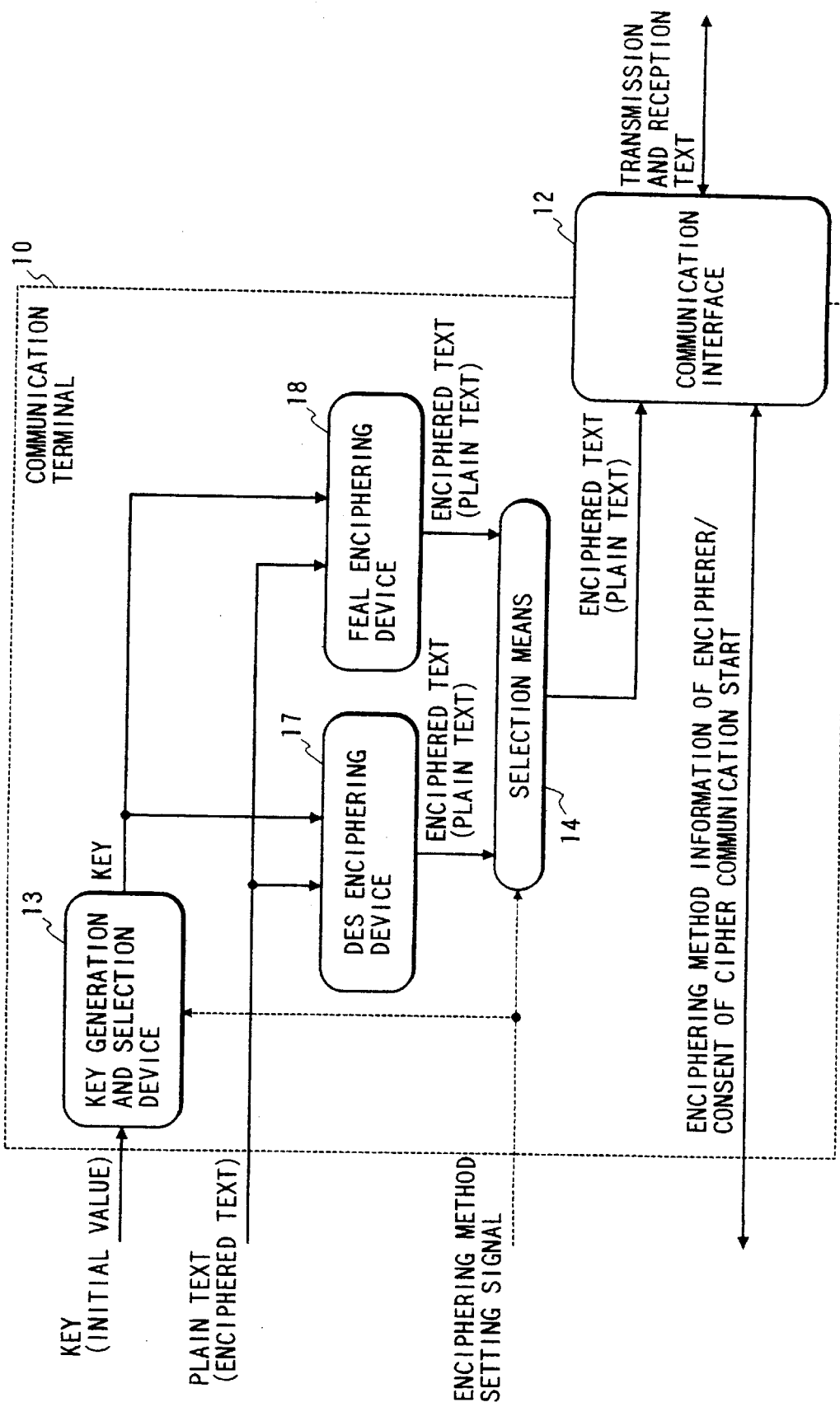
FIG. 52 is a block diagram illustrating a communication terminal that has a display device according to an eighteenth embodiment of the present invention.

In this embodiment are employed a communication terminal 10 shown in FIG. 52, which comprises a plurality of encipherers 17 and 18, for performing enciphering (and deciphering); a communication interface 12; a key generation and selection device 13; and selection means for selecting one of the outputs of the encipherers 17 and 18.

Two block enciphering systems are employed in this embodiments:

1. A DES enciphering system
2. An RSA enciphering system

The DES enciphering device 17 and the FEAL enciphering device 18 perform the enciphering process for the embodiment. The DES enciphering system and the FEAL enciphering system are introduced merely as specific common-key enciphering examples; and the present invention is not limited to these and can be applied for other cryptographic algorithms.

When the communication terminal 10 in FIG. 52 is employed for the DES enciphering process, the selection means always selects the output from the DES enciphering device 17. When the communication terminal 10 is employed for the FEAL enciphering process, the selection means 14 always selects the output from the FEAL enciphering device 18.

The key generation and selection device 13, the communication interface 12, and the selection means 14 in this embodiment are the same as those in the sixteenth embodiment. The cryptographic communication network in FIG. 4 is employed for this embodiment.

The procedures for communication between an information providing center 40 and a user A, and the accounting procedures in this embodiment are performed, in the same manner as are described in the sixteenth embodiment.

Nineteenth Embodiment

Figure 53:
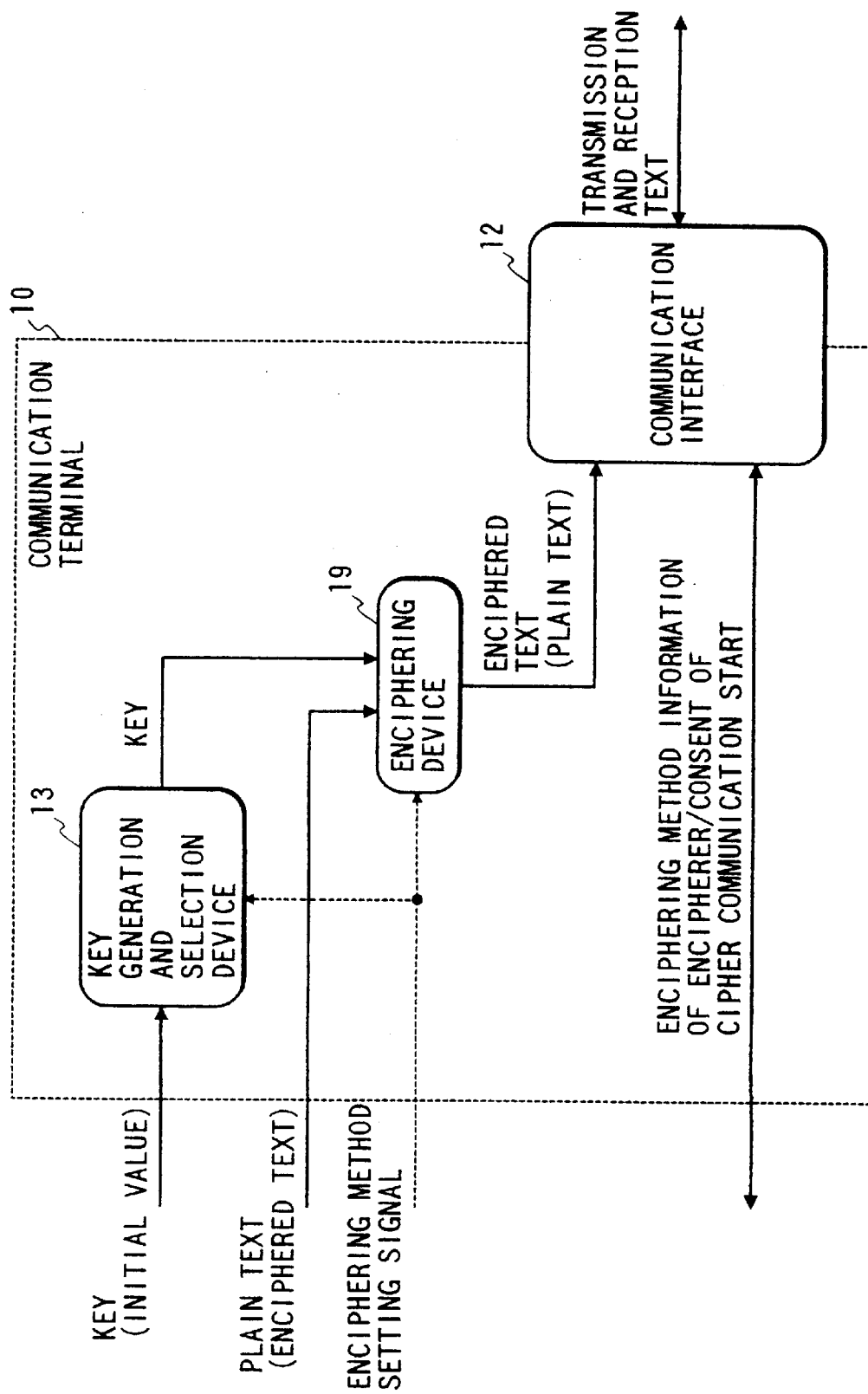
FIG. 53 is a block diagram illustrating a communication terminal according to a nineteenth embodiment of the present invention.

In this embodiment are employed a communication terminal 10 shown in FIG. 53, which comprises a enciphering device 19 for performing enciphering (and, deciphering); a communication interface 12; and a key generation and selection device 13. The selection means 14 employed in the above described embodiments is included in the enciphering device in this embodiment. In this embodiment, a DES (involution) enciphering system is employed. A plurality of f functions that are included as components are prepared, and a plurality of enciphering systems can be set by selecting a specific f function.

Since the DES enciphering system is an algorithm for repeating the same process, a single circuit can perform the repeated process. If a circuit is constructed with a one-stage process for DES enciphering as one processing unit, the circuit is used repeatedly to perform an enciphering process.

Figure 54:
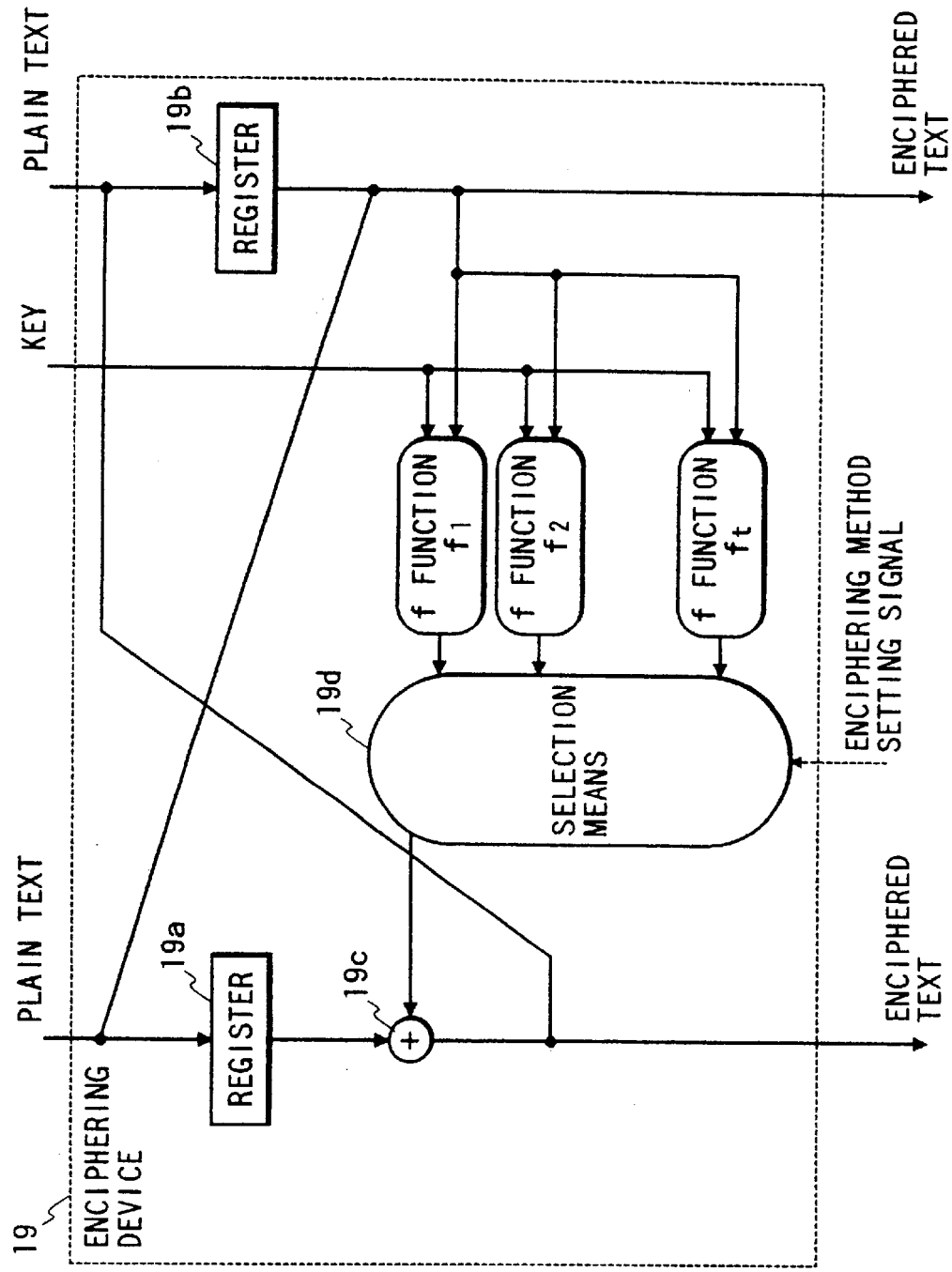
FIG. 54 is a block diagram illustrating an encipherer according to the nineteenth embodiment of the present invention.

An enciphering device 19 in this case is designed as is shown in FIG. 54. The enciphering device 19 in FIG. 54 comprises registers 19a and 19b; an exclusive OR circuit 19c; a plurality of f functions ($f_1, f_2, \ldots$ and $f_t$); and selection means 19d for selecting one of the plurality of f functions. The selection means 19d is controlled by an enciphering method setting signal.

A plurality of f functions can be provided by preparing Sbox sets in a count equivalent to that of the f functions. For f function $f_1$, Sbox set $S_{11}, S_{12}, \ldots$ and $S_{18}$ is employed; for f function $f_2$, Sbox set of $S_{21}, S_{22}, \ldots$ and $S_{28}$ is employed; and so on. The f functions for different enciphering systems may be prepared. In this case, for function $f_1$, an f function for DES enciphering is used; for function $f_2$, an f function for FEAL enciphering is used; . . . and so on.

A key generation and selection device 13 and communication interface 12 are the same as those in the sixth embodiment, and the cryptographic communication network in FIG. 4 is employed.

In this embodiment, the procedures for communication between an information providing center 40 and a user, and the accounting procedures are performed in the same manner as described in the sixteenth embodiment.

Twentieth Embodiment

A communication terminal 10 employed in this embodiment has the same structure as the communication terminal 10 shown in FIG. 53. It should be noted that an enciphering device 20 is employed instead of an enciphering device 19. Selection means is included in the enciphering device 20 in this embodiment. Since the bit length of a key is not changed by an enciphering system, a key generation and selection device 13 is not always necessary.

A block enciphering system is employed as an enciphering system for this embodiment. Further, one of the following modes in which the block enciphering system is employed can be set by an enciphering method setting signal:

1. An ECB (Electric codebook) mode
2. A CBC (Cipher Block Chaining) mode

The CBC mode, though it will be described later, will be briefly explained. When plaintext is denoted by $M_i$; enciphered text, $C_i$; initial value, IV; enciphering using cryptographic key K, $E_K$; and deciphering using cryptographic key K, $D_K$, the CBC mode is represented by the following expressions:

$$C_1 = E_K(M_1 + IV) \quad (3)$$

$$C_i = E_K(M_{i-1}) \ (i=2, 3, \ldots) \quad (4)$$

$$M_1 = D_K(C_1) + IV \quad (5)$$

$$M_1 = D_K(C_i) + C_{i-1} \ (i=2, 3, \ldots) \quad (6)$$

Figure 55:
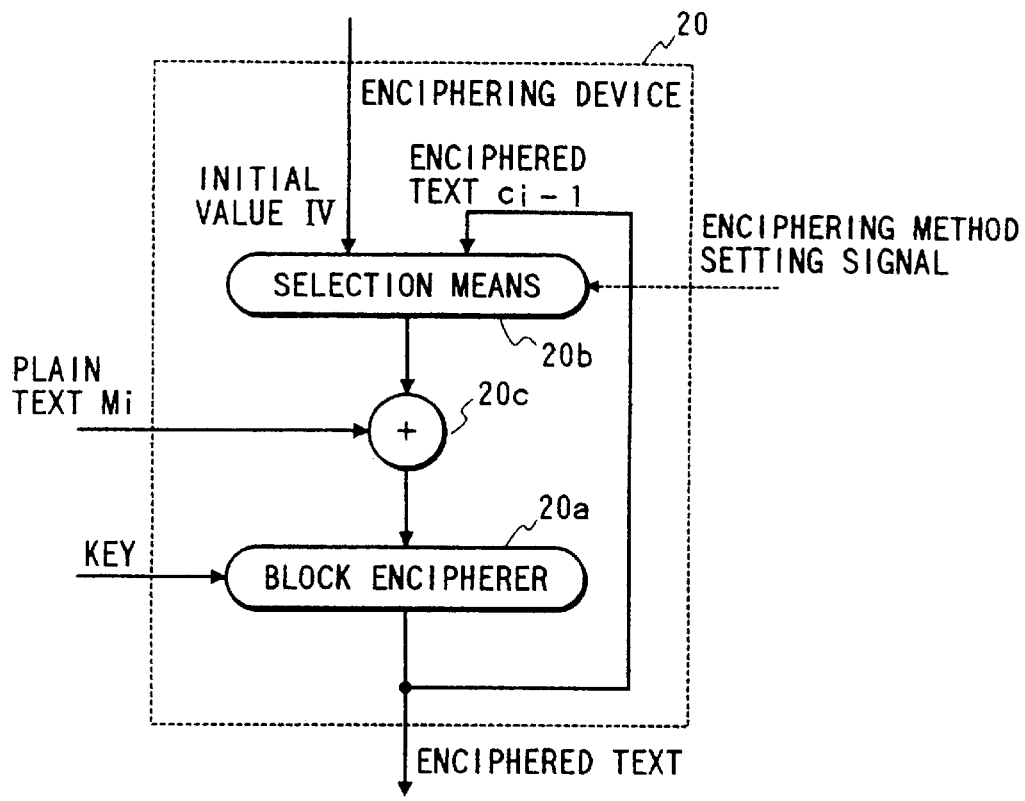
FIG. 55 is a block diagram illustrating an encipherer according to a twentieth embodiment of the present invention.

The enciphering device 20 in this embodiment is arranged as shown in FIG. 55. The enciphering device 20 in FIG. 55 comprises a block encipherer 20a; selection means 20b, for selecting one of two inputs; and an exclusive OR circuit 20c, for performing an exclusive OR operation for each bit. The selection means 20b is controlled by an enciphering method setting signal.

When the enciphering device 20 in FIG. 55 is employed in the ECB mode, a series of 0 bits is used as an input initial value IV. The selection means 20b always selects the initial value IV.

When the enciphering device 20 is employed in the CBC mode, an arbitrary series of bits is set as an input initial value IV. The selection means 20b selects the initial value IV when the first block is to be enciphered, and thereafter selects the output from the enciphering device 20. It is not necessary for the initial value IV to be kept secret between communicators.

The key, generation and selection device 13 and the communication interface 12 in the sixteenth embodiment are also used in this embodiment, and the cryptographic communication network in FIG. 4 is used.

The procedures for communication between an information providing center 40 and a user, and the accounting procedures are performed in the same manner as is described in the sixteenth embodiment. In the preprocedures, however, a procedure is required owning the initial value IV when the CBC mode is selected. For example, a procedure in which the initial value is used in common by the information providing center 40 and a user is required before cryptographic communication is initiated. Since the initial value IV does not have to be kept secret between the information providing center 40 and a user A, it may not be enciphered. Not only secret key $K_A$ but also the initial value IV that is owned in common must be set to the enciphering device 20 of the communication terminal 10.

Twenty-first Embodiment

This embodiment provides an improved enciphering system according to the sixteenth embodiment. In this embodiment, as well as in the sixteenth embodiment, are employed a communication terminal 10 shown in FIG. 42, which comprises a plurality of enciphering devices 11; a communication interface 12; a key generation and selection device 13; and selection means 14 for selecting one of the outputs from the plurality of enciphering devices 11.

A difference between this embodiment and the sixteenth embodiment is as follows. Although the plurality of enciphering devices 11 are provided in the sixteenth embodiment, a key for each of the enciphering devices 11 is fixed during the course of a single cryptographic communication exchange. In other words, a key is not changed as needed during the cryptographic communication period, and the same key is used from the beginning to the end of the cryptographic communication period. In this embodiment, however, a key is changed as needed during cryptographic communication in order to improve the security to prevent a third party from deciphering cryptography. Since the key is updated as needed during the cryptographic communication exchange, the key generation and selection device 13 generates keys even during cryptographic communication, and updates the key of the enciphering device 11 each time a key is generated that has a length corresponding to an enciphering system that is selected by an enciphering method setting signal. It should be noted that the key must be updated synchronously between a sender and a receiver for cryptographic communication.

The key generation and selection device 13 in this embodiment is designed as is shown in FIG. 43, the same as in the sixteenth embodiment. As is described above, however, the key generation and selection device 13 of this embodiment generates keys even during cryptographic communication, and updates the key of the enciphering device each time a key is generated that has a length corresponding to an enciphering system that is selected by an enciphering method setting signal. Thus, the operation of the key generation and selection device 13 is different from that in the sixteenth embodiment.

The key generation and selection device 13 in the sixteenth embodiment is not necessarily operated when a key is generated that has a length corresponding to an enciphering system that is selected by an enciphering method setting signal. On the other hand, the key generation and selection device 13 in this, embodiment is required to sequentially generate keys having a length that corresponds to an enciphering system that is selected by an enciphering method setting signal. In other words, the key generation and selection device 13 in this embodiment repeats many times the operation of the key generation and selection device 13 in the sixteenth embodiment.

A key generation algorithm for the key generation and selection device 13 in this embodiment is not limited, and a general algorithm, such as that which is described in the sixteenth embodiment, can be used. An explanation will be given for a case wherein employed as a key generation algorithm is an algorithm for generation of a pseudo-random number sequence that is secure from a calculation amount, especially, an algorithm for generation of a square-type pseudo-random number sequence.

A square-type pseudo-random number sequence is a sequence of $b_1, b_2, \ldots$, that is generated using the following procedures.

Square-type Pseudo-random Number Sequence

Supposing that p and q are prime numbers that satisfy $p \equiv q \equiv 3 \pmod 4$, and $N = p \cdot q$, a bit sequence $b_1, b_2, \ldots$, which is acquired by initial value $x_0$ (where x is an integer $1 < x_0 < N-1$) and the following reflexive relations:

$$x_{i+1} = x_i^2 \bmod N \ (i=0, 1, 2, \ldots) \quad (7)$$

$$b_i = \mathrm{lsb}_j(x_i) \ (i=1, 2, \ldots) \quad (8),$$

is called a square-type pseudo-random number sequence. It should be noted that $\mathrm{lsb}_j(x_i)$ represents the lower j bits, and when the number of bits for modulo N is n, $J = 0(\log_2 n)$.

The square-type pseudo-random number sequence is that which is secure from a calculation amount on an assumption that determination of a root remainder for N is difficult from the view point of a calculation amount.

In order to adequately secure the square-type pseudo-random numbers, it is preferable that bit count n for modulo N in the square expression (7) be approximately 512. Secret keys (initial values for the key generation and selection device 13) $K_{AB}$, $K_{AC}$, which are employed in common between the subscribers, are $1<K_{AB}, K_{AC}, \ldots, <N-1$.

Figure 56:
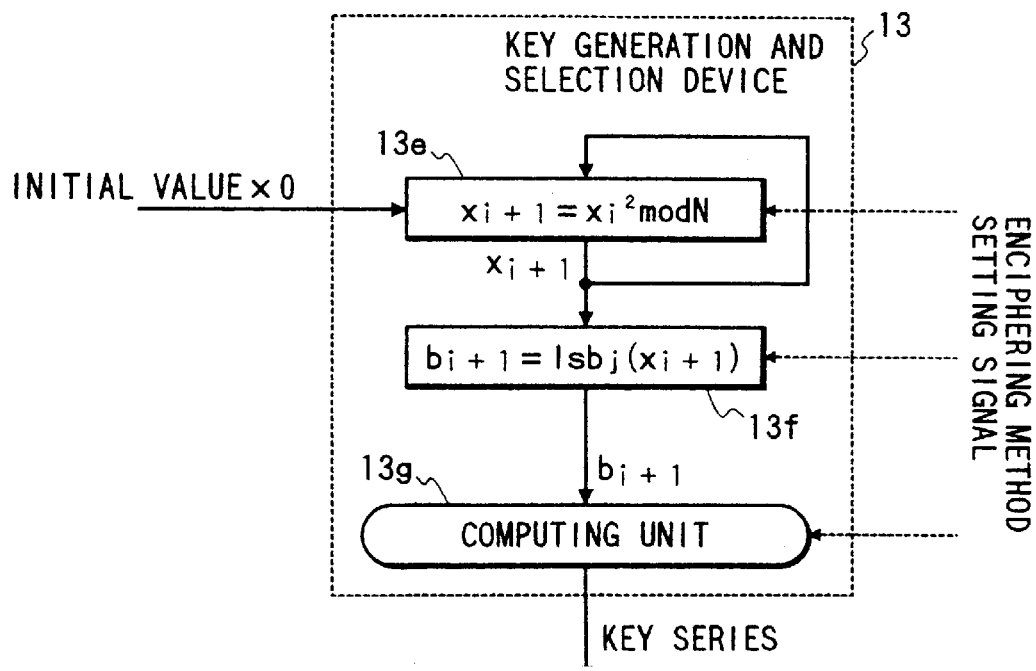
FIG. 56 is a block diagram illustrating a key generation and selection device that employs a square-type pseudo-random number according to a twenty-first embodiment of the present invention.

A key generation and selection device 13 that employs the square-type pseudo-random number sequence is shown in FIG. 56. The key generation and selection device 13 in FIG. 56 comprises a processor 13e, for performing feedback calculations using expression (7); a processor 13f, for calculating expression (8); and a computing unit 13g. The operation of the key generation and selection device 13 is as follows:

1. Initial value $x_0$ is input to the processor 13a.
2. $x_1, x_2, \ldots$ are generated by expression (7).
3. The generated $x_1, x_2, \ldots$ are substituted into expression (8), which is then calculated by the processor 13f, and obtained $b_1, b_2, \ldots$ are output.
4. The computing unit 13g converts $b_1, b_2, \ldots$ into a series of keys $k_1, k_2, \ldots$ having a length that corresponds to an enciphering system that is selected by an enciphering method setting signal.

Figure 57:
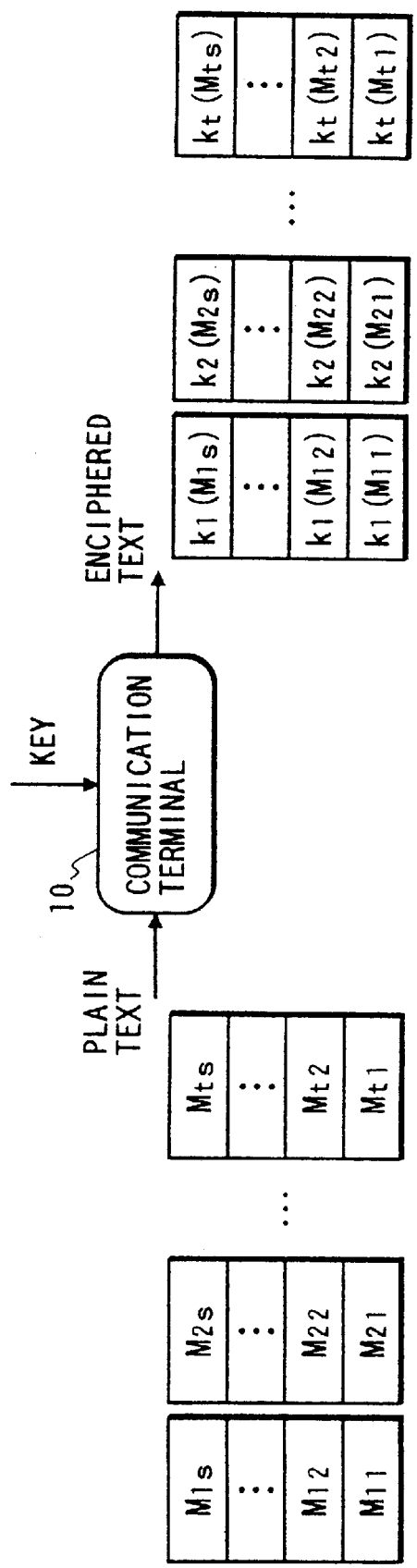
FIG. 57 is a diagram illustrating the procedures for cryptographic communication when key updating is performed according to the twenty-first embodiment of the present invention.

The cryptographic communication procedures when a key is updated as needed are shown in FIG. 57. A block enciphering system is used as an enciphering system. In FIG. 57, $M_{uv}$ (u=1, 2, ..., t; v=1, 2, ..., s) indicates a plaintext block; $k_u$ (u=1, 2, ..., t) indicates a block enciphering key; $k_u(M_{uv})$ (u=1, 2, ..., t; v=1, 2, ..., s) indicates an enciphered text block that is obtained by enciphering a plaintext block $M_{uv}$ using $k_u$. The s blocks from $M_{u1}$ to $M_{us}$ are enciphered by using the same key $k_u$. A series of keys $k_1, k_2, \ldots$, which are updated by the above mentioned key generation and selection device 13, are employed sequentially as keys for block enciphering, and as a result, the plaintext block in FIG. 57 is enciphered by using a plurality of keys.

Since the key is updated as needed and the number of plaintext blocks that are enciphered by using the same key is s, the analysis of a key can be difficult.

The enciphering device 11, the communication interface 12, and the selection means 14 in the sixteenth embodiment are employed for this embodiment, and the cryptographic communication network in FIG. 4 is employed.

In this embodiment, the information providing service provided by an information providing center 40 to a user A is performed according to the following procedures. The preprocedures and the accounting procedures are the same as those in the sixteenth embodiment.

Information Providing Procedures of the Present Invention (for Information Providing Center)

1. The selection means 14 is so set by an enciphering method setting signal that it selects the output of an enciphering system that is determined by the preprocedures.

2. The secret key $K_A$, which is held for the user A in the key storage area in the storage device 43, is set as an initial value to the key generation and selection device 13. A key is generated that corresponds to the enciphering system that is selected according to the enciphering method setting signal.

3. While a series of keys that are output by the key generation and selection device 13 is used to update the key of the enciphering device 11, data are enciphered using the updated keys. The selection means 14 selects enciphered text that is output by the enciphering device 11, which is determined by the preprocedures, and transmits the selected enciphered text to the user A via the communication interface 12.

Information Providing Procedures of the Present Invention (for User A).

1. The selection means 14 is so set by an enciphering method setting signal that it selects the output of the enciphering system that is determined by the preprocedures.

2. The secret key $K_A$, which is held in the portable storage device 30, is set as an initial value to the key generation and selection device 13, which in turn generates a key that corresponds to an enciphering system that is selected by an enciphering method setting signal.

3. The enciphered data are received from the information providing center 40 across a transfer path via the communication interface 12. While a series of keys that are output by the key generation and selection device 13 are used to update the key of the enciphering device 11 as needed, the received enciphered data are deciphered by using the updated key. The selection means 14 receives plaintext that is output by the enciphering device 11, which is determined by the preprocedures.

Although the square-type pseudo-random numbers are used as an algorithm for the generation of pseudo-random numbers that are secure for a calculation amount, another algorithm that is used to generate pseudo-random numbers that are secure from a calculation amount can be used; as is described in reference, Tsujii and Kasahara, "Cryptography and Information Security", Shokosha, p. 86, 1990, for example, an algorithm for which RSA cryptography, discrete logarithms, or reciprocal cryptography is employed also can also be applied as the algorithm of the present invention for the generation of pseudo-random numbers.

The method of this embodiment for updating a key as needed was explained based on the sixteenth embodiment; but this method can be applied not only to the sixteenth embodiment but also to the eighteenth, nineteenth and twentieth embodiments.

Twenty-second Embodiment

According to the sixteenth embodiment, a specific enciphering system is selected from among a plurality of enciphering systems where a key is fixed, while according to the twenty-first embodiment, a specific enciphering system is selected from among a plurality of enciphering systems by which a key is updated. As a modification of these two embodiments, according to this embodiment, an enciphering system is selected, either an enciphering system wherein a key is fixed or an enciphering system wherein a key is updated.

Figure 58:
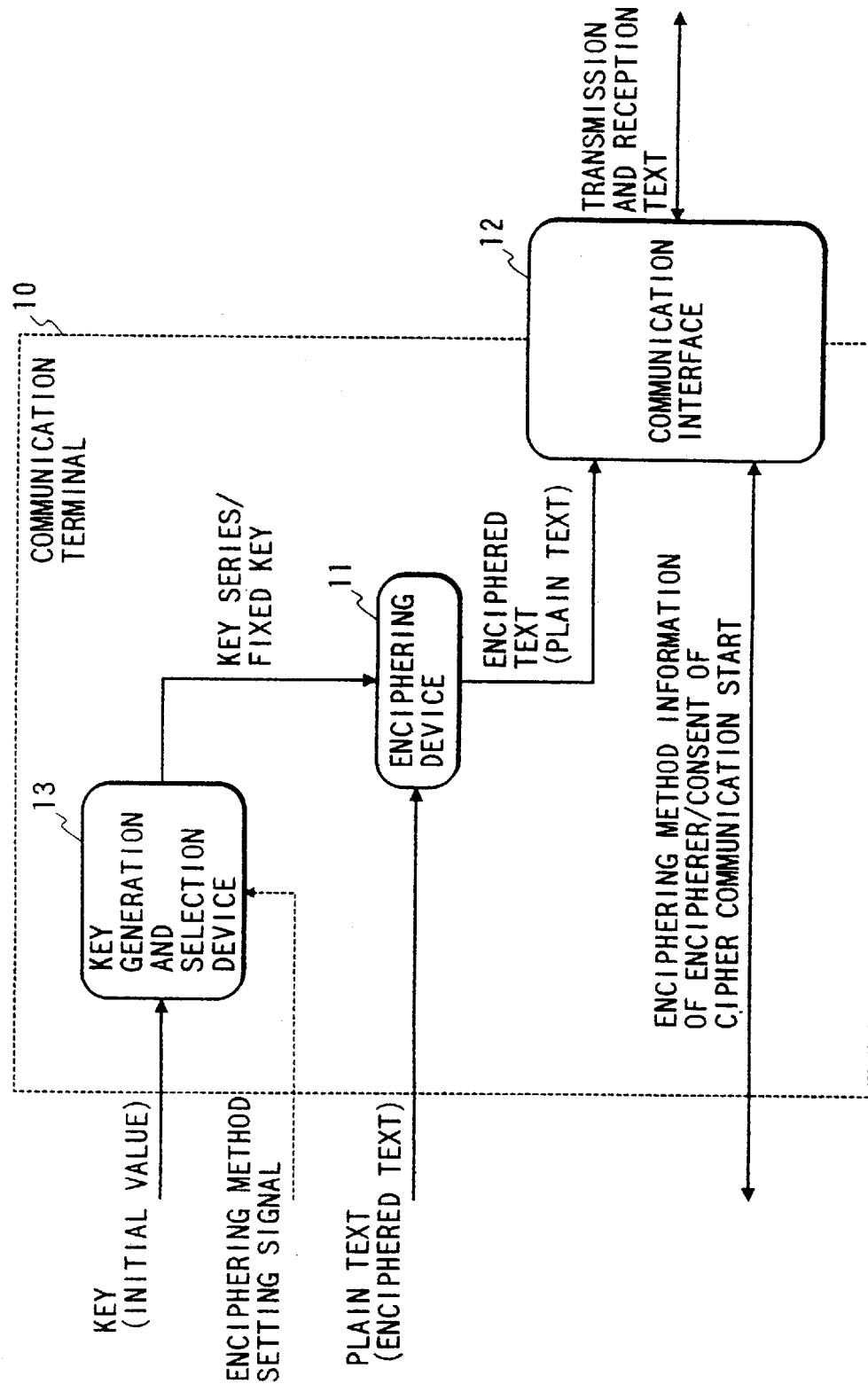
FIG. 58 is a block diagram illustrating a communication terminal according to a twenty-second embodiment of the present invention.

In this embodiment, a communication terminal 10 in FIG. 58 is employed that comprises; an enciphering device 11, for performing enciphering (and deciphering); a communication interface 12; and a key generation and selection device 13. It is should be noted that for simplification of the explanation only one enciphering device is provided herein.

A block enciphering system is employed as an enciphering system for this embodiment. One of the following methods for block enciphering can be set by an enciphering method setting signal:

1. Performing enciphering by using a fixed key.
2. Performing enciphering while a key is updated.

The key generation and selection device 13 is controlled by an enciphering method setting signal. When the method for "performing enciphering by using a fixed key" is employed, the key generation and selection device 13 generates a fixed key (one key) and halts its processing. When the method for "performing enciphering while a key is updated" is employed, the key generation and selection device 13 repeats key generation to provide a series of keys (a plurality of keys).

When the method of operation for communication terminal 10 in FIG. 58 is the method "performing enciphering by using a fixed key", the key generation and selection device 13 generates a fixed key according to an enciphering method setting signal, and the enciphering device 11 performs enciphering using the fixed key. When the method of operation for the communication terminal 10 in FIG. 58 is the method "performing enciphering while a key is updated", the key generation and selection device 13 generates a series of keys according to an enciphering method setting signal, and the enciphering device 11 performs enciphering while sequentially updating the key using the series of keys.

The key generation and selection device 13 in this embodiment is the same as that in the twenty-first embodiment, and the enciphering device 11 and the communication interface 12 are the same as those in the sixteenth embodiment. The cryptographic communication network shown in FIG. 4 is also used in this embodiment.

The procedures for communication between an information providing center 40 and a user, and the accounting procedures in this embodiment are performed in the same manner as in the sixteenth embodiment. When the method for performing enciphering while a key is updated is selected, the information providing procedures are performed in the same manner as in the twenty-first embodiment.

Through these procedures an enciphering system can be selected in consonance with the secrecy required for the data to be transmitted. For example, for especially secret data, the method for "performing enciphering while a key is updated" can be s elected. For other data, the method for "performing enciphering by using a fixed key" can be selected to simplify the processing. Therefore, an information providing service charge system that is accordance with a selected enciphering method can be achieved.

Although for simplification of thee explanation only one enciphering device 11 was provided in this embodiment, the present invention includes a case wherein a plurality of en ciphering devices 11 are provided. When a plurality of enciphering vices 11 are provided selection means 14 for selecting one of the outputs by the enciphering devices 11 is required.

Twenty-third Embodiment

An explanation will be given for this embodiment wherein the arrangement of the key generation and selection device 13 in the twenty-first and twenty-second embodiments is modified.

In the twenty-first and twenty-second embodiments, since a key that is owned in common between subscribers is fixed, even if the method for "performing enciphering while a key is updated" is employed, the initial value of the key generation and selection device 13 is a constant value for the same user. As a result, the same series of keys may be generated.

In this embodiment, even if the user is the same, the initial value of the key generation and selection device 13 is changed each time to improve the security.

In expressions (7) and (8) in the twenty-first embodiment that are the procedures for generating a series of keys, $x_{i+1}$, which is sequentially updated by the feedback calculation, is called an internal variable of the key generation and selection device 13.

Figure 59:
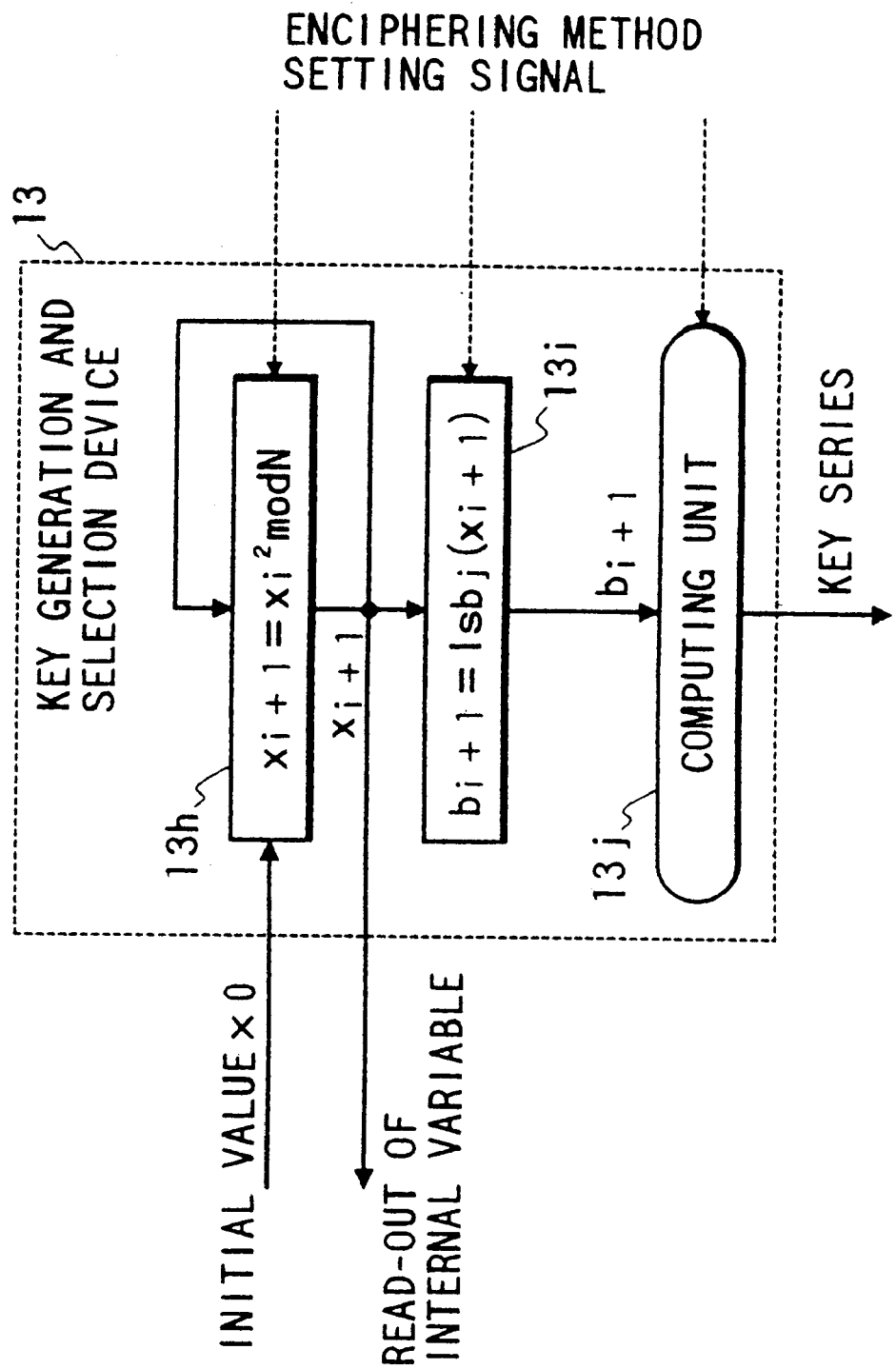
FIG. 59 is a block diagram illustrating a key generation and selection device that employs a square-type pseudo-random number according to the twenty-second embodiment of the present invention.

The key generation and selection device 13 in this embodiment includes a processor 13$h$ for per forming feedback calculation of expression (7) and a processor 13$i$ for calculating expression (8), as is shown in FIG. 59, and reads the internal variable that is updated by expression (7). At a communication terminal 10 of a user, the internal variable is stored in holding means 30$a$ of a portable storage device 30, which is connected to the communication terminal 10 in the sixteenth embodiment. At a communication terminal 10 of an information providing center 40, the internal variable that is read is stored in a key storage area in a storage device 43 used in the sixteenth embodiment.

In the twenty-first and twenty-second embodiments, only the initial value is set to the key generation and selection device 13 and the movement of data is unidirectional. In this embodiment, however, it is possible to read, in the reverse direction, the internal variable in the key generation and selection device 13. A common key that was used for the current cryptographic communication is replaced with the, internal variable, which has been read as a common key, that will be used for the next cryptographic communication.

When the key generation and selection device 13,is replaced by the key generation and selection device 13 in FIG. 56, a communication terminal 10 can be provided whereby the internal variable can be changed each time the initial value of the key genera selection device 13 is used.

The cryptographic communication network in FIG. 4 is also used in this embodiment.

The procedures for communication between the information providing center 40 and a user, and the accounting procedures are performed in the same manner as in the sixteenth embodiment. However, in the information providing procedures for the information providing center 40, one procedure is required at the last in which "an internal variable of a key generation a nd selection device, when information to be provided has been enciphered, is secretly held as a new initial value for the next cryptographic communication with A in the key storage area of the storage device 43". For a user, one procedure is required at the last in which "an internal variable value for a key generation and selection device, when enciphered information has been deciphered, is secretly held in the holding means 30$a$ of the portable storage device 30 as a new initial value for the next cryptographic communication for information service".

As is described above, according to the above embodiments, since an enciphering system can be selected, the security for enciphering information that is to be provided and a service charge for it, or an enciphering rate and a corresponding service charge, can be selected in consonance with an encipher power and an enciphering rate for the selected enciphering system, whereas conventionally these are not taken into consideration. As a result, a charging system for providing information service having a high degree of freedom can be provided.

As is described above, according to the present invention, since selection means for selecting an enciphering system is provided for communication means that a sender and a receiver employ for cryptographic communication, an enciphering system can be changed. Further, since the selected enciphering system is owned in common by a sender and a receiver before the transmission of enciphered text, the selection of the enciphering system, which is conventionally impossible, can be permitted, and thus cryptographic communication having a high degree of freedom can be provided.

Many widely different embodiments of the present invention may be constructed without departing from the spirit and scope of the present invention. It should be understood that the present invention is not limited to the specific embodiments described in the specification, except as defined in the appended claims.

What is claimed is:

1. A communication device comprising:
   (a) encipher means for enciphering data as block units, said encipher means comprising (i) an encipherer that enciphers according to a specific algorithm, (ii) a pseudo-random number generator that performs feedback calculation to generate a pseudo-random number sequence that is secure from a calculation amount, and (iii) a computing unit that converts the pseudo-random number sequence that is output by said pseudo-random number generator into a series of keys for said encipherer;
   (b) counting means for obtaining a count of the blocks to be enciphered;
   (c) encipher transmission means for transmitting the enciphered data; and
   (d) accounting means for charging for the transmission data enciphered in accordance with a count value held by said counting means.

2. A communication device according to claim 1, wherein a square-type pseudo-random number generator is employed as said pseudo-random number generator.

3. A communication device according to claim 1, further comprising a display for displaying a charge, which is calculated by said accounting means.

4. A cryptographic communication device comprising:
   (a) a plurality of communication means for enciphering transmission data and deciphering received enciphered data, and for performing communication with each other; and
   (b) selection means, provided in each of said plurality of communication means, for selecting one of a plurality of enciphering systems;
   (c) key generation means, provided in said communication means, for generating a key corresponding to an enciphering system that is selected by said selection means; and
   (d) updating means, provided in said communication means, for updating as needed a key that is generated by said key generation means during an enciphering process for transmission data,
      wherein each of said communication means comprises encipher means for enciphering data as block units, counting means for obtaining a count of the blocks to be enciphered, encipher transmission means for transmitting the enciphered data and accounting means for charging for the transmission data enciphered in accordance with a count value held by said count means.

5. A cryptographic communication device according to claim 4, wherein an algorithm for generating pseudo-random numbers that are secure from a calculation amount is employed by said key generation means.

6. A cryptographic communication device according to claim 5, wherein a square-type pseudo-random number generation algorithm is employed as the algorithm for generating the pseudo-random numbers that are secure from a calculation amount.

7. A communication method comprising:
   (a) an enciphering step for enciphering data as block units, said enciphering step comprising (i) an encipher step that enciphers according to a specific algorithm, (ii) a pseudo-random number generating step that performs feedback calculation to generate a pseudo-random number sequence that is secure from a calculation amount, and (iii) a computing step that converts the pseudo-random number sequence that is output in said pseudo-random number generating step into a series of keys for said encipher step;
   (b) a counting step for obtaining a count of the blocks to be enciphered;
   (c) an encipher transmission step for transmitting the enciphered data; and
   (d) an accounting step for charging for the transmission data enciphered in accordance with a count value held in said counting step.

8. Computer executable software code stored on a computer readable medium, the code comprising:
   (a) enciphering code for enciphering data as block units, said enciphering code comprising (i) encipher code that enciphers according to a specific algorithm, (ii) pseudo-random number generating code that performs feedback calculation to generate a pseudo-random number sequence that is secure from a calculation amount, and (iii) computing code that converts the pseudo-random number sequence that is output by said pseudo-random number generating code into a series of keys for said encipher code;
   (b) counting code for obtaining a count of the blocks to be enciphered;
   (c) encipher transmission code for transmitting the enciphered data; and
   (d) accounting code for charging for the transmission data enciphered in accordance with a count value obtained by said counting code.

9. A cryptographic communication device comprising:
   (a) a plurality of communication means for enciphering transmission data and deciphering received enciphered data, and for performing communication with each other;
   (b) selection means, provided in each of said plurality of communication means, for selecting one of a plurality of enciphering systems; and
   (c) determination means provided in said communication means, for performing communication with each other to determine an enciphering system that is selected by said selection means,
      wherein each of said communication means comprises encipher means for enciphering data as block units, counting means for obtaining a count of the blocks to be enciphered, encipher transmission means for transmitting the enciphered data and accounting means for charging for the transmission data enciphered in accordance with a count value held by said count means.

10. A cryptographic method comprising the steps of:
   (a) enciphering transmission data and deciphering received enciphered data, and performing communication between a plurality of communication devices;

(b) selecting one of a plurality of enciphering systems, each of the communication devices selecting an enciphering system; and (c) performing communication between the communication devices to determine an enciphering system that is selected in said selecting step, wherein each of the communication devices enciphers data as block units, obtains a count of the blocks to be enciphered, transmits the enciphered data and charges for the transmission data enciphered in accordance with the count value.

11. Computer executable software code for executing a cryptographic communication method, the method comprising the steps of:

(a) enciphering transmission data and deciphering received enciphered data, and performing communication between a plurality of communication devices; and (b) selecting one of a plurality of enciphering systems, each of the communication devices selecting an enciphering system; and (c) performing communication between the communication devices to determine an enciphering system that is the selecting step, wherein each of the communication devices enciphers data as block units, obtains a count of the blocks to be enciphered, transmits the enciphered data and charges fort the transmission data enciphered in accordance with the count value.

12. A computer-readable storage medium containing software code for executing a cryptographic communication method, the method comprising the steps of:

(a) enciphering transmission data and deciphering received enciphered data, and performing communication between a plurality of communication devices;

(b) selecting one of a plurality of enciphering systems, each of the communication devices selecting an enciphering system; and (c) performing communication between the communication devices to determine enciphering system that is selected in said selecting step, wherein each of the communication devices enciphers data as block units, obtains a count of blocks to be enciphered, transmits the enciphered data and charges for the transmission data enciphered in accordance with the count value.

13. A cryptographic communication device comprising:

(a) encipher means for enciphering data as block units;

(b) counting means for obtaining a count of the blocks to be enciphered;

(c) encipher transmitting means for transmitting the enciphered data; and (d) accounting means for charging for the transmission data enciphered in accordance with a count value held by said counting means.

14. A cryptographic communication method comprising:

(a) an enciphering step of enciphering data as block units;

(b) a counting step of obtaining a count of the blocks to be enciphered;

(c) an encipher transmitting step of transmitting the enciphered data; and (d) an accounting step of charging for the transmission data enciphered in accordance with a count value held in said counting step.

15. Computer executable software code for a cryptographic communication method, the method comprising:

(a) an enciphering step of enciphering data as block units;

(b) a counting step of obtaining a count of the blocks to be enciphered;

(c) an encipher transmitting step of transmitting the enciphered data; and (d) an accounting step of charging for the transmission data enciphered in accordance with a count value held in said counting step.

16. Computer-readable storage medium containing software code for executing a cryptographic communication method, the method comprising:

(a) an encipher step of enciphering data as block units;

(b) a counting step of obtaining a count of the blocks to be enciphered;

(c) an encipher transmission step of transmitting the enciphered data; and (d) an accounting step of charging for the transmission data enciphered in accordance with a count value held in said counting step.

* * * * *